United States Patent
Allen et al.

(10) Patent No.: US 10,139,995 B2
(45) Date of Patent: Nov. 27, 2018

(54) DEVICE HAVING GRAPHICAL USER INTERFACES AND METHOD FOR DEVELOPING MULTIMEDIA COMPUTER APPLICATIONS

(75) Inventors: Michael W. Allen, Bloomington, MN (US); Steven M. Birth, Minneapolis, MN (US); Patrick J. Krekelberg, Maplewood, MN (US)

(73) Assignee: ALLEN LEARNING TECHNOLOGIES, Mendota Heights, MN (US)

( * ) Notice: Subject to any disclaimer, the term of this patent is extended or adjusted under 35 U.S.C. 154(b) by 1 day.

(21) Appl. No.: 13/701,260

(22) PCT Filed: Jun. 2, 2011

(86) PCT No.: PCT/JP2011/038943
§ 371 (c)(1),
(2), (4) Date: Nov. 30, 2012

(87) PCT Pub. No.: WO2011/153361
PCT Pub. Date: Dec. 8, 2011

(65) Prior Publication Data
US 2013/0132875 A1    May 23, 2013

Related U.S. Application Data

(60) Provisional application No. 61/350,909, filed on Jun. 2, 2010, provisional application No. 61/410,054, filed on Nov. 4, 2010.

(51) Int. Cl.
G06F 3/048    (2013.01)
G06F 3/0484   (2013.01)
(Continued)

(52) U.S. Cl.
CPC ......... G06F 3/04842 (2013.01); G06F 8/34 (2013.01); G06F 8/38 (2013.01)

(58) Field of Classification Search
CPC . G06F 8/34; G06F 8/38; G06F 3/0481; G06F 3/011; G06F 3/0482;
(Continued)

(56) References Cited

U.S. PATENT DOCUMENTS 5,487,141 A * 1/1996 Cain et al. ............... 715/764
5,619,636 A * 4/1997 Sweat et al. ............. 715/202
(Continued)

FOREIGN PATENT DOCUMENTS

CN    1177154    3/1998
CN    1549118    11/2004
(Continued)

OTHER PUBLICATIONS

Apple Inc., Cocoa Drawing Guide, Apr. 30, 2009, pp. 39-40.*
(Continued)

*Primary Examiner* — Shourjo Dasgupta
(74) *Attorney, Agent, or Firm* — Hamre, Schumann, Mueller & Larson

(57) ABSTRACT

This disclosure is directed to systems and techniques for generating and implementing graphical user interfaces (GUIs) for wiring and binding various objects including graphical and logical objects. In the GUIs, visual wirings are used to represent binding connections that lock different properties of the objects so that those properties share the same value or values. The binding connections allow a user to affect property change(s) in any one of the linked objects during authoring and/or at runtime by controlling property change(s) at one or more of the rest of the linked objects.

20 Claims, 61 Drawing Sheets

(51) Int. Cl.
*G06F 8/34* (2018.01)
*G06F 8/38* (2018.01)

(58) Field of Classification Search
CPC ............ G06F 3/04817; G06F 3/04847; G06F
3/0486; G06F 3/04845; G06F 17/30873;
G06F 17/30899; G06F 17/30884; G06F
17/24; G06F 17/50; G06T 19/00; G06T
17/00; G06Q 30/02; G06Q 10/10; G09G
5/14; H04N 5/44591; H04N 5/44543;
G05B 19/0426; G05B 19/409; G05B
2219/23258; G05B 2219/25067; H04L
29/06; H04L 29/08072; H04L 29/0899;
H04L 29/0809; H04L 41/22; H04L 41/12;
H04L 41/145
USPC ........ 715/700, 765, 967, 733–735, 738–739,
715/762–764, 769, 771, 810, 964–965
See application file for complete search history.

(56) References Cited

U.S. PATENT DOCUMENTS

| | | | |
|---|---|---|---|
| 5,689,711 A | 11/1997 | Bardasz et al. | |
| 5,850,548 A * | 12/1998 | Williams | 717/107 |
| 5,913,063 A | 6/1999 | McGurrin et al. | |
| 6,003,037 A * | 12/1999 | Kassabgi et al. | |
| 6,054,986 A * | 4/2000 | Kato | G06F 3/0481 700/83 |
| 6,633,888 B1 * | 10/2003 | Kobayashi | 715/781 |
| 6,701,513 B1 | 3/2004 | Bailey | |
| 6,802,053 B1 * | 10/2004 | Dye | G06F 8/34 717/113 |
| 7,020,868 B2 * | 3/2006 | Debbins | G06F 8/34 717/108 |
| 7,159,183 B1 * | 1/2007 | Kudukoli | G06F 8/34 715/762 |
| 8,479,107 B2 * | 7/2013 | Vainio et al. | 715/762 |
| 8,881,038 B1 * | 11/2014 | Palmer | G06T 11/60 715/764 |
| 2001/0020291 A1 * | 9/2001 | Kudukoli | G06F 8/34 717/100 |
| 2002/0070965 A1 * | 6/2002 | Austin | G06F 8/38 715/762 |
| 2002/0070966 A1 * | 6/2002 | Austin | G06F 9/44505 715/763 |
| 2002/0070968 A1 * | 6/2002 | Austin | G06F 3/0481 715/764 |
| 2002/0089541 A1 * | 7/2002 | Orbanes | G06F 8/34 715/764 |
| 2003/0036873 A1 * | 2/2003 | Sierer | G06Q 20/10 702/123 |
| 2004/0255269 A1 * | 12/2004 | Santori | G06F 8/38 717/109 |
| 2004/0268300 A1 * | 12/2004 | Huin | G06F 8/34 717/107 |
| 2005/0251789 A1 * | 11/2005 | Peck | G06F 8/34 717/113 |
| 2006/0031784 A1 * | 2/2006 | Makela | 715/850 |
| 2006/0059461 A1 | 3/2006 | Baker et al. | |
| 2006/0064674 A1 | 3/2006 | Olson et al. | |
| 2006/0150148 A1 * | 7/2006 | Beckett et al. | 717/109 |
| 2006/0150169 A1 | 7/2006 | Cook et al. | |
| 2006/0225034 A1 * | 10/2006 | Peck | G06F 8/34 717/106 |
| 2008/0256200 A1 * | 10/2008 | Elliston | H04L 51/04 709/206 |
| 2009/0183081 A1 * | 7/2009 | Rodriguez et al. | 715/733 |
| 2011/0055744 A1 * | 3/2011 | Ryan et al. | 715/769 |
| 2011/0066957 A1 * | 3/2011 | Prats et al. | 715/753 |
| 2012/0023410 A1 * | 1/2012 | Roth et al. | 715/737 |
| 2014/0033171 A1 * | 1/2014 | Lorenz et al. | 717/121 |

FOREIGN PATENT DOCUMENTS

| | | |
|---|---|---|
| CN | 1801151 | 7/2006 |
| CN | 101052948 | 10/2007 |
| CN | 101276275 | 10/2008 |

OTHER PUBLICATIONS

Adobe User Education, Adobe Photoshop 6.0 User Guide, Aug. 18, 2000, pp. 65, 206-217.*

"Basic Tutorial of Circuit Maker", published to web on Oct. 28, 2003 at labhw.computacao.ufs.br/programas/circuitmaker/Circuit-Maker-tutor2.pdf, retrieved Mar. 30, 2016.*

* cited by examiner

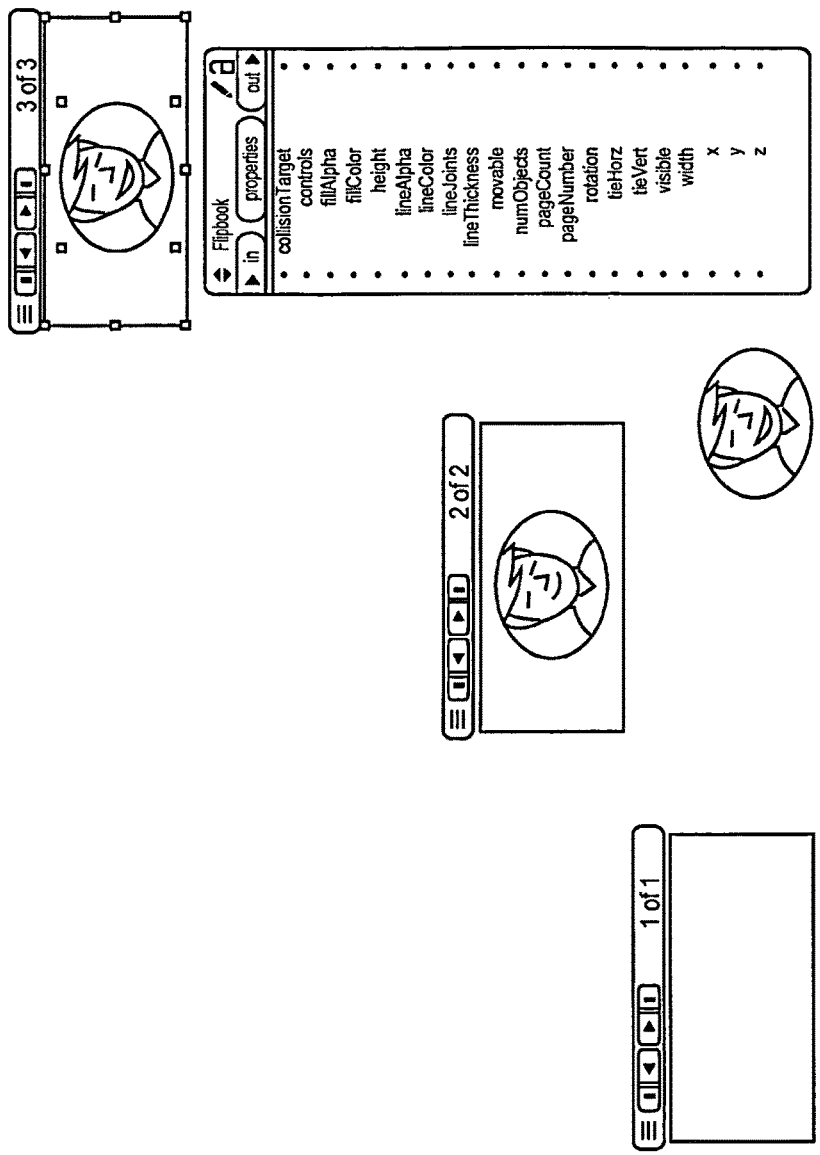

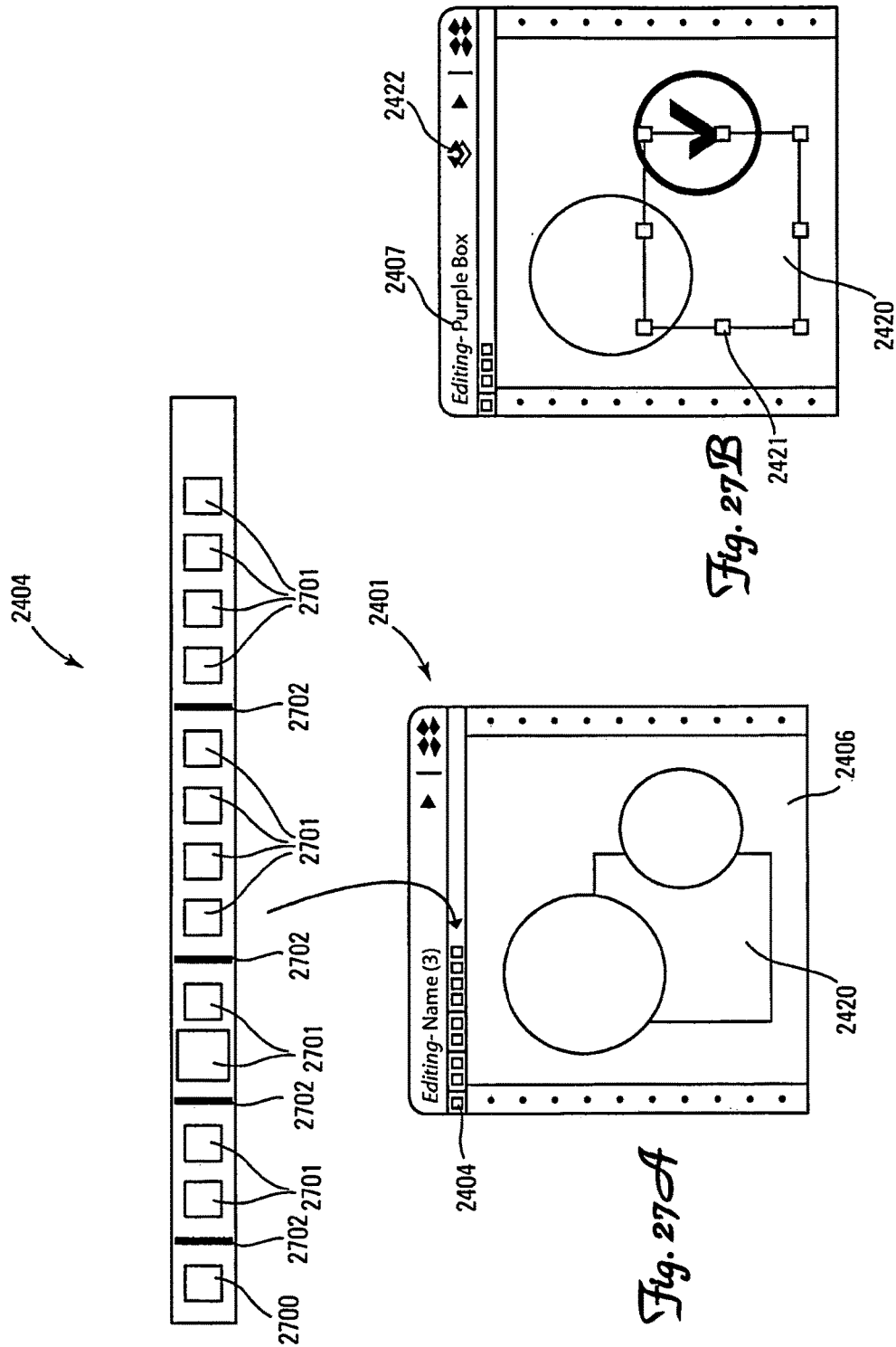

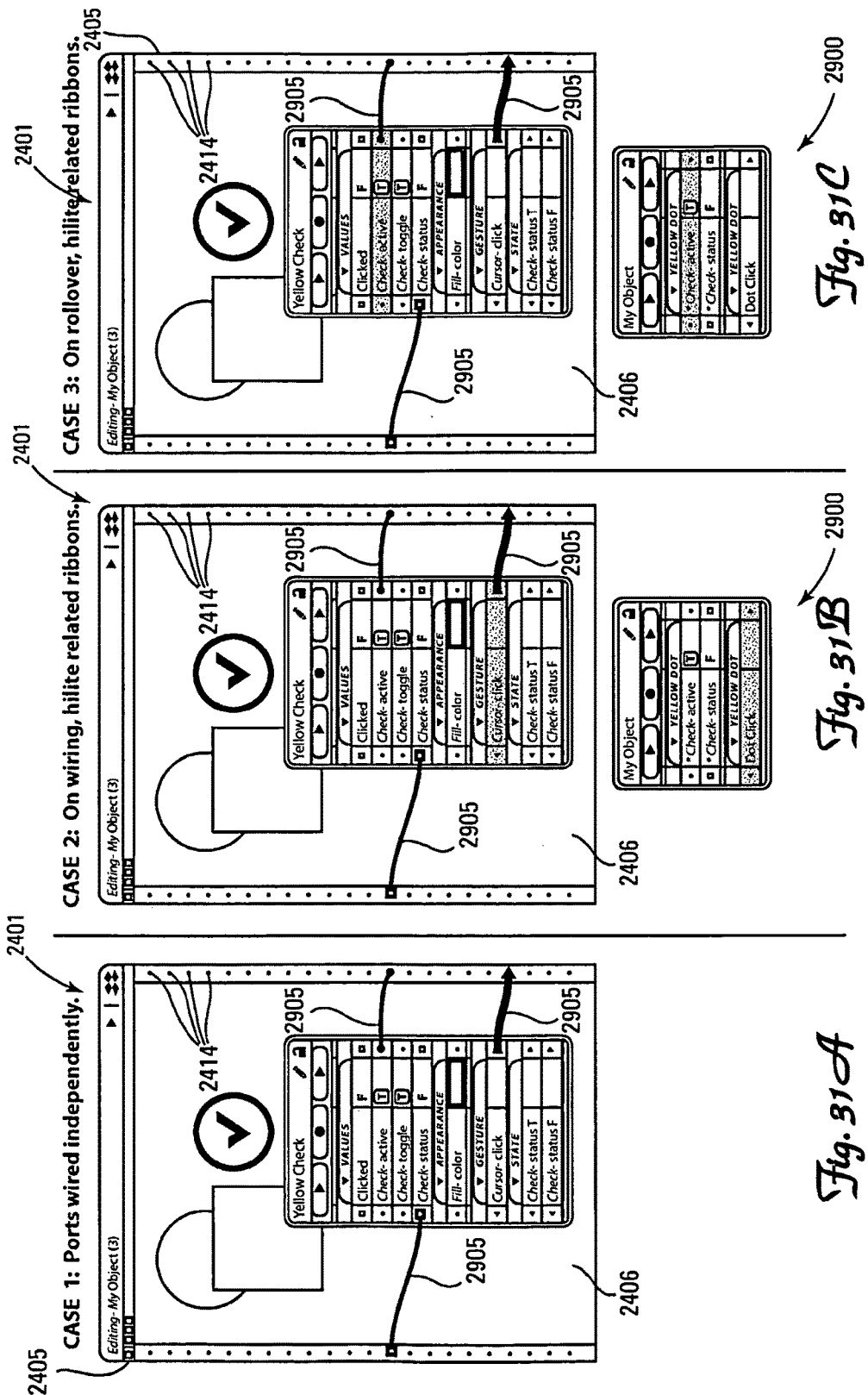

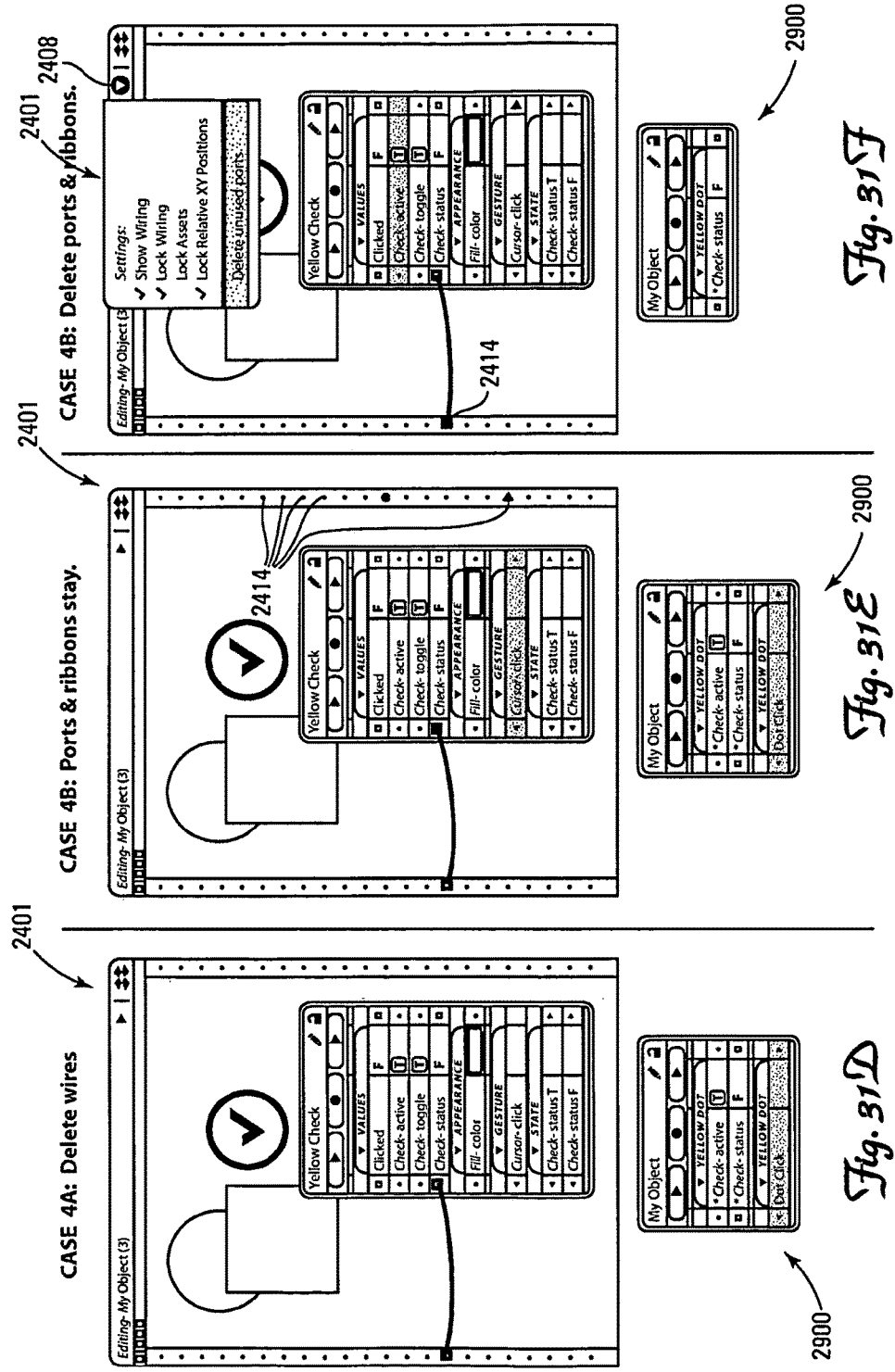

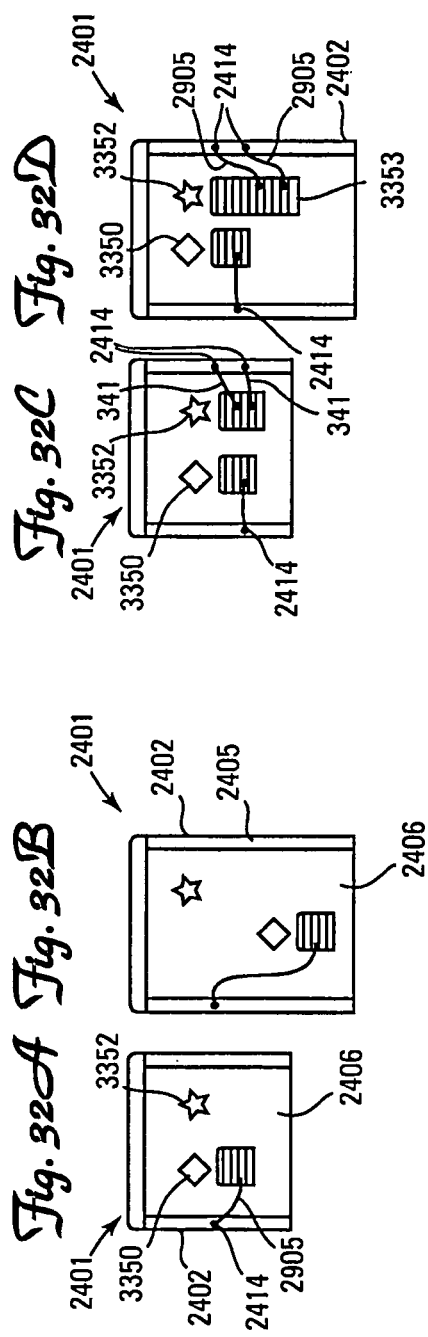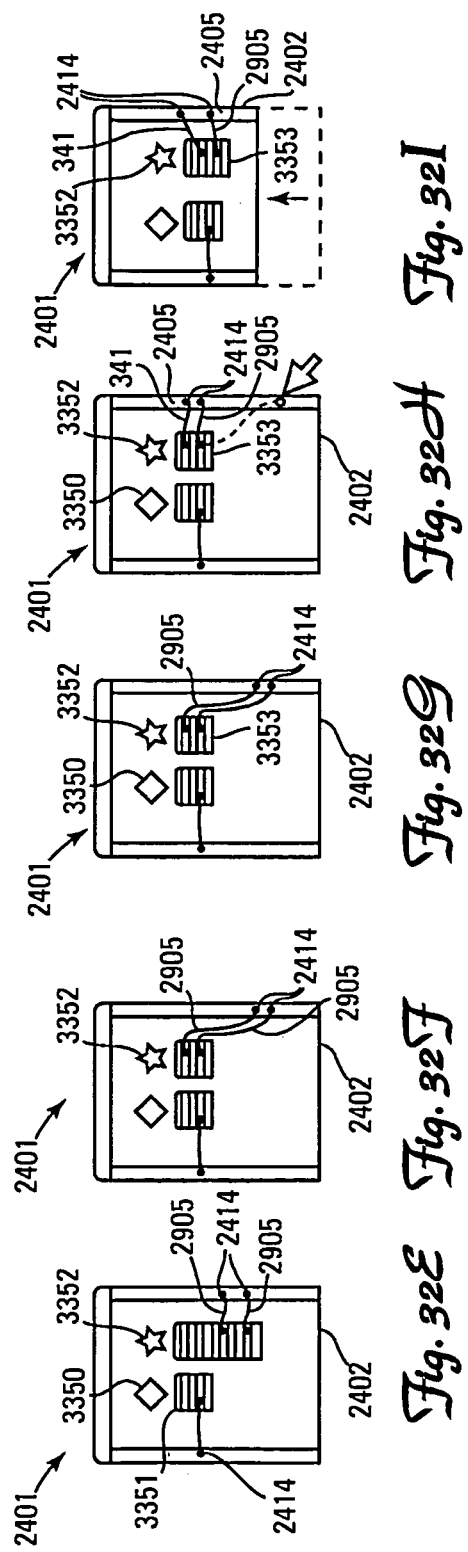

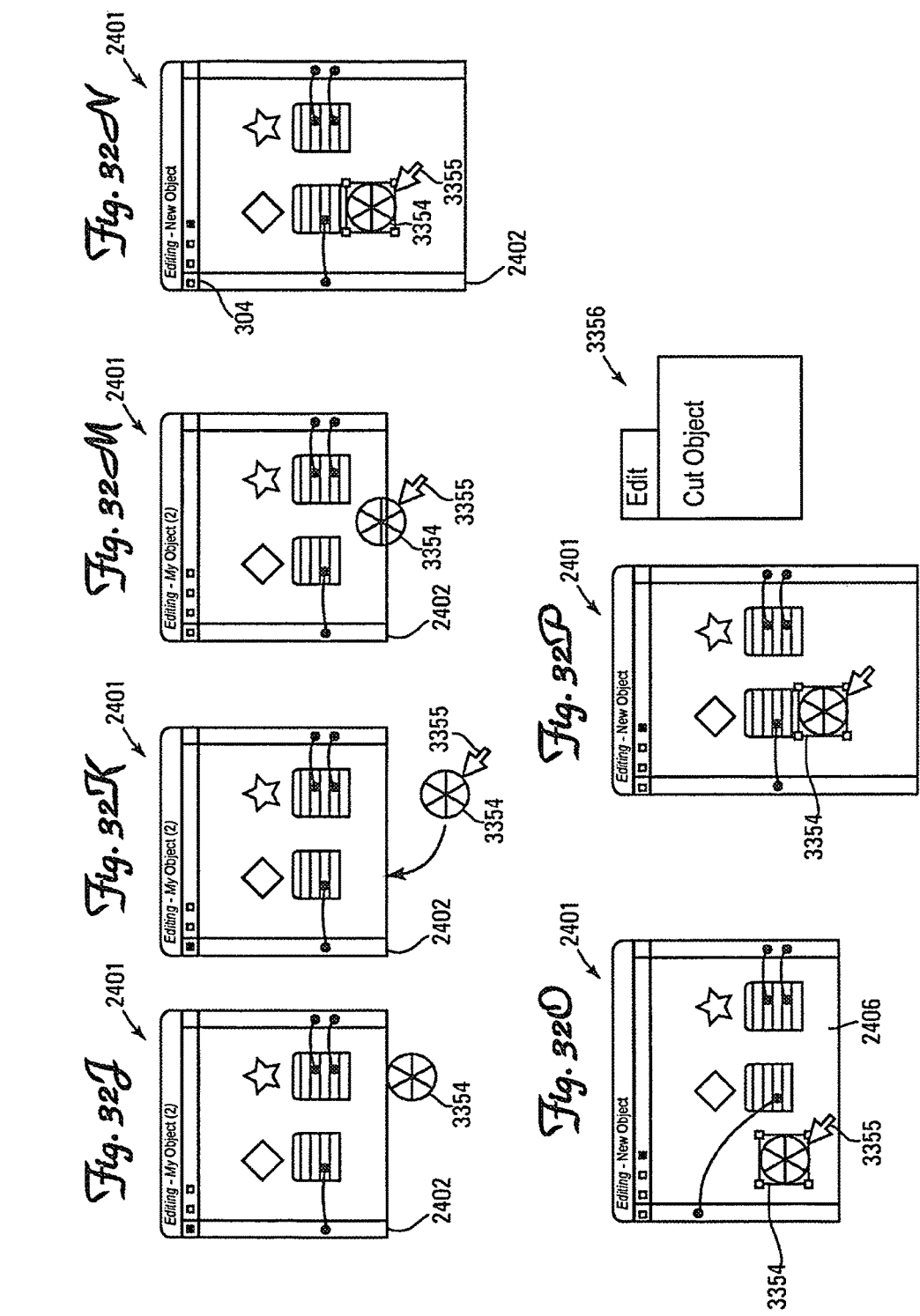

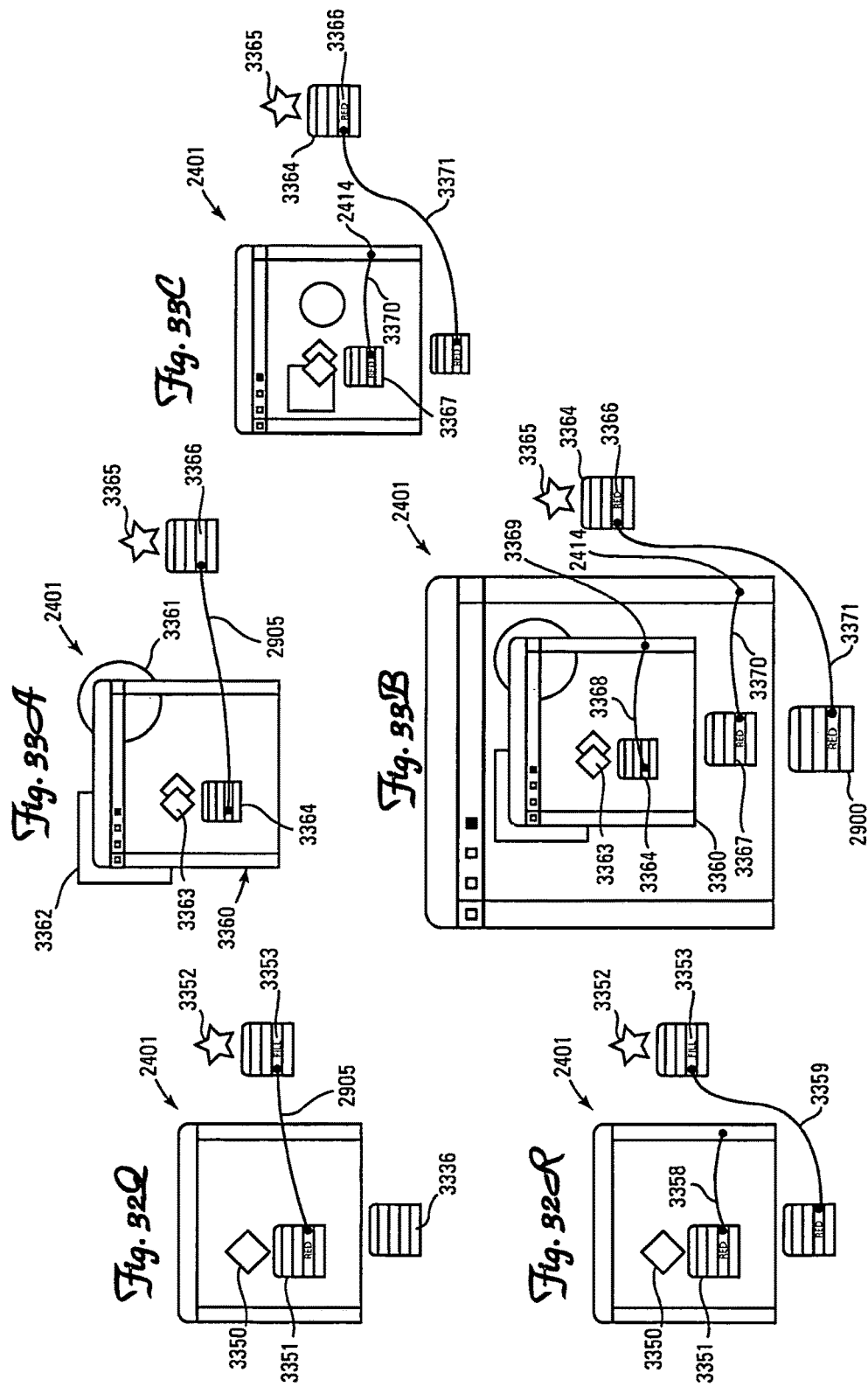

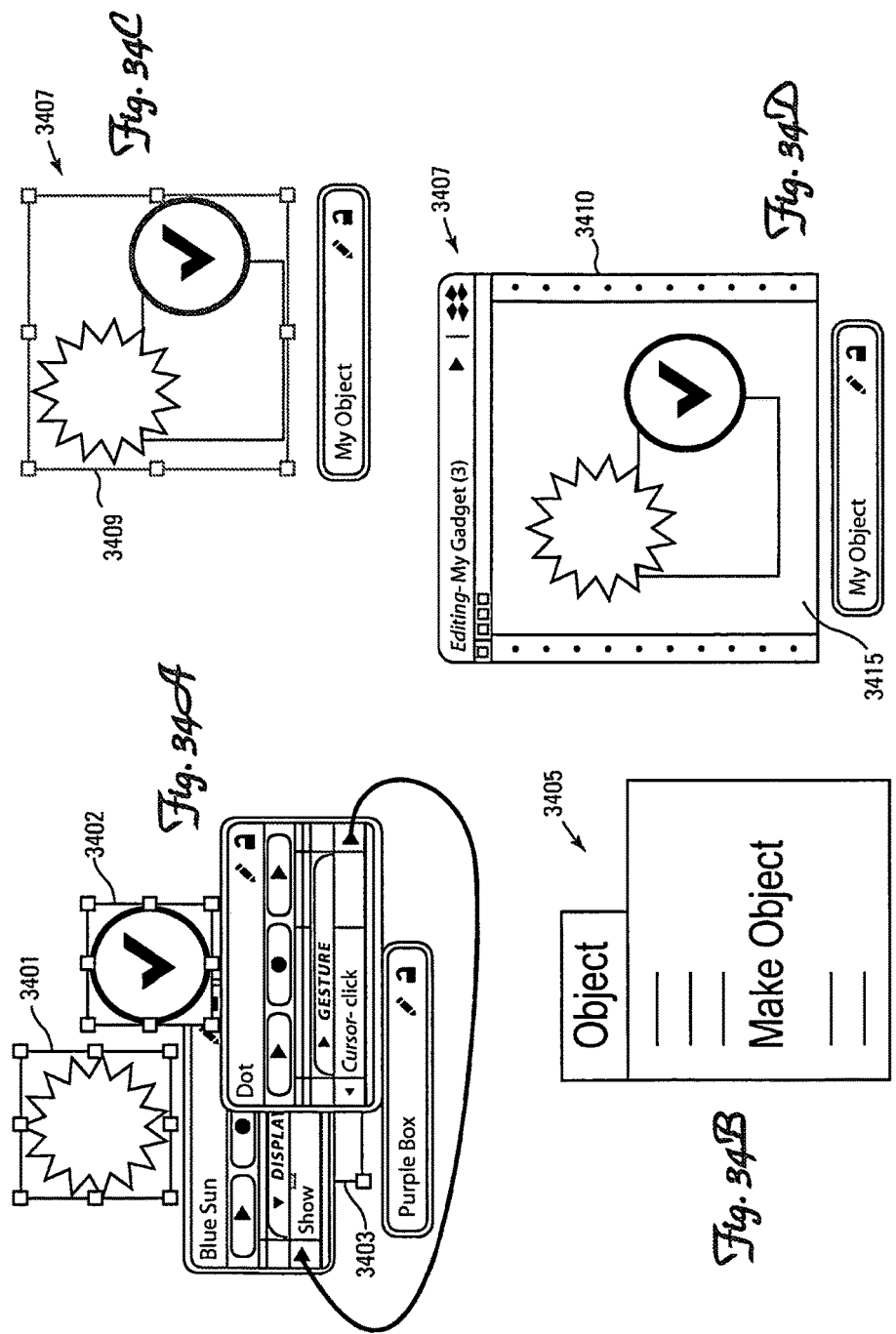

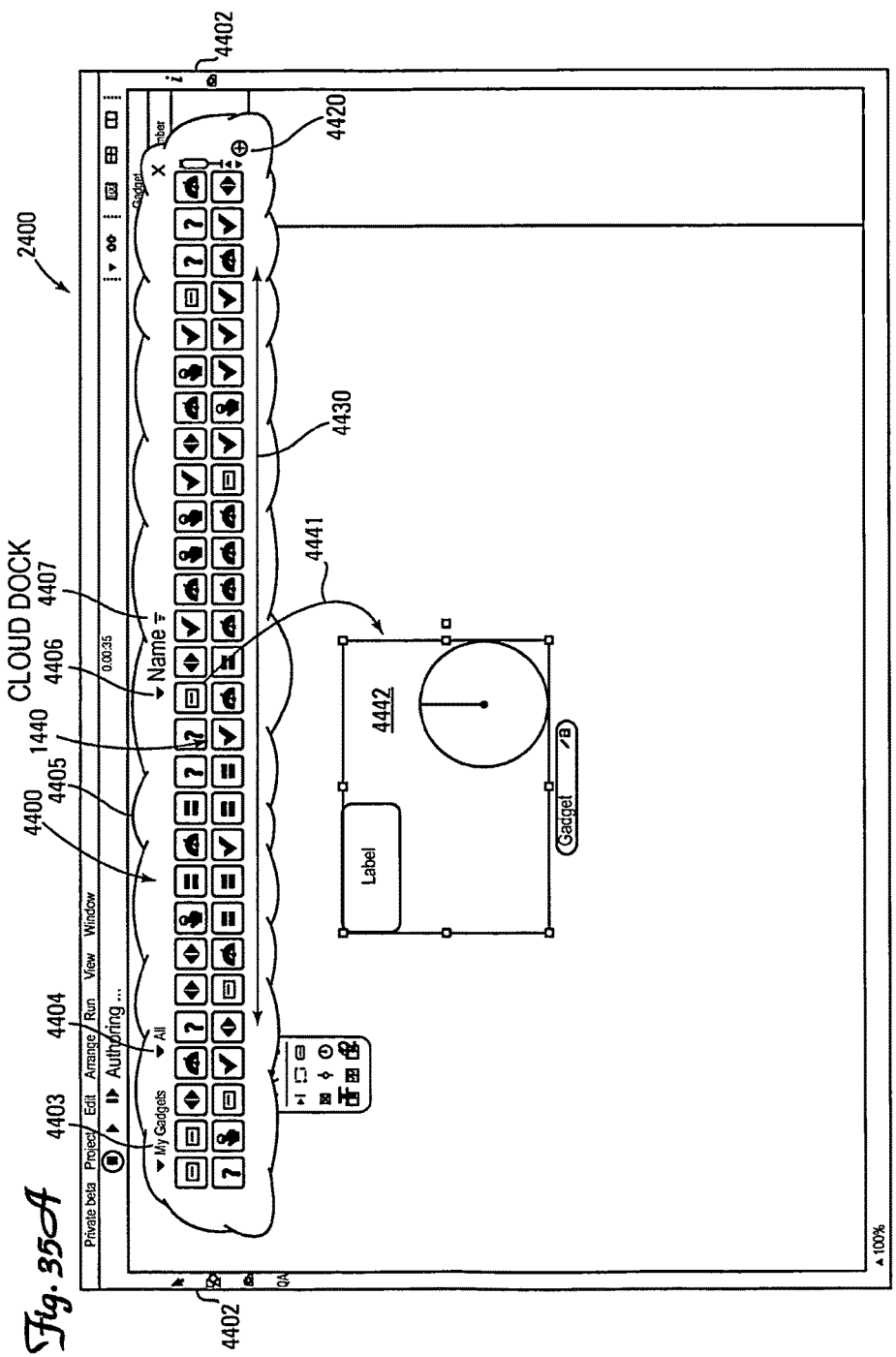

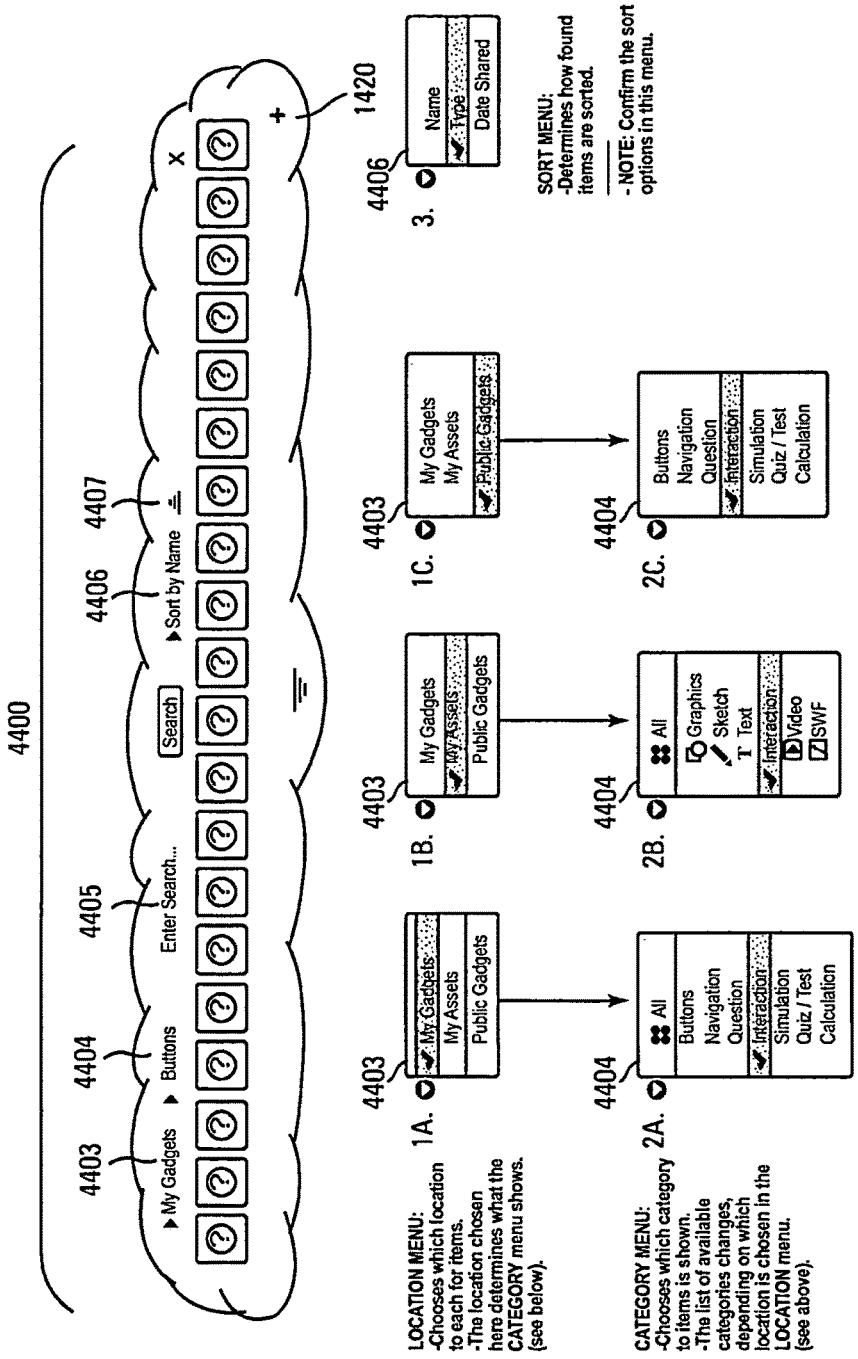

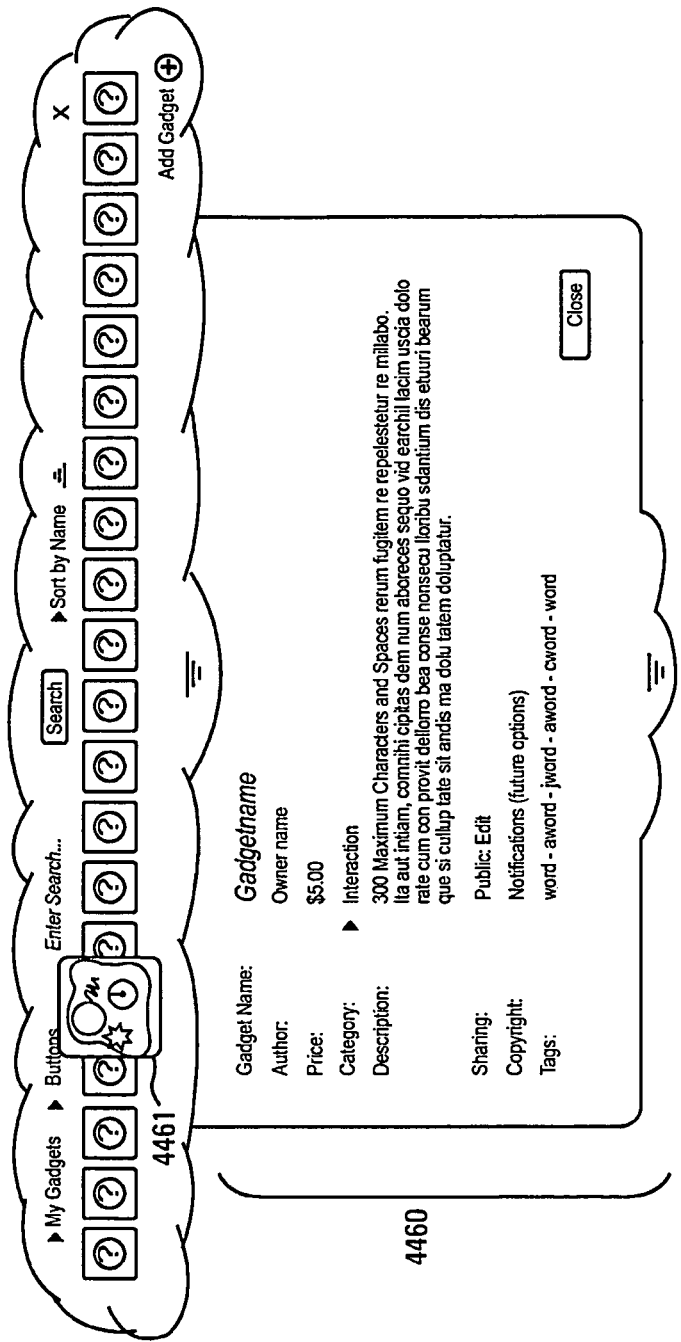

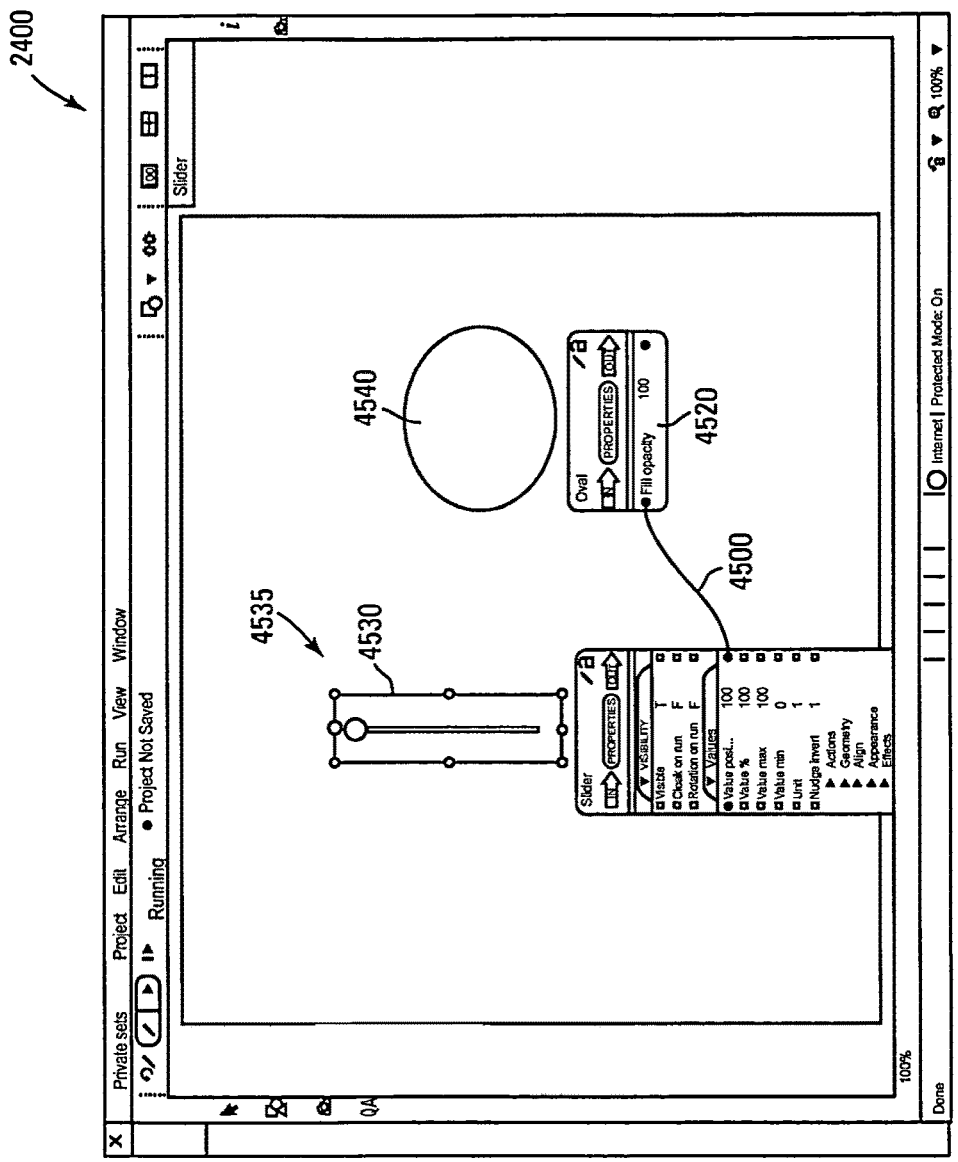

DEVICE HAVING GRAPHICAL USER INTERFACES AND METHOD FOR DEVELOPING MULTIMEDIA COMPUTER APPLICATIONS

FIELD

This disclosure relates generally to a program product to graphical user interfaces (GUIs) for developing multimedia computer applications.

BACKGROUND

Creating a computer program generally requires a step of writing a source code using an editor, a step of compiling the source code to create a program, and a step of debugging the program. Each of these steps is a separate and independent step.

Generally, the source code is written using a particular programming language. Programming language is an artificial language for expressing computations, algorithms, and logic for directing a machine to perform a particular function and/or action. There are many different programming languages. Like human languages, each programming language requires particular forms of written specification of syntax and semantics. Thus, writing the source code requires typing text following the rules of the particular syntax and semantics of the programming language.

The source code is then compiled using a compiler to create a program. The compiler is a computer program that transforms the written source code into another language to create the program. The program is generally in a language having a form that a machine is configured to understand and/or follow. For example, the program may be in binary code or assembly language.

It can be difficult to detect errors in the source code, as these errors are generally detected during or after the compiling step. Errors in the source code cause program faults. Program faults are caused by many factors, for example, the type of programming language used, incorrect syntax in the source code, and/or typographical error in the source code. Accordingly, computer programming generally includes a debugging step. Debugging is a process for detecting and locating program faults for fixing faults in a program. Debugging is generally an extremely tedious process.

Creating a computer program generally requires typing text into some form of a text editor. There are some programs that aid in the creation of a source code and/or program that includes a graphical user interface (GUI). GUI is a type of user interface that generally offers visual indicators that can be manipulated by a user for performing actions. It is generally accepted that GUI reduces the steep learning curve of command-line interface for interacting with a computer. It is also generally accepted that GUI allows for greater efficiency and productivity. However, there is generally no substitution for typing text following the syntax and semantics of the programming language for creating a source code.

SUMMARY

This disclosure provides systems and techniques for generating and implementing graphical user interfaces (GUIs) for wiring and binding various objects including graphical and logical objects. In the GUIs provided, visual wirings are used to represent binding connections that lock different properties of the objects so that those properties share the same value or values. The binding connections allow a user to affect property change(s) in any one of the linked objects during authoring and/or at runtime by controlling property change(s) at one or more of the rest of the linked objects. The binding connections described herein can include several attributes that may be advantageously used for a wide variety of applications including e-learning, gaming and communications. For instance, a binding connection can be bi-directional where a property change at any one end of the connecting wire may cause a corresponding property change at the other end. The directionality of a binding connection can be customized using a master/slave relation to handle a race condition where respective property changes are made at both ends of the binding wire at the same instant. Multiple binding connections can be used to link multiple objects in series where a property change at any one of the linked objects may induce respective corresponding property changes at the rest of the linked objects. Multiple binding connections can form a network of connections among multiple objects so as to provide various interactions between property changes at those objects in any suitable manner.

The systems and techniques provided herein may provide one or more of the following advantages. First, flexible implementations of graphical user interfaces in a unified authoring and running environment can be provided for wiring and binding various objects including graphical and logical objects. Second, binding wires can be provided to visualize and customize binding connections between various objects so as to enable a user who is not skilled in program languages to control property changes in the objects while authoring and/or at runtime. Third, flexible deployments of graphical user interfaces at both web and desktop environments can be provided to allow multiple users to implement the graphical user interfaces to collaborate from different geographic locations and/or within the firewalls of user entities. Fourth, a cloud architecture can be utilized to allow the systems to integrate with social network platforms such as Facebook, Twitter and LinkedIn and mobile devices such as iPhone and Android to facilitate complex interactions among multiple users and/or entities.

The details of one or more embodiments are set forth in the accompanying drawings and the description below. Other features and advantages will be apparent from the description and drawings, and from the claims.

DRAWINGS

Figure 7A:
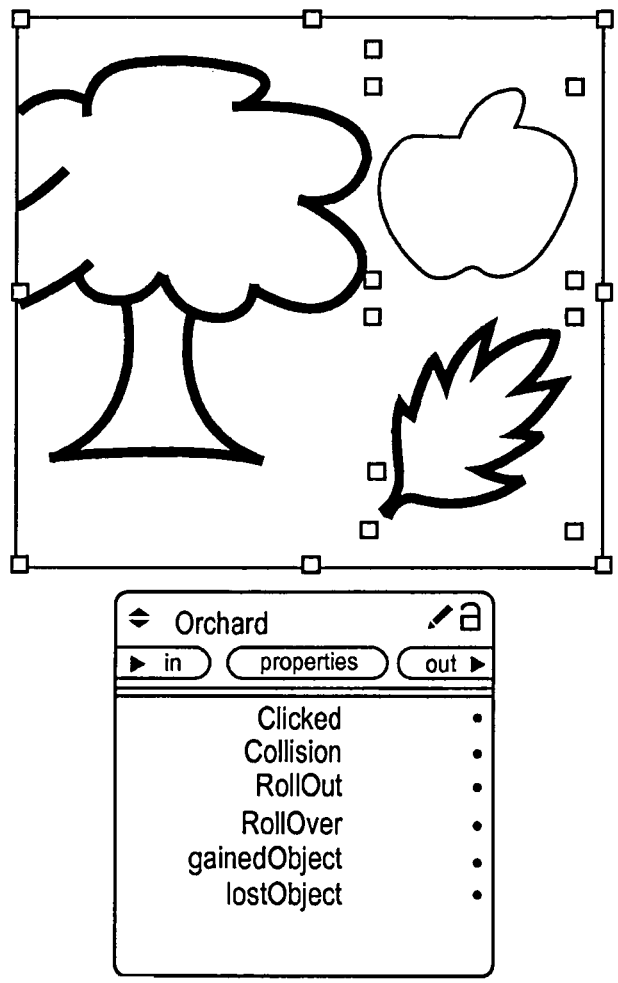
Figure 7B:
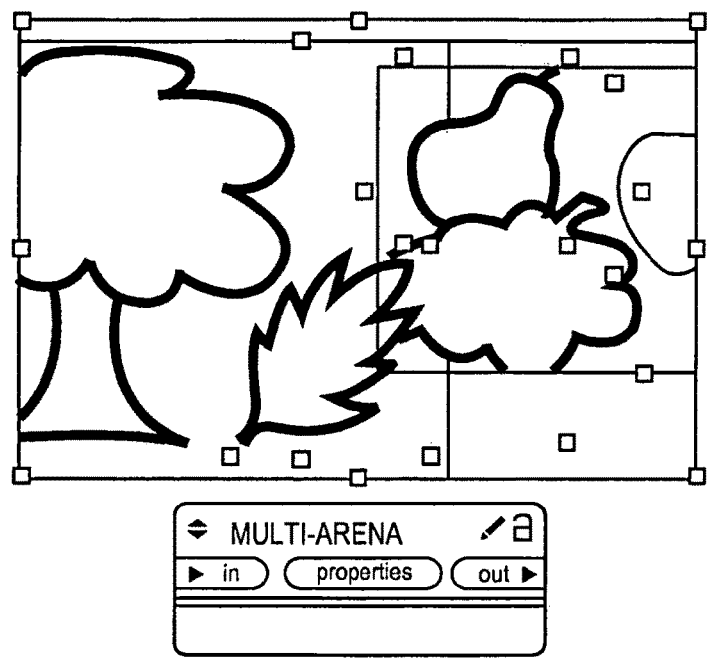
Figure 7D:
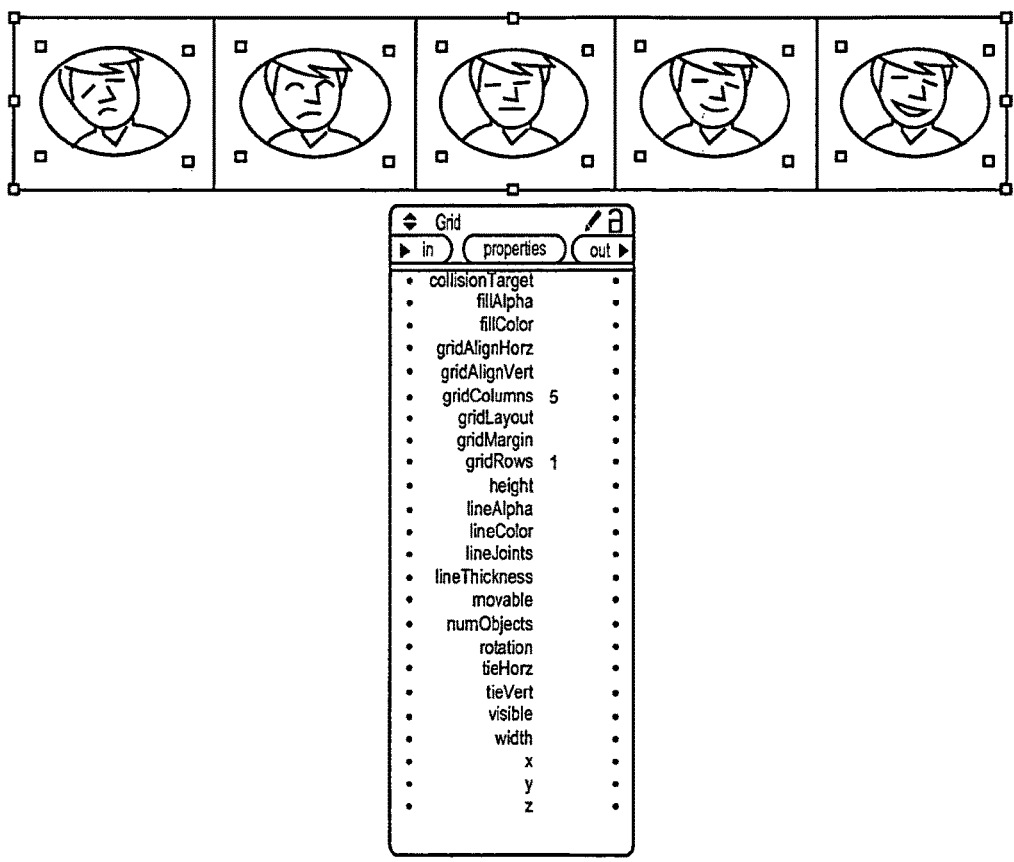

FIG. 7A shows an exemplary arena that holds a group of three objects where the arena clips the portion of the object group that exceeds the arena boundary; FIG. 7B shows an exemplary arena that holds two other exemplary arenas; FIG. 7C shows an exemplary arena that has three pages to form a flipbook; and FIG. 7D shows five exemplary arenas that form a grid.

Figure 3:
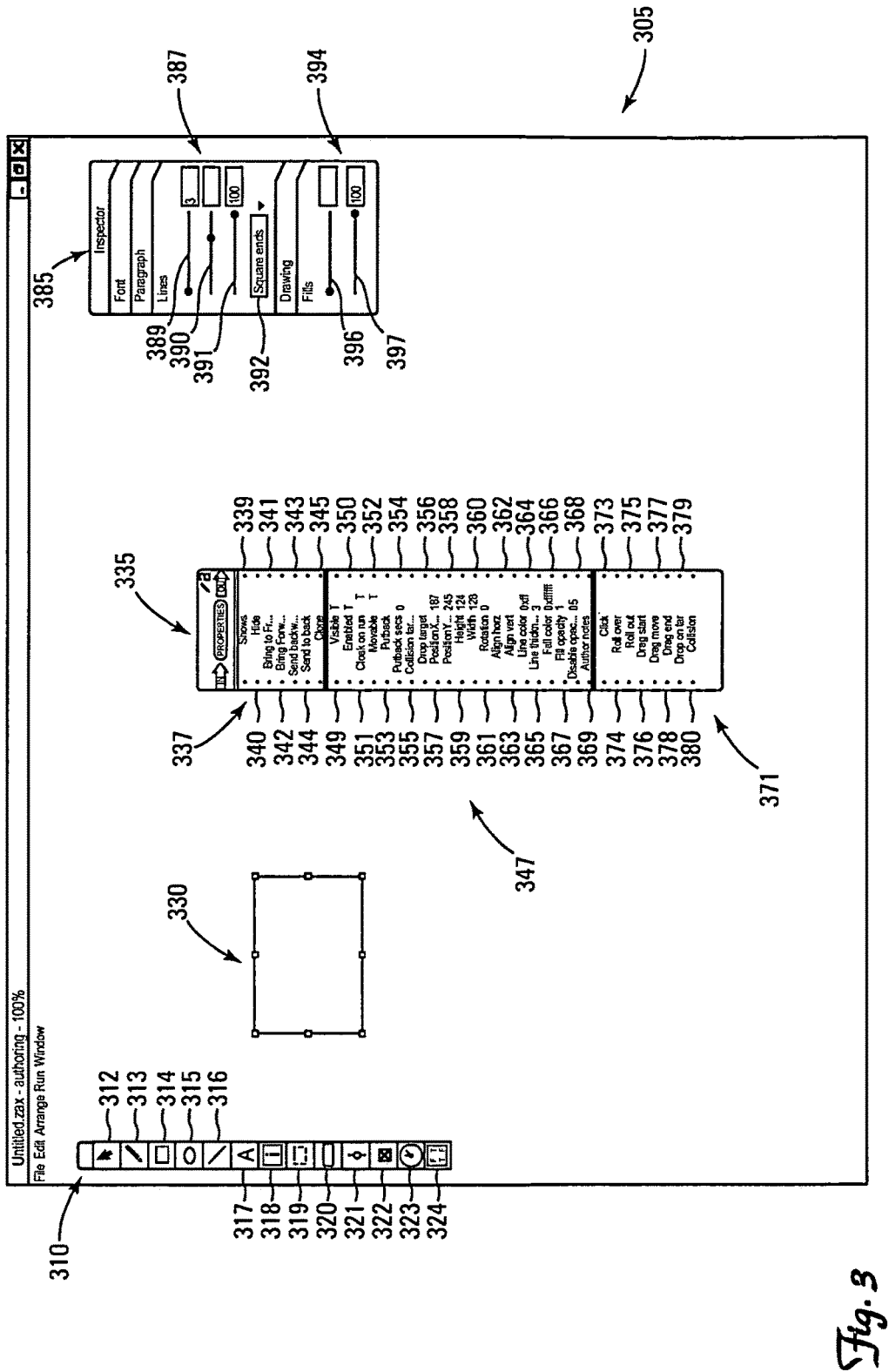
FIG. 3 is an example screenshot of an exemplary GUI for creating various objects.
Figure 8A:
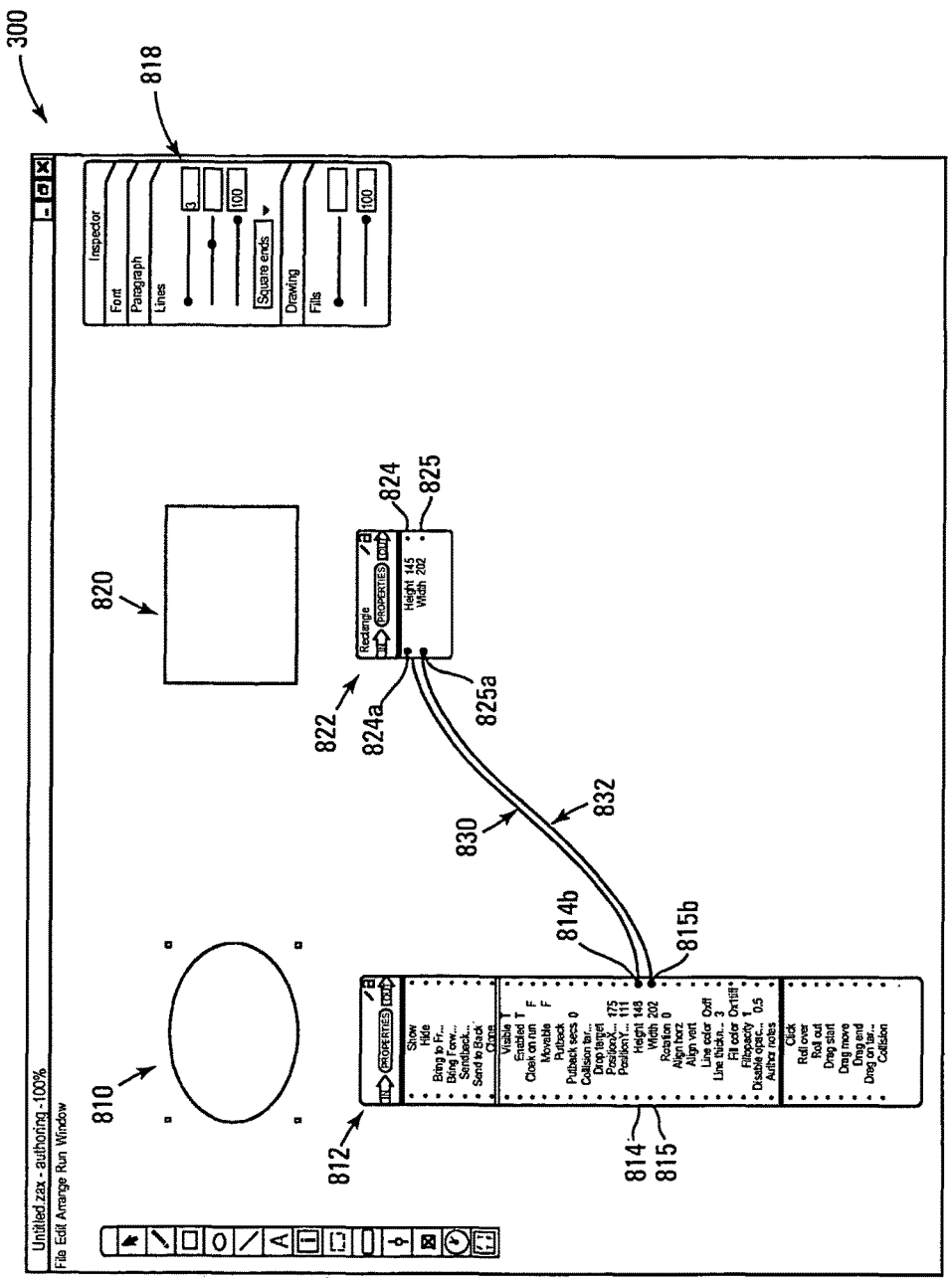
Figure 8B:
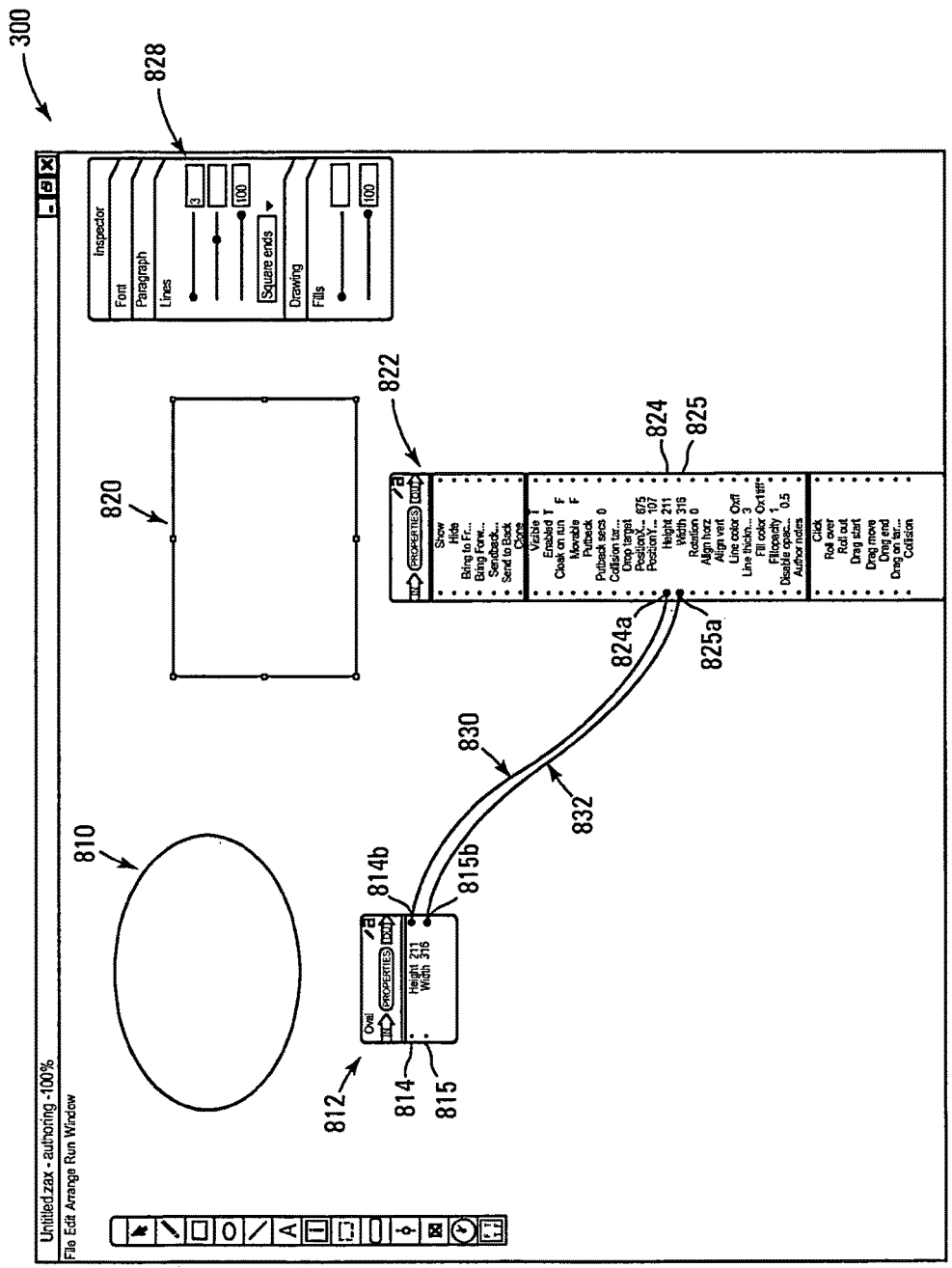

FIGS. 8A-8B are two example screenshots of the exemplary GUI shown in FIG. 3 for creating two binding connections between two properties of one object and two properties of another object.

Figure 9A:
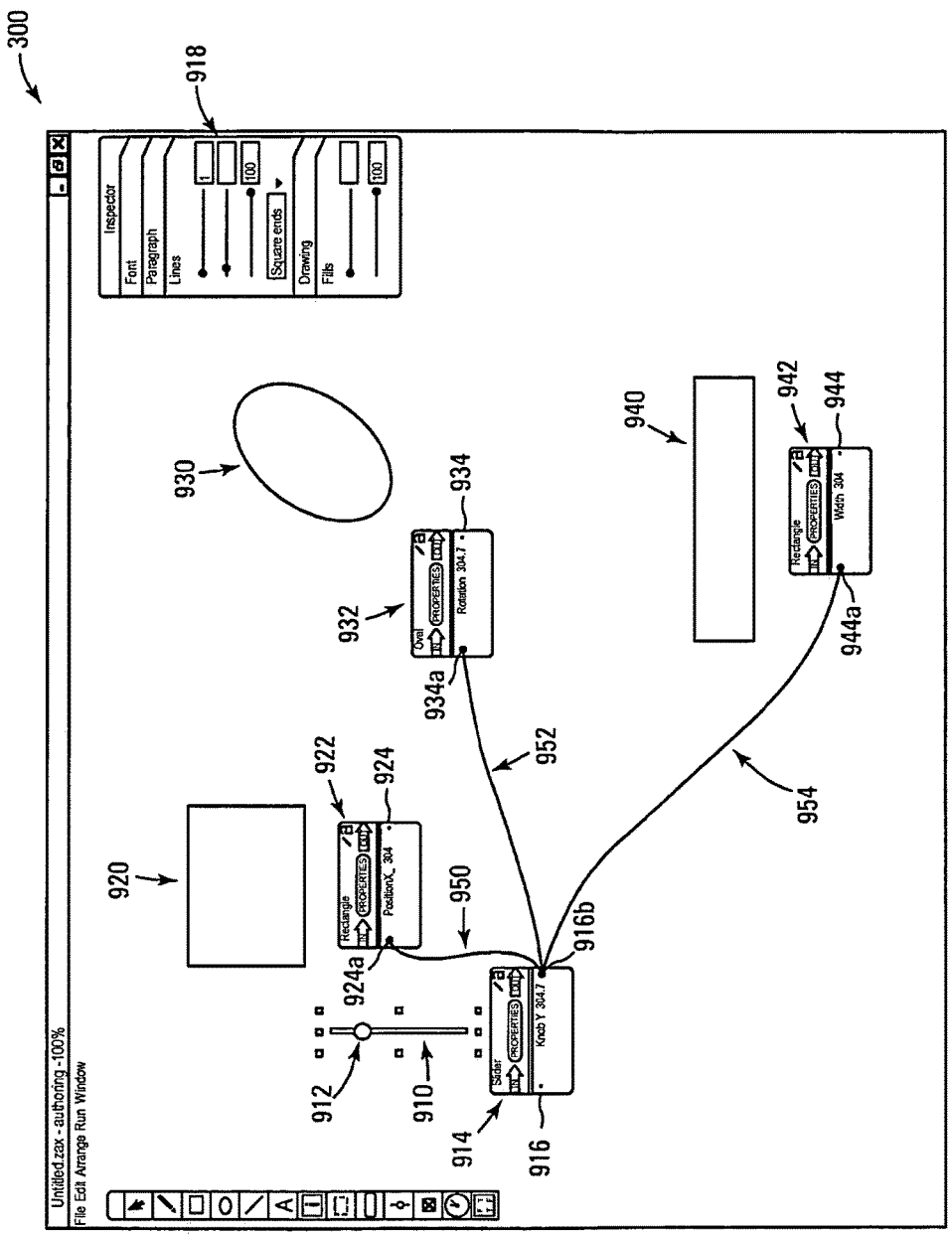
Figure 9B:
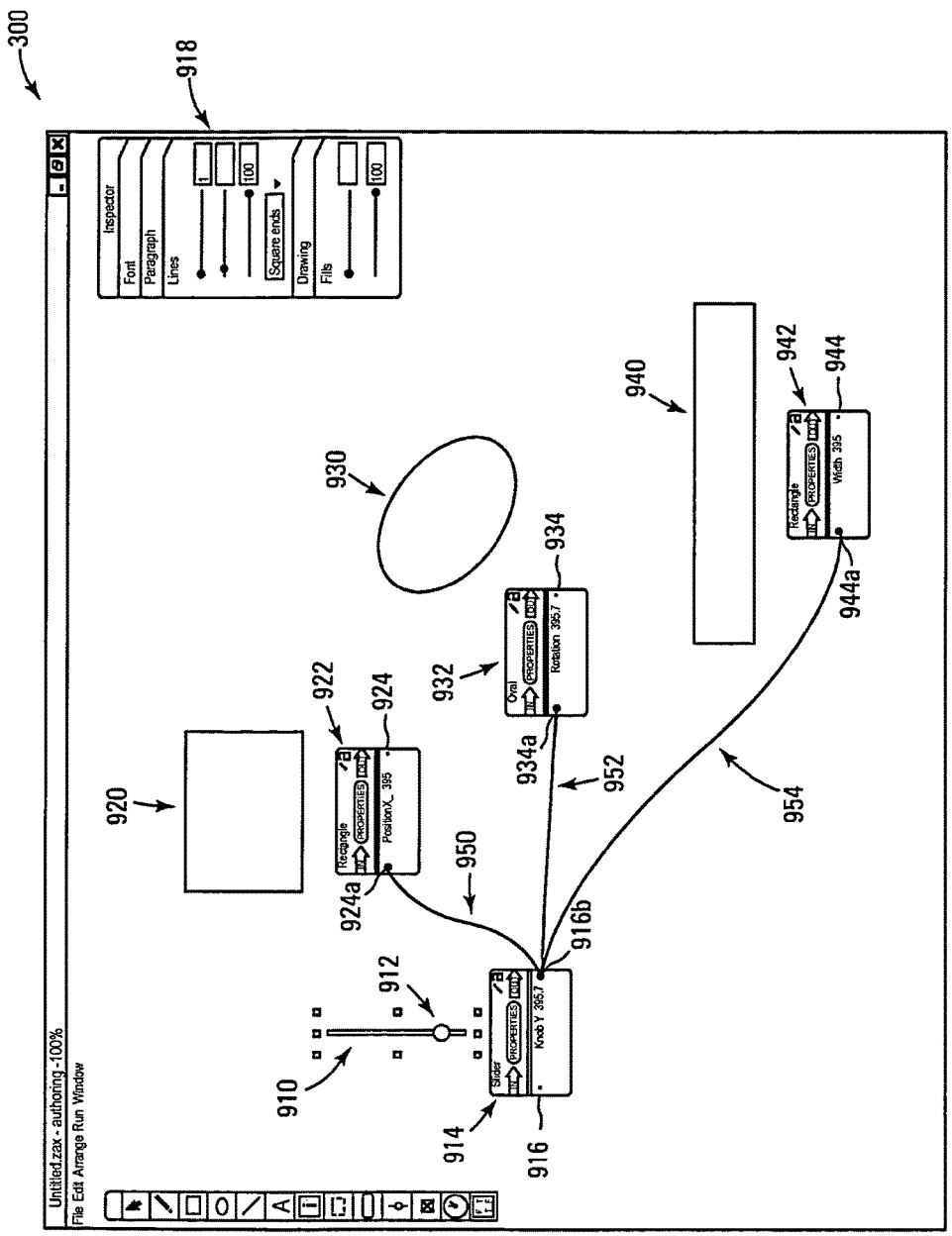

FIGS. 9A-9B are two example screenshots of the exemplary GUI shown in FIG. 3 for creating three binding connections between a property of one object and three properties of three other objects.

FIGS. 10A-10D are four example screenshots of the exemplary GUI shown in FIG. 3 for creating two binding connections between two properties of two objects and two properties of another object.

FIGS. 11A-11D are four example screenshots of the exemplary GUI shown in FIG. 3 for creating two binding connections linking three objects in series.

Figure 12A:
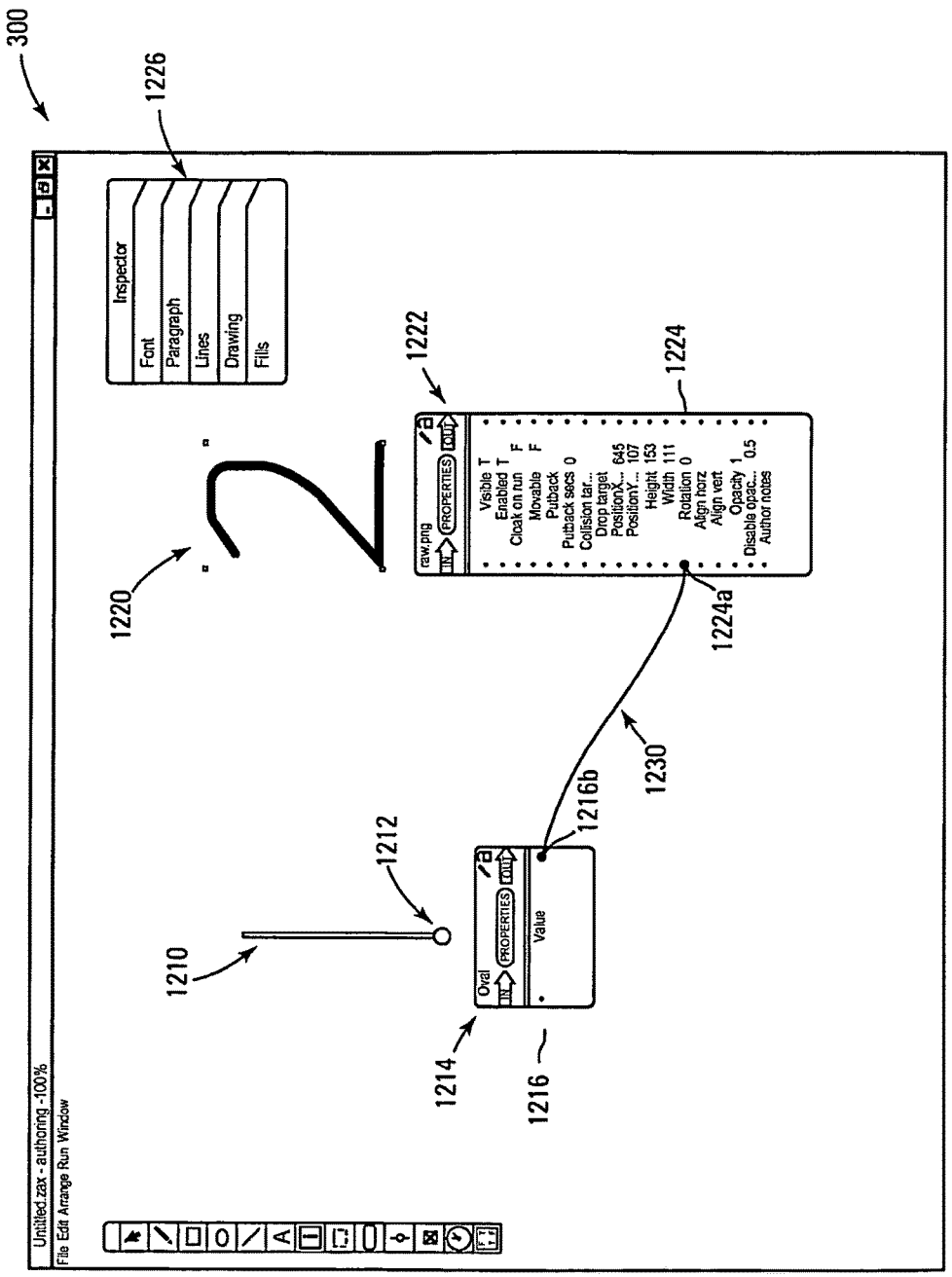
Figure 12B:
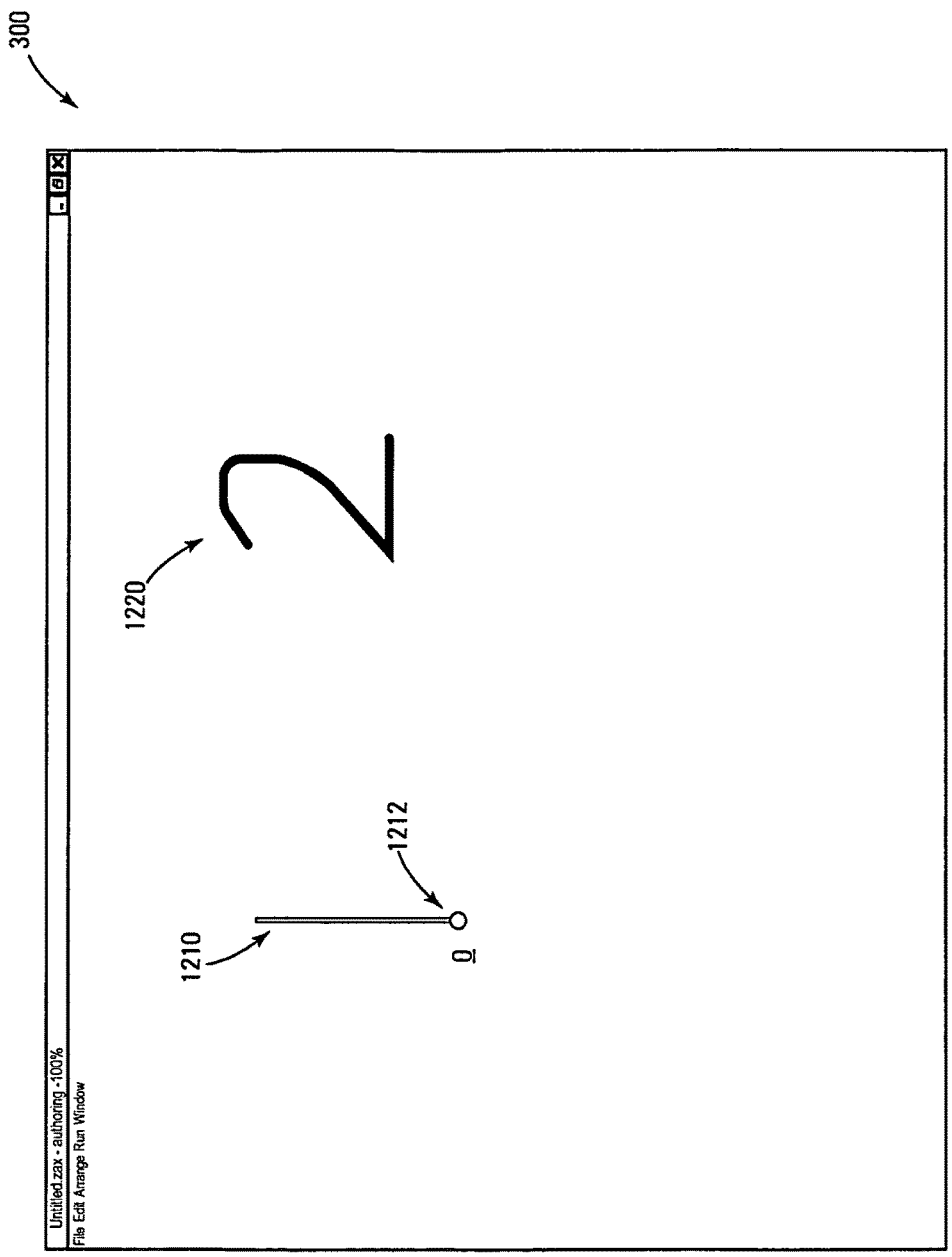
Figure 12A:
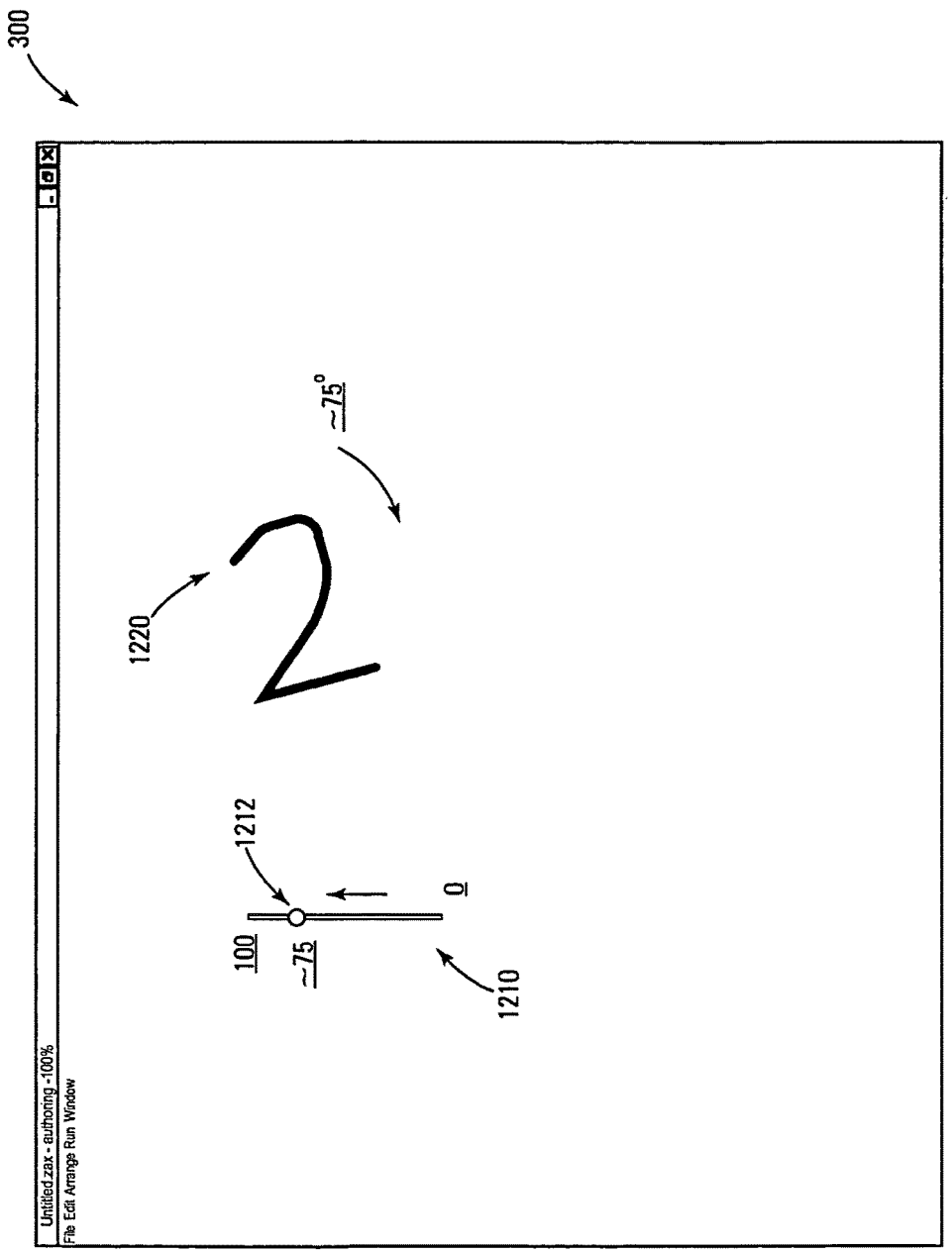

FIGS. 12A-12C are three example screenshots of the exemplary GUI shown in FIG. 3 for changing a property of one object at runtime by varying a property of another object via a binding connection created while authoring that links the two objects.

Figure 13A:
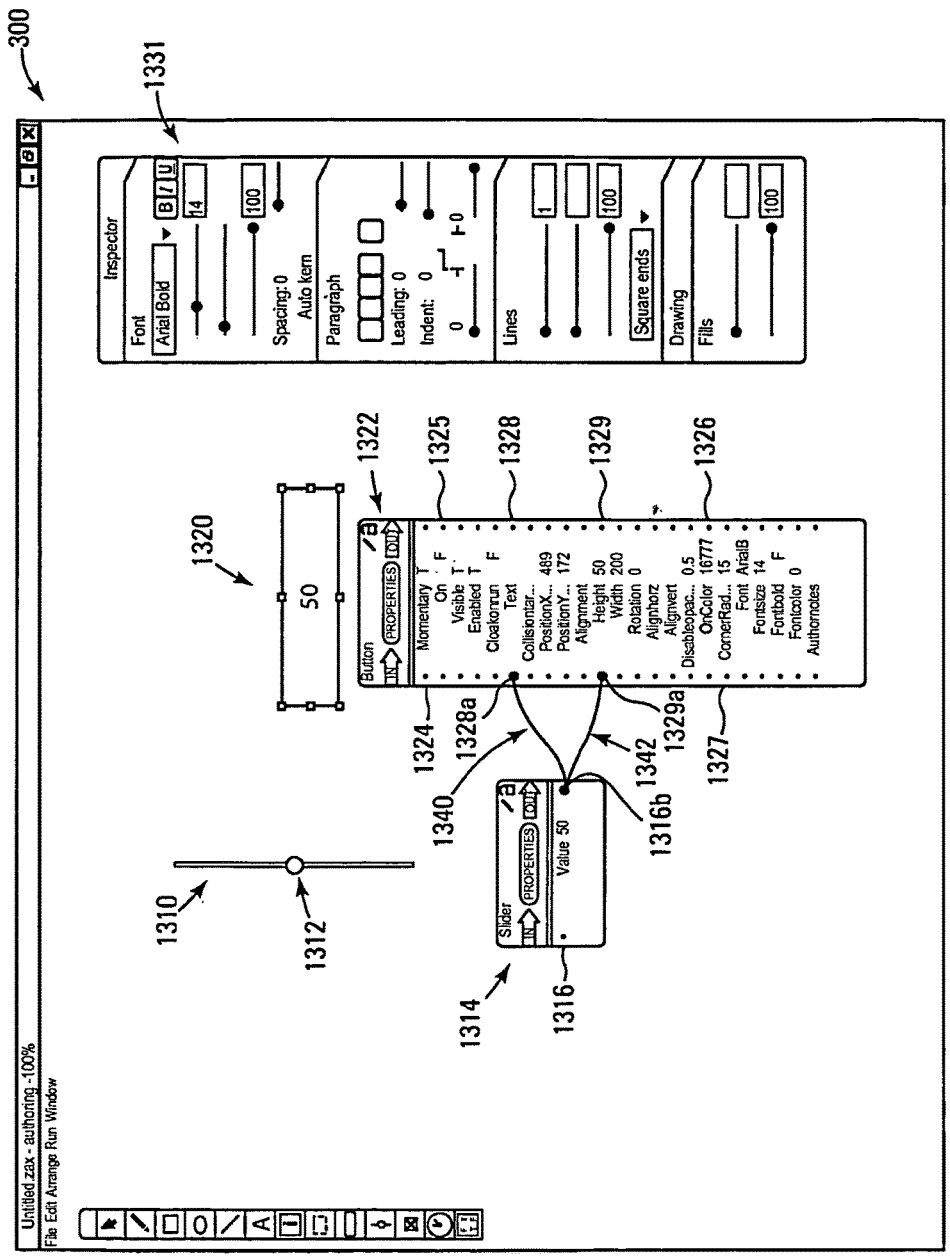
Figure 13B:
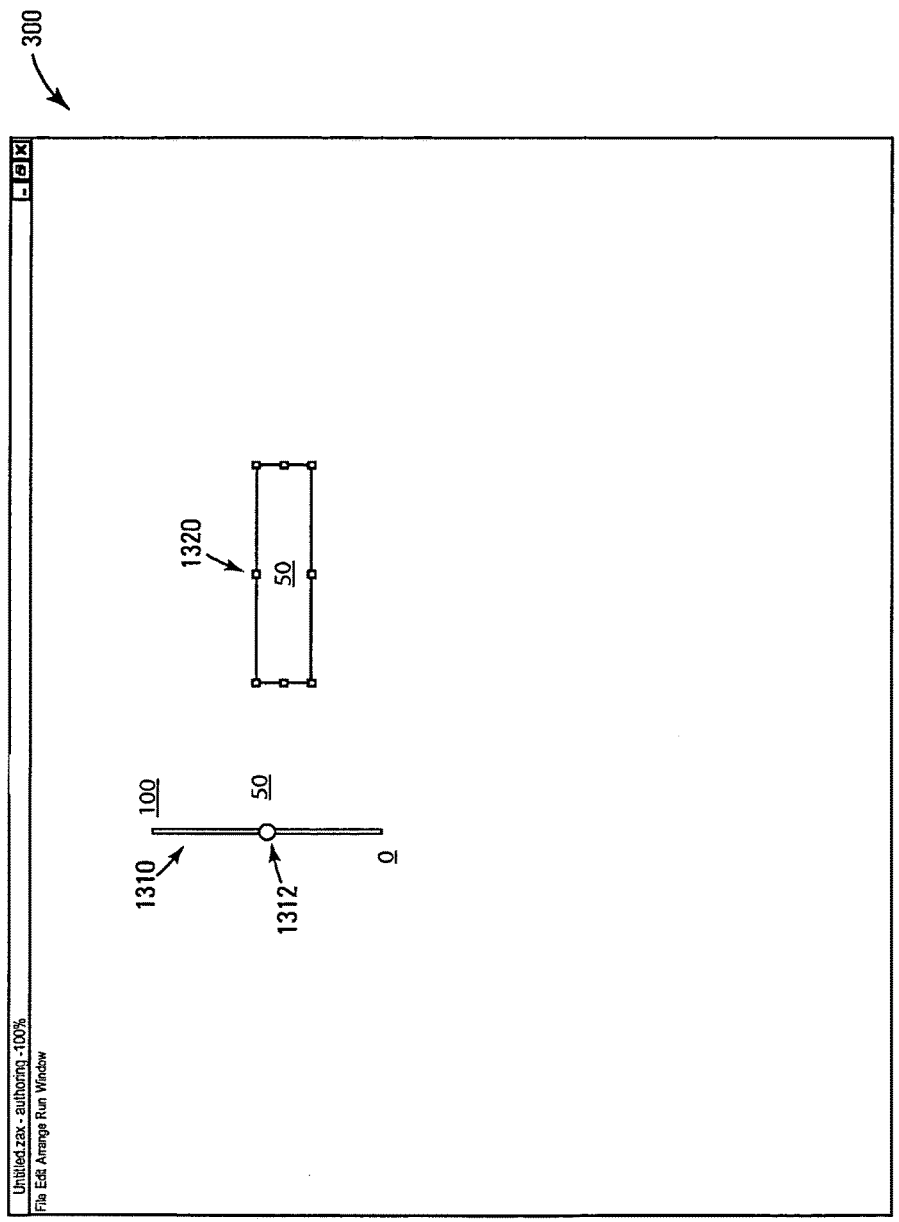
Figure 13A:
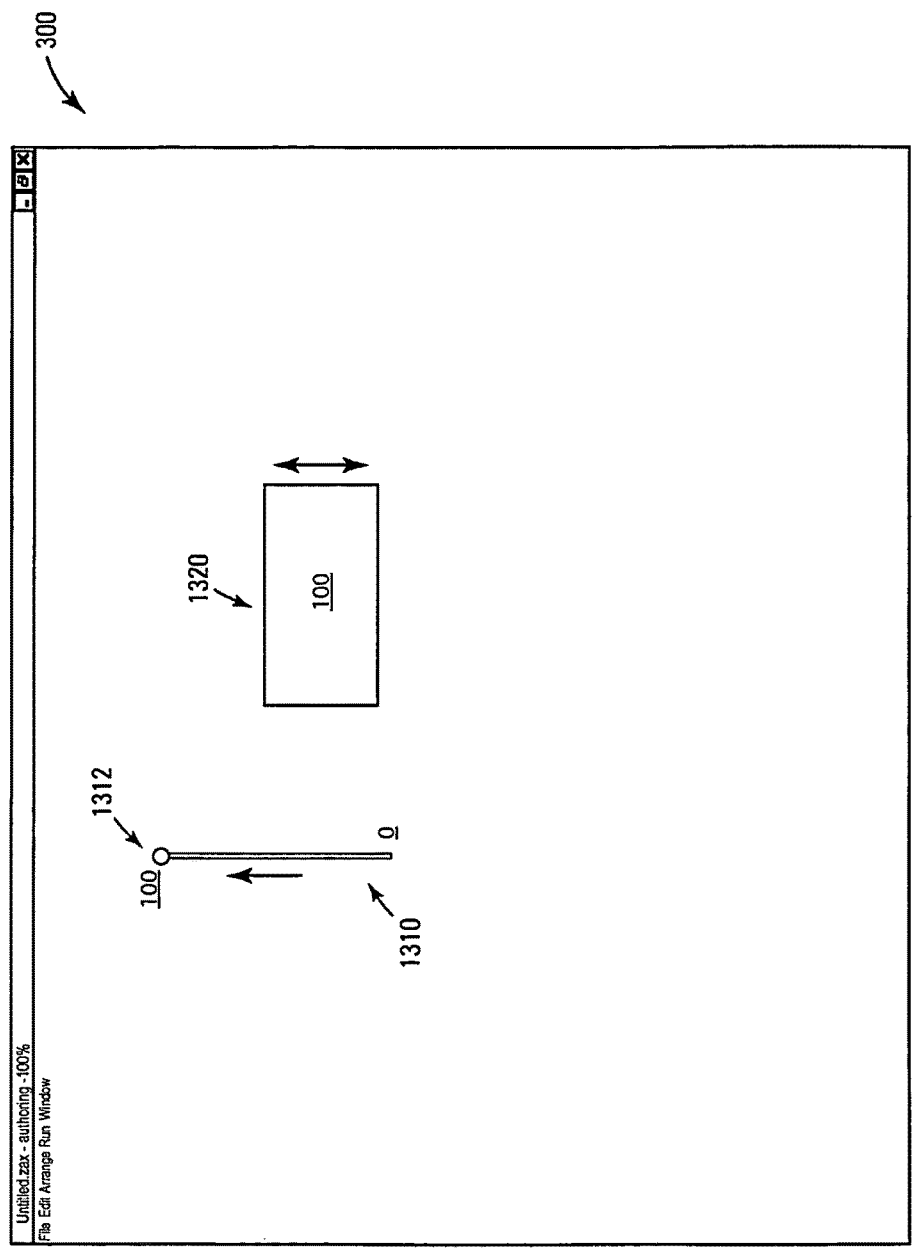

FIGS. 13A-13C are three example screenshots of the exemplary GUI shown in FIG. 3 for changing two properties of one object at runtime by varying a property of another object via two binding connections created while authoring that link the two objects.

Figure 14A:
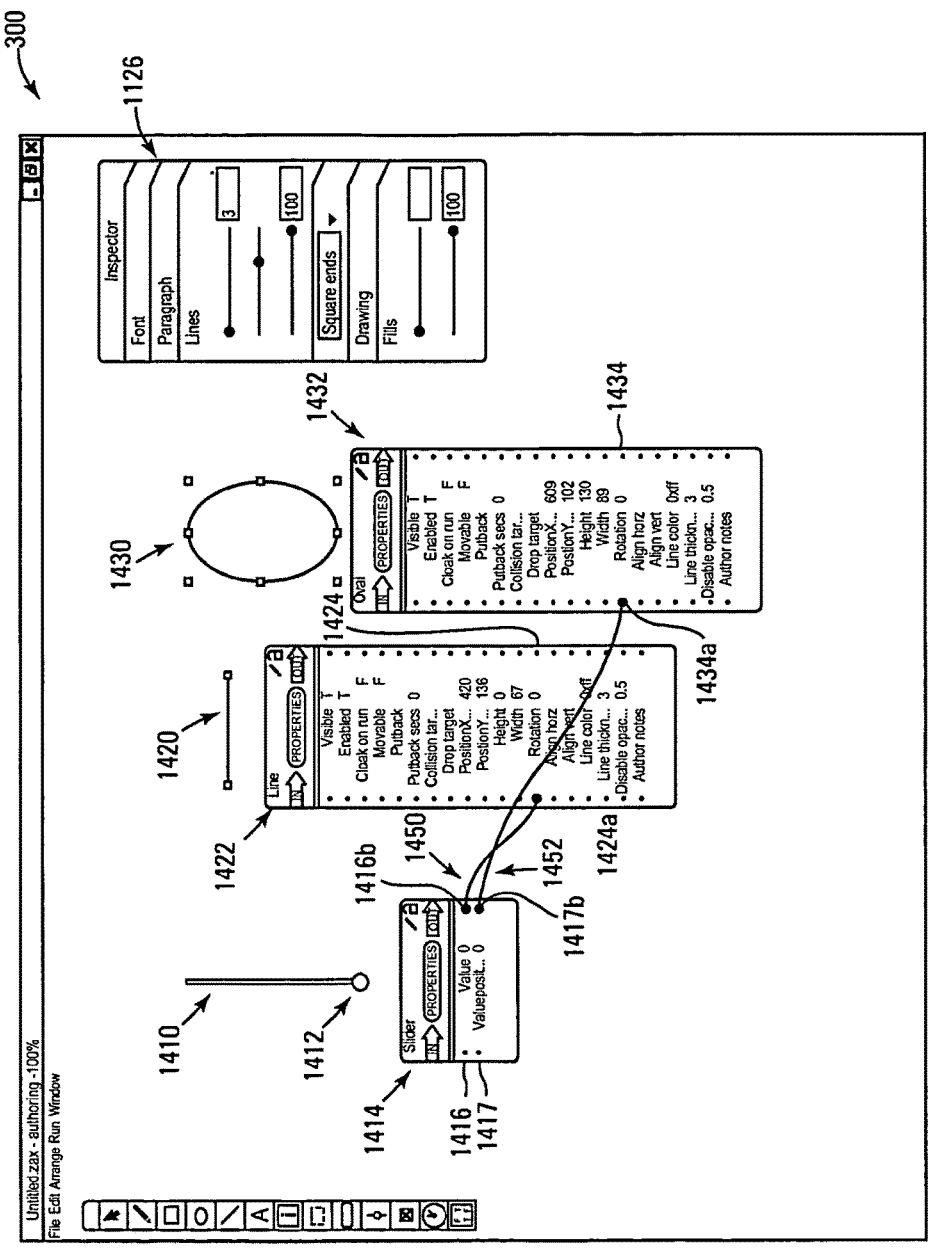
Figure 14B:
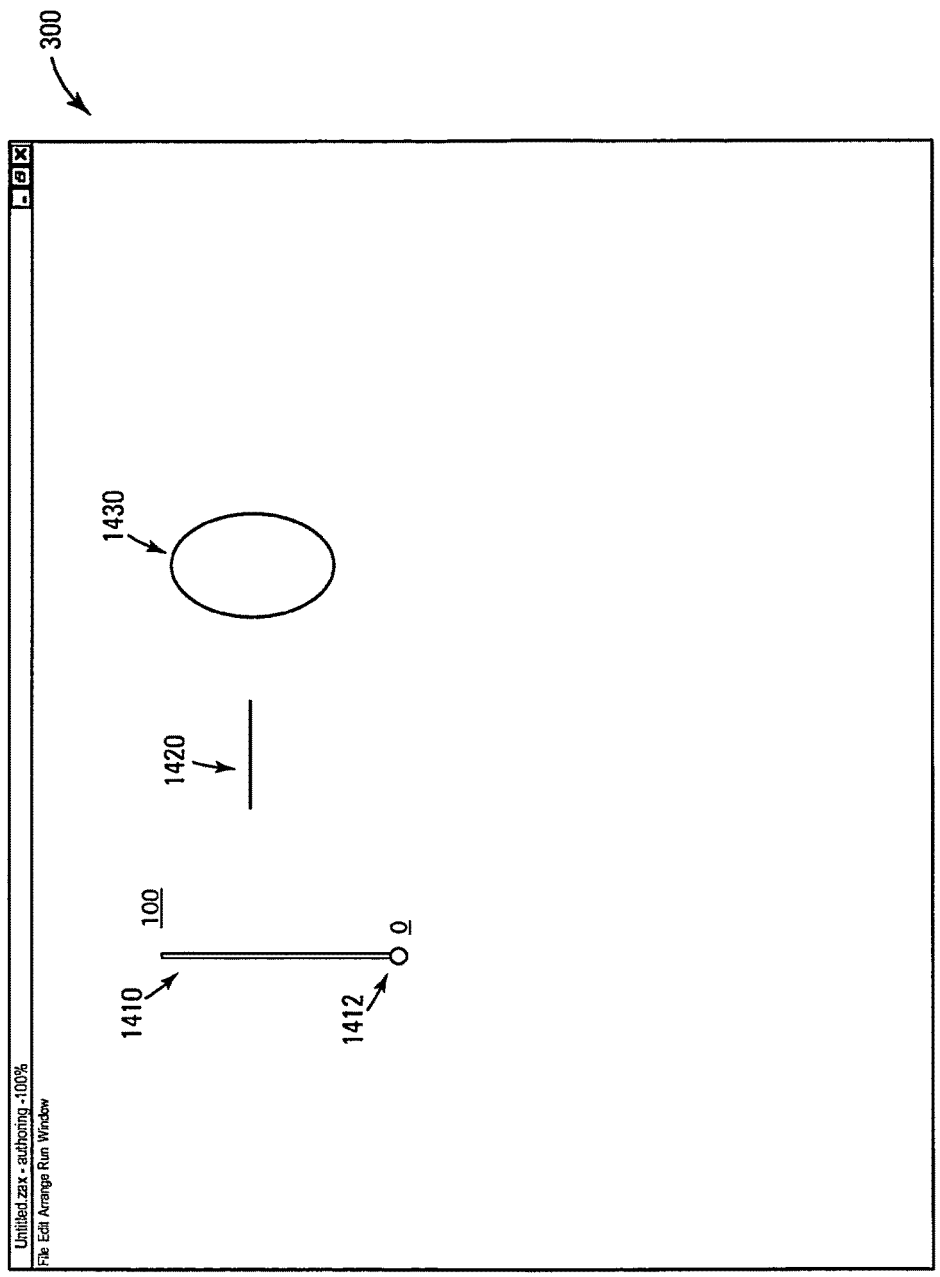
Figure 14A:
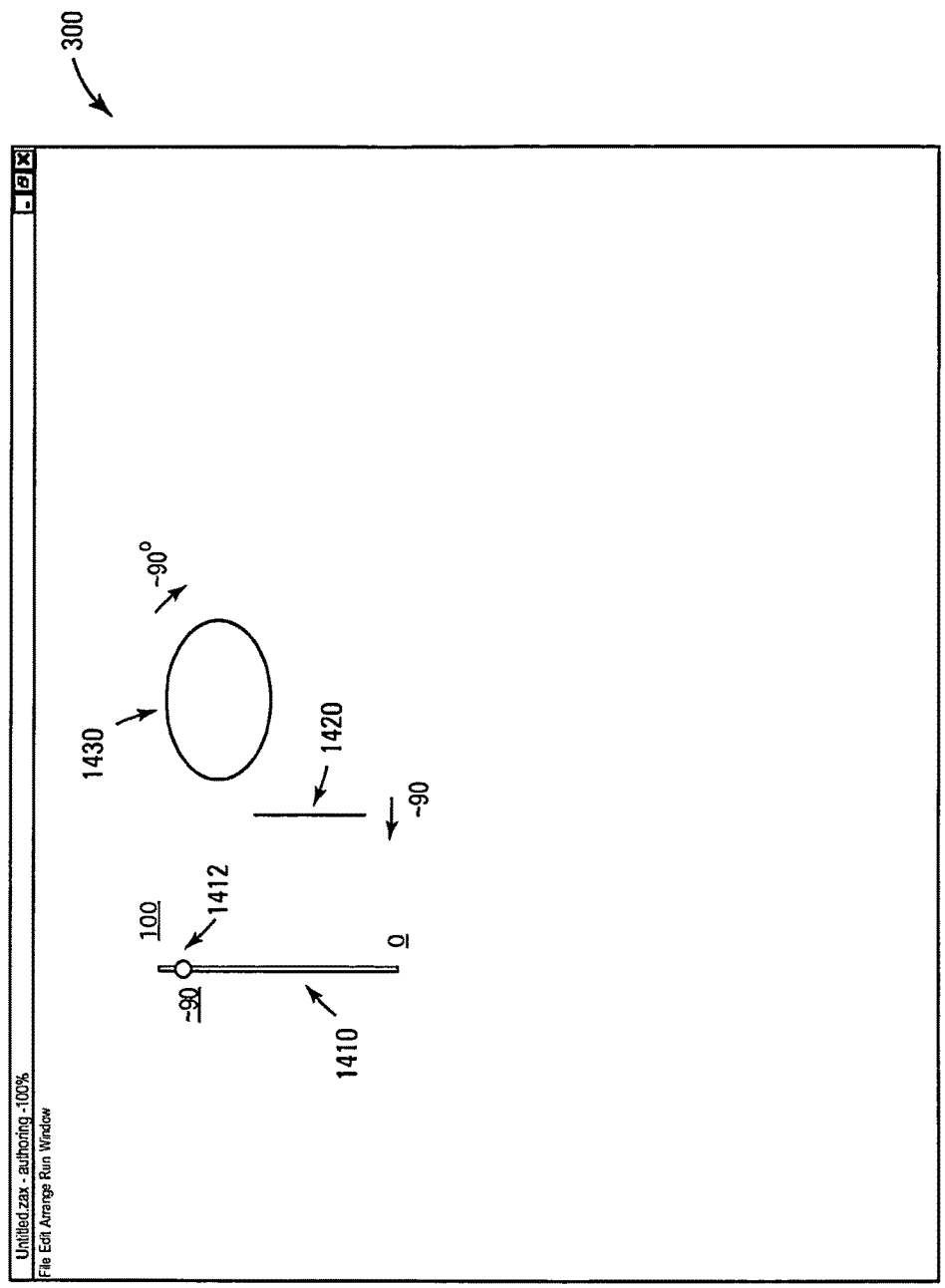

FIGS. 14A-14C are three example screenshots of the exemplary GUI shown in FIG. 3 for changing two properties of two objects at runtime by varying two properties of another object via two binding connections created while authoring that link the two objects with the another object.

FIGS. 15A-15D are four example screenshots of the exemplary GUI shown in FIG. 3 for changing a state of one object during authoring or at runtime by varying a state of another object via a binding connection created while authoring that links the two objects.

Figure 16:
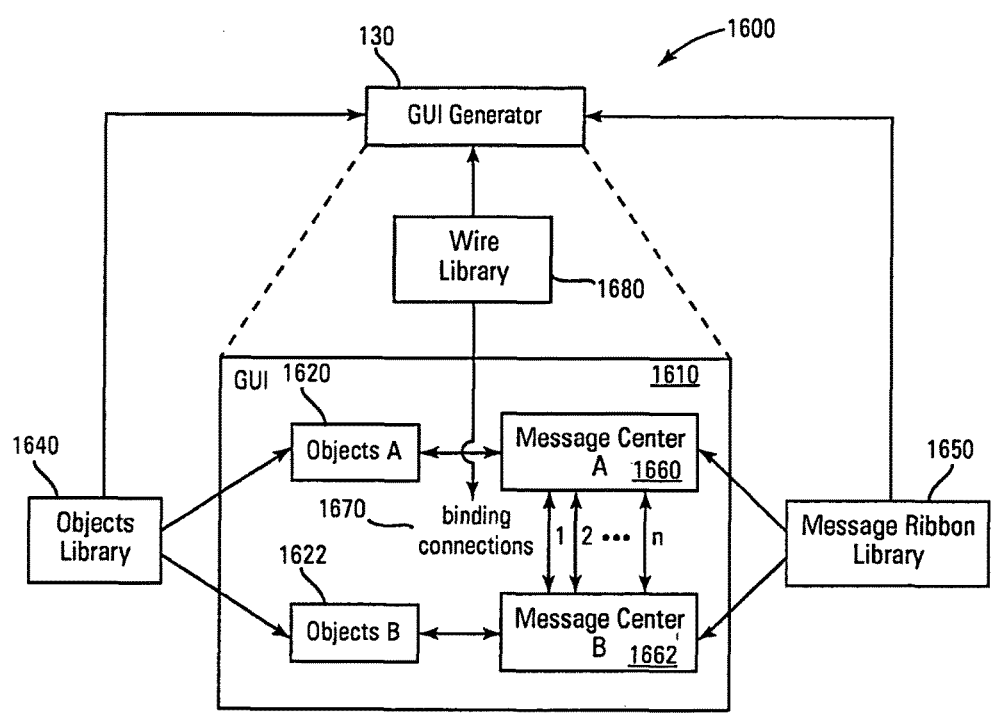

FIG. 16 is an example of a system for generating an exemplary GUI that can be used to wire and bind two objects.

Figure 17:
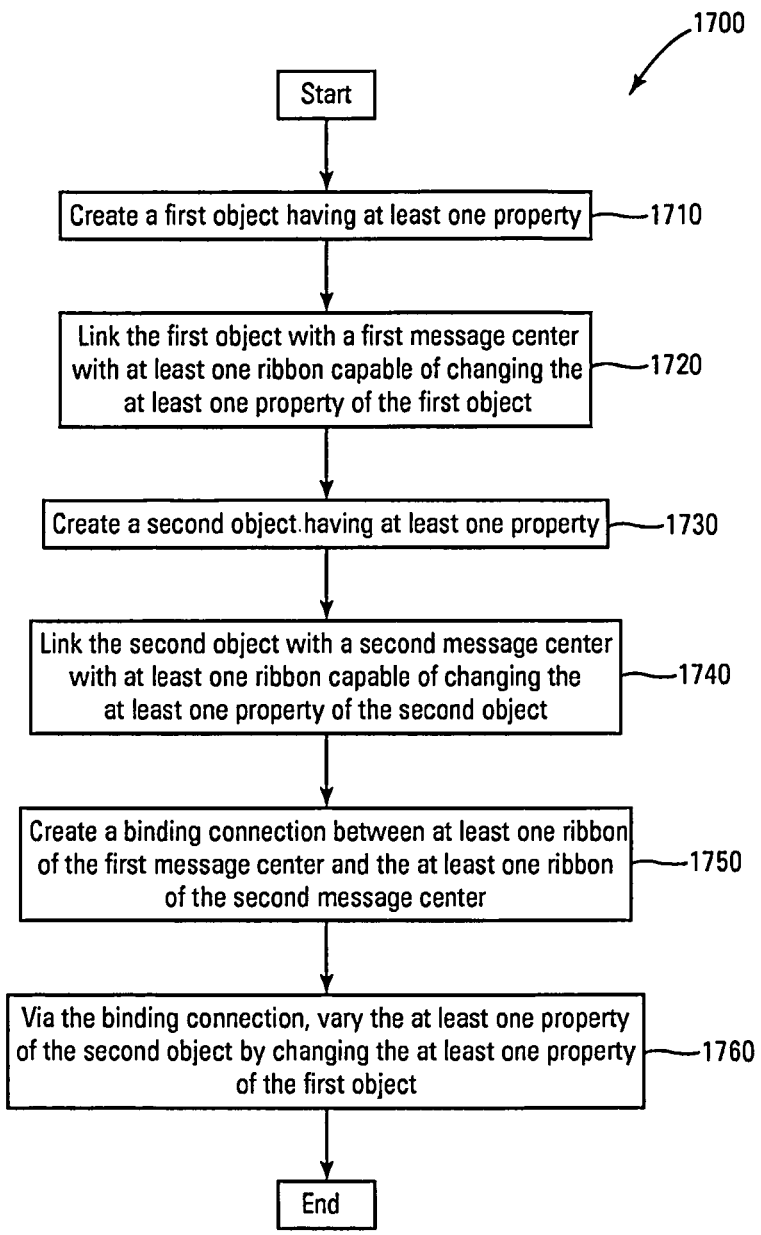

FIG. 17 is a flow chart of an exemplary method for implementing the exemplary system shown in FIG. 16.

Figure 18:
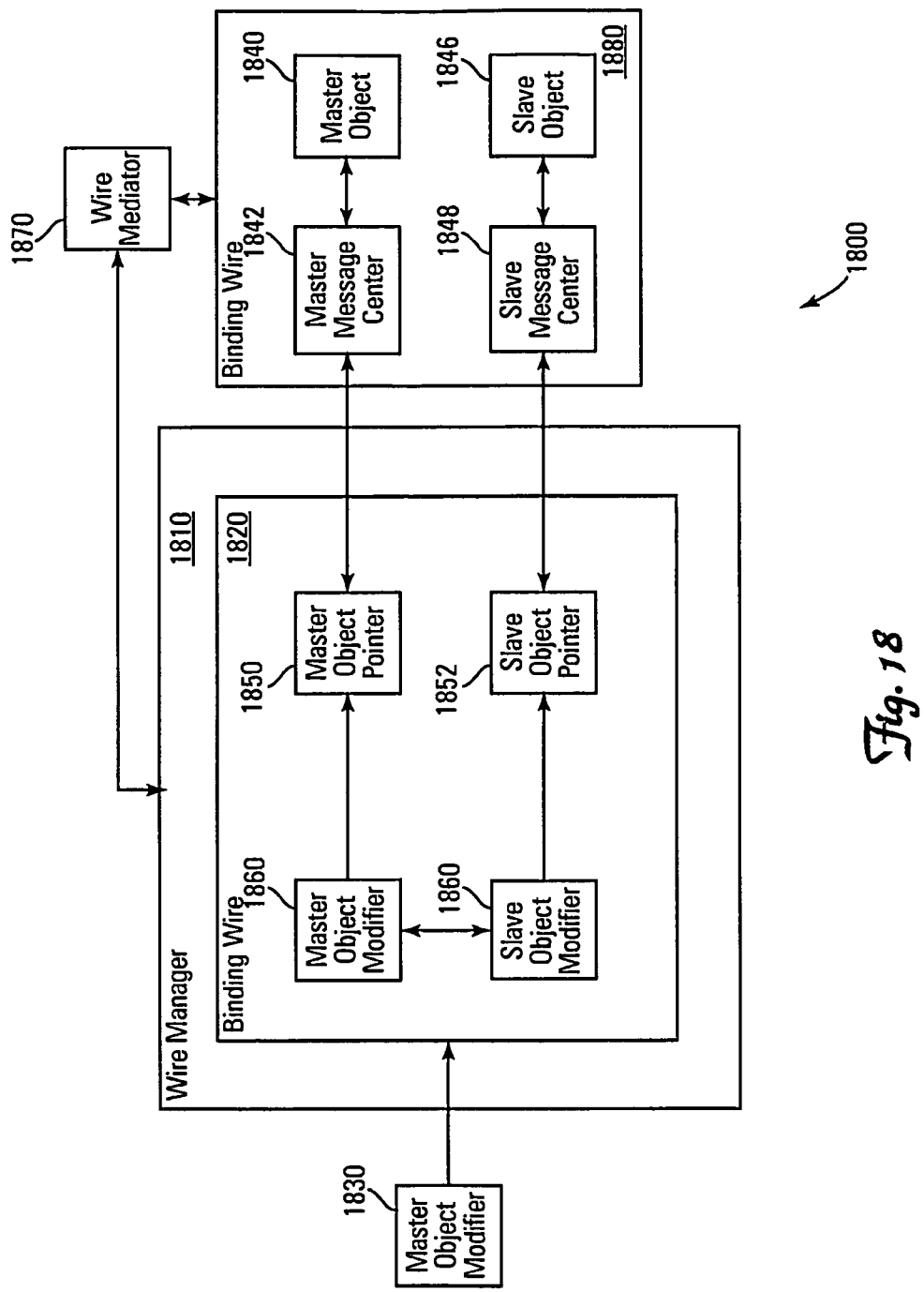

FIG. 18 is an example of a subsystem for creating and implementing a binding connection.

Figure 19:
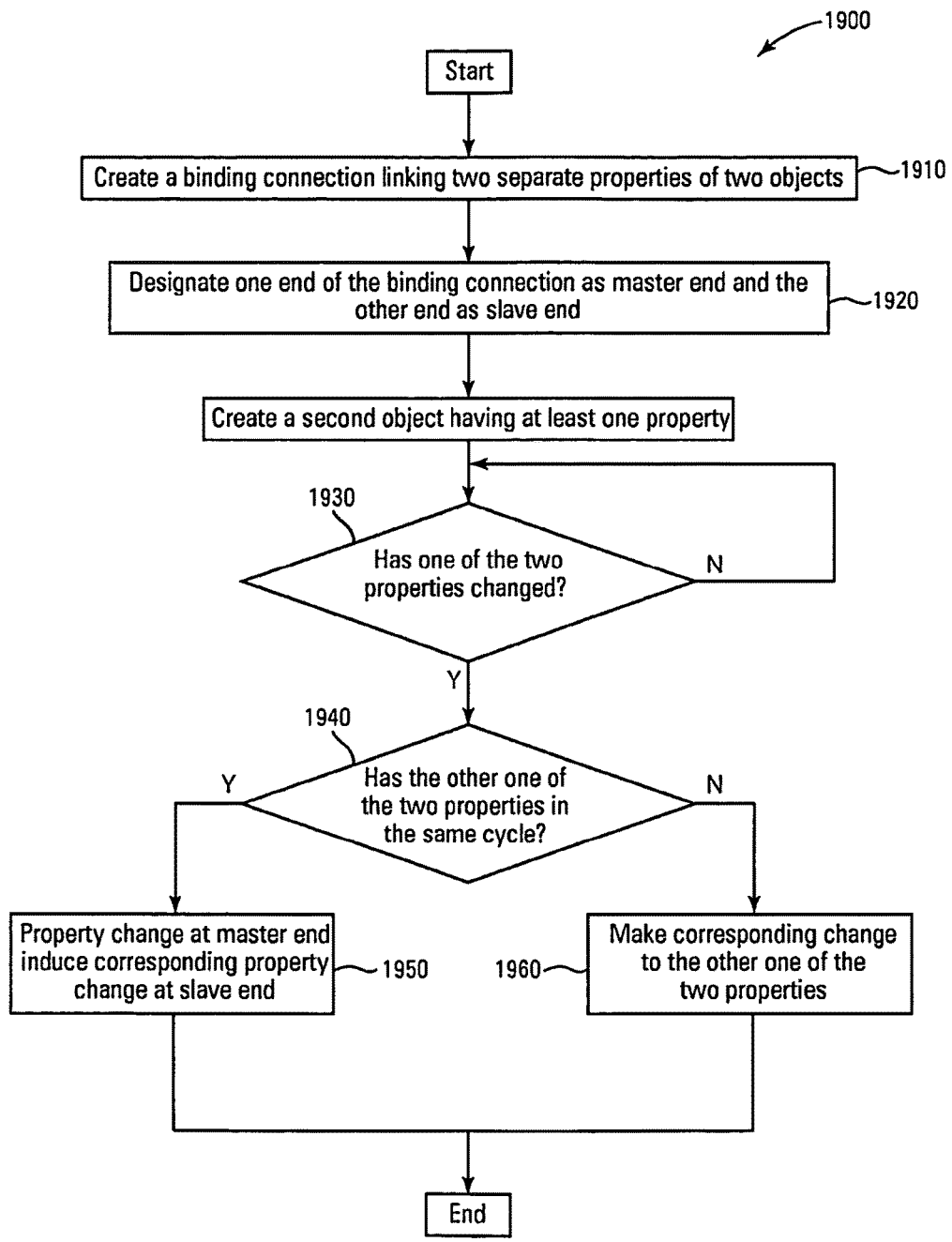

FIG. 19 is a flow chart of an exemplary method for customizing the binding direction in case of a race condition.

Figure 20:
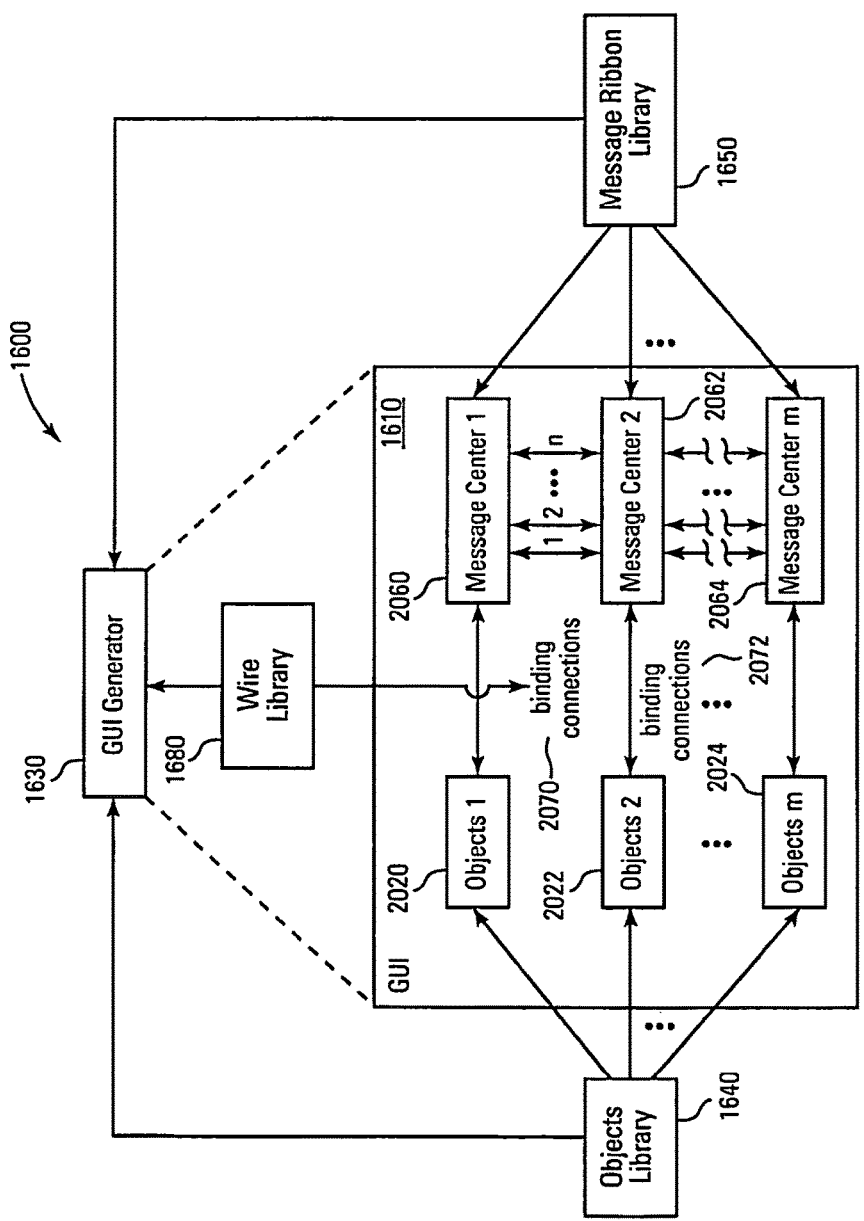

FIG. 20 is an example of a system for generating an exemplary GUI that can be used to wire and bind three or more objects in series.

Figure 21:
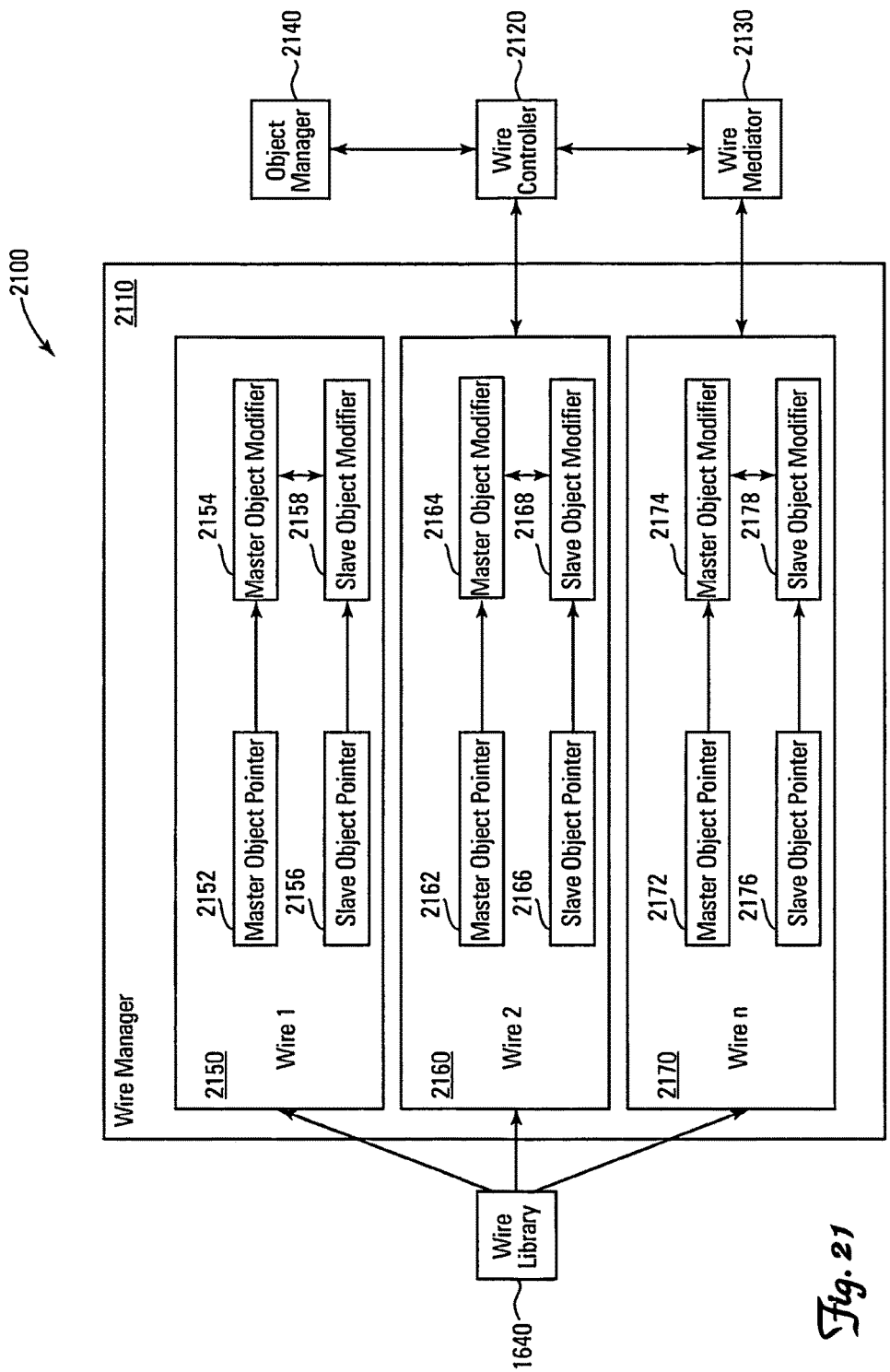

FIG. 21 is an example of a subsystem for creating and implementing binding connections between three or more objects linked in series.

Figure 22:
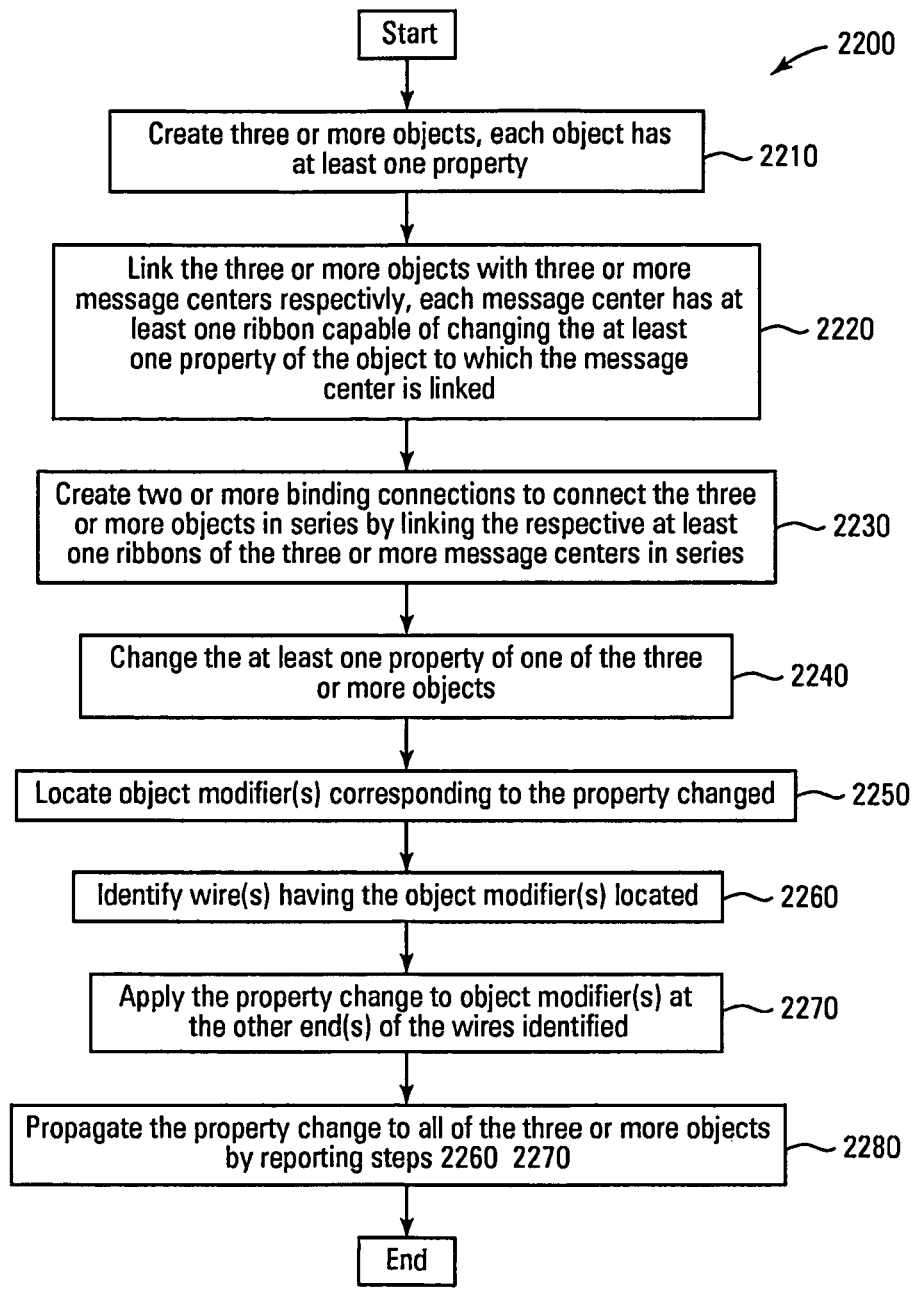

FIG. 22 is a flow chart of an exemplary method for propagating a property or state change among three or more objects linked in series.

Figure 23:
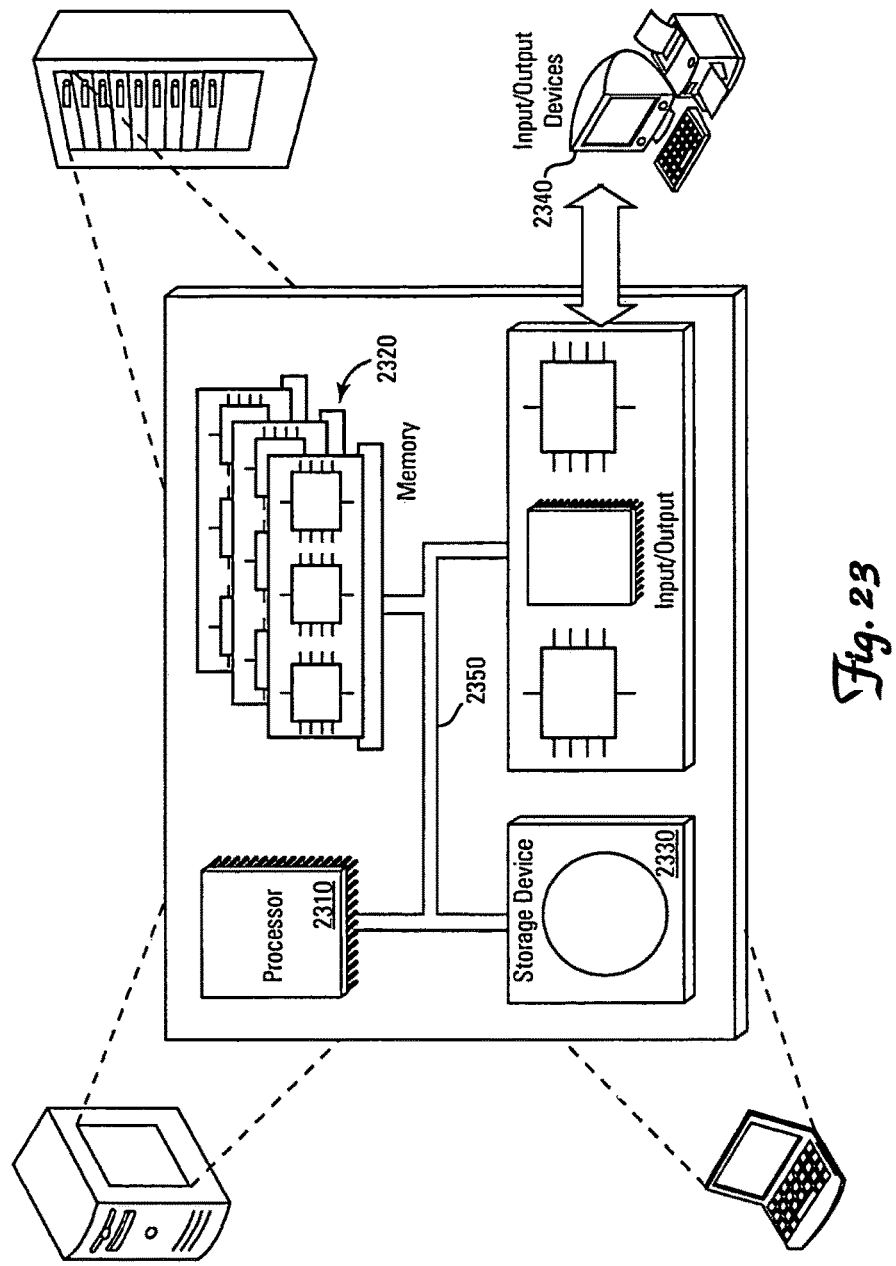

FIG. 23 is an example of a computing device that can be used to implement the systems and methods described herein.

Figure 24:
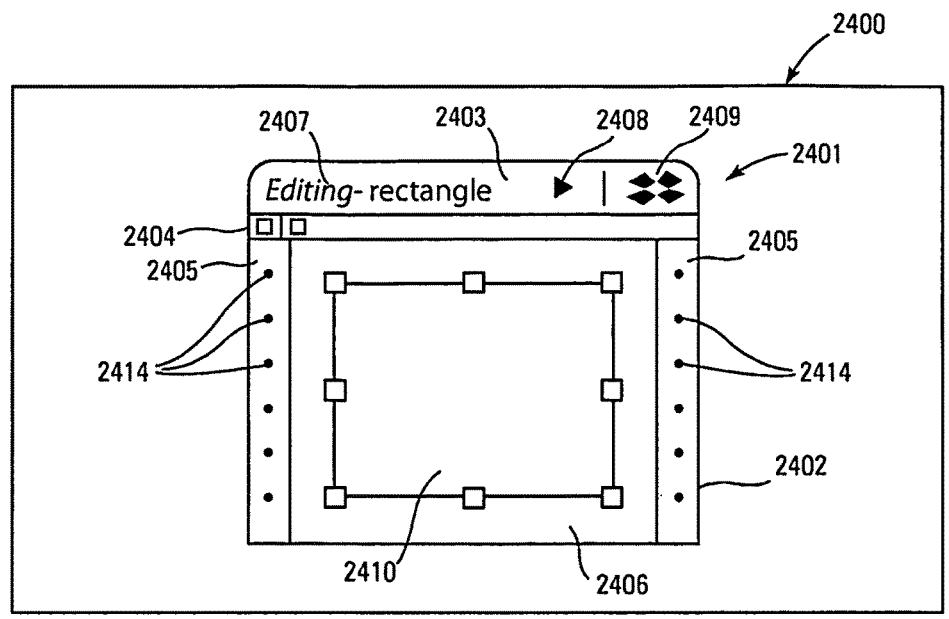

FIG. 24 is an exemplary screenshot of a GUI that includes an interactive object.

Figure 25:
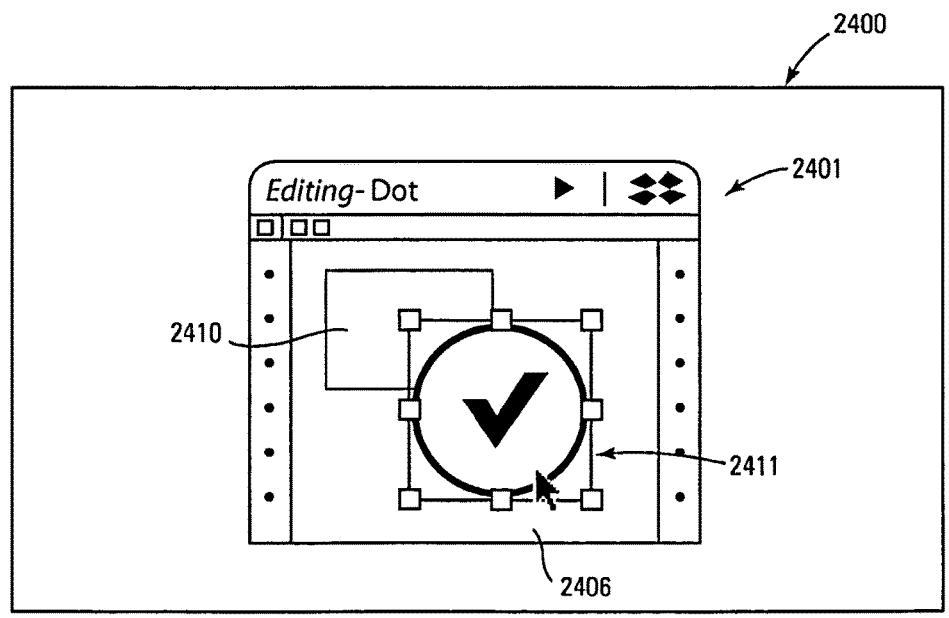

FIG. 25 is an exemplary screenshot of a GUI that includes an interactive object.

Figure 26A:
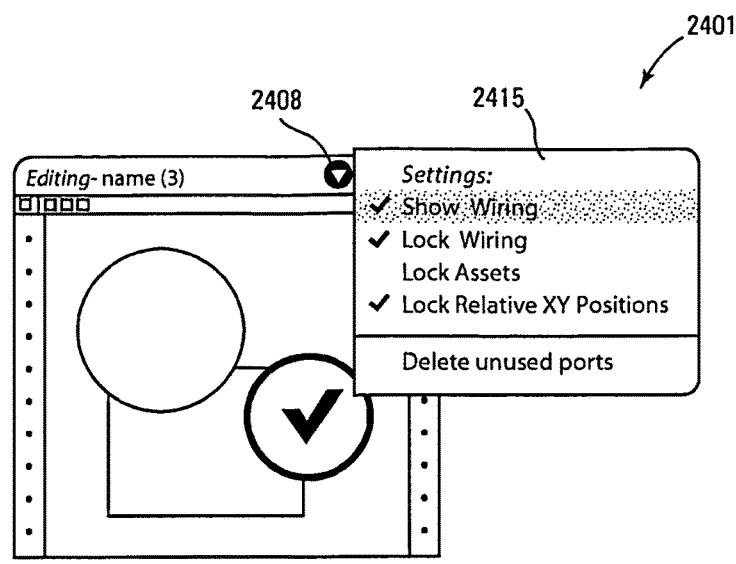
Figure 26B:
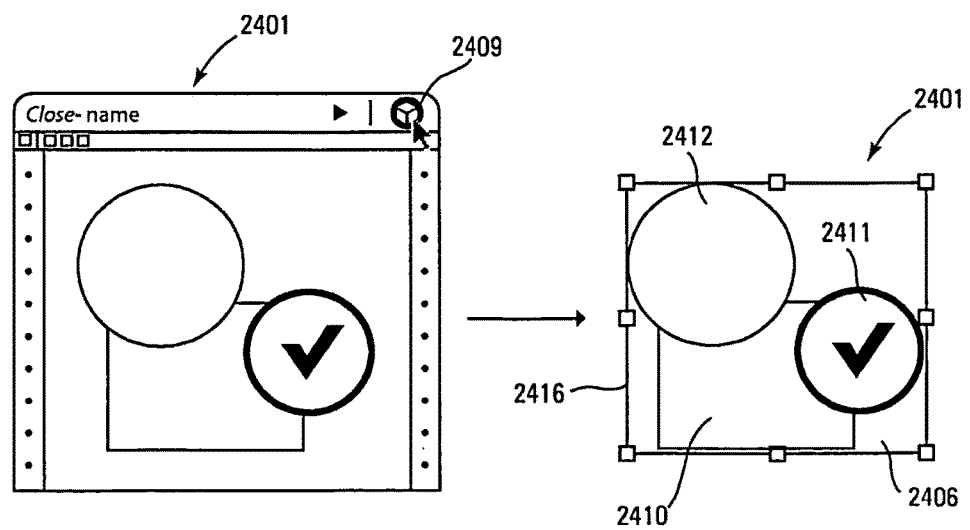

FIGS. 26A-26B are exemplary screenshots of an interactive object, according to one embodiment.

FIGS. 27A-27B are exemplary screenshots of an interactive object with a crumble bar, according to one embodiment.

Figure 28A:
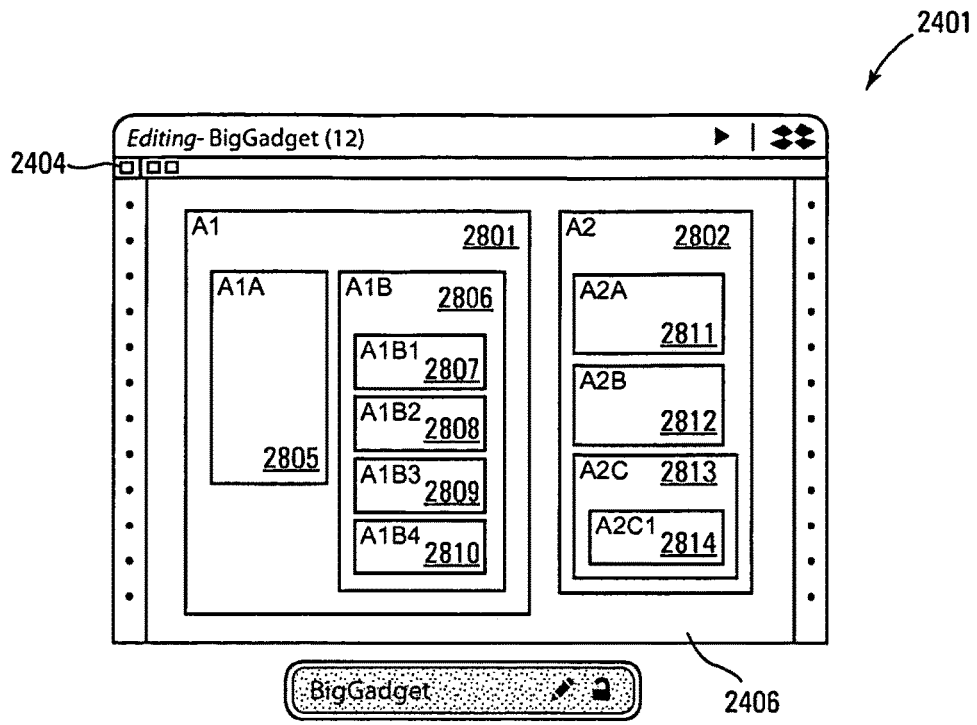
Figure 28B:
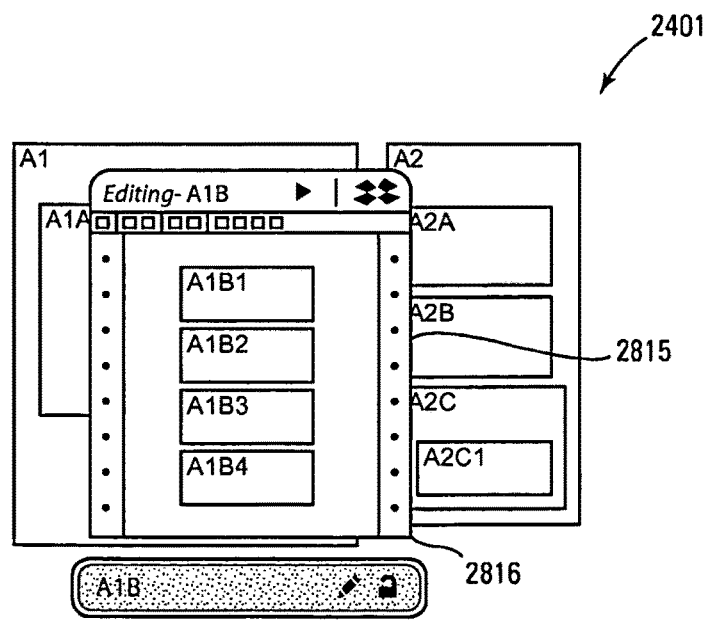

FIGS. 28A-28B are exemplary screenshots of an interactive object that contains other interactive objects, according to one embodiment.

Figure 29:
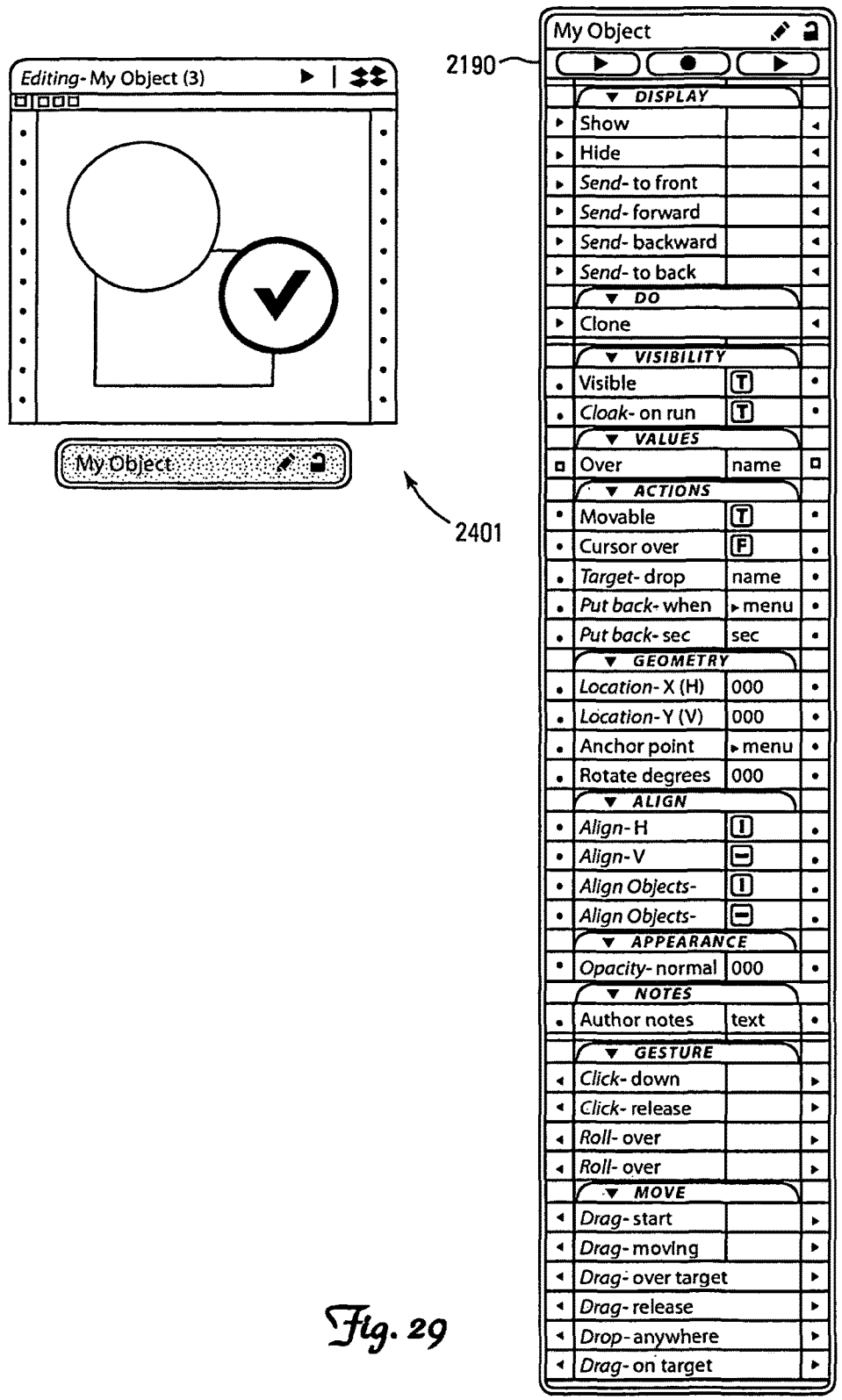

FIG. 29 is an exemplary screenshot of an interactive object and a message center associated with the interactive object, according to one embodiment.

Figure 30:
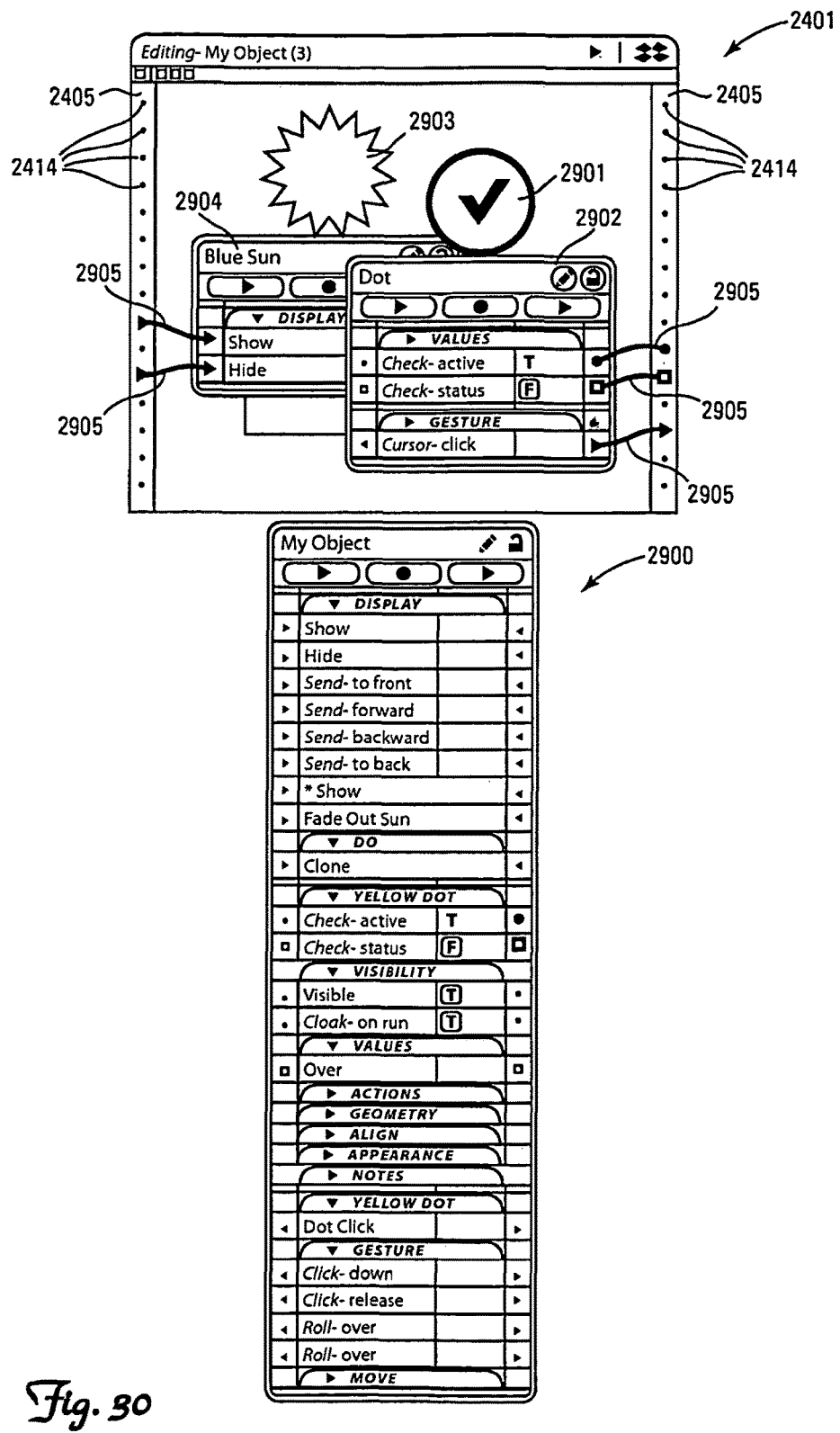

FIG. 30 is an exemplary screenshot of an interactive object that contains objects wired to a port bay of the interactive object and a message center associated with the interactive object, according to one embodiment.

FIGS. 31A-31F are exemplary screenshots of an interactive object that contains objects wired to a port bay of the interactive object, according to one embodiment.

FIGS. 32A-K and 32M-R are exemplary screenshots illustrating the functionality of an interactive object, according to one embodiment.

FIGS. 33A-33C are exemplary screenshots of an interactive object that contains nested interactive objects, according to one embodiment.

FIGS. 34A-34D are exemplary screenshots illustrating how an interactive object is created, according to one embodiment.

FIGS. 35A-35D are exemplary embodiment of a GUI that includes a Dock, according to one embodiment.

FIG. 36 is an exemplary screenshot illustrating message centers and wiring between objects in display during a run mode, according to one embodiment.

Like reference symbols in the various drawings indicate like elements.

DETAILED DESCRIPTION

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The term "multimedia computer application" (i.e., project) is used herein to refer to an executable program that is capable of outputting from a computer one or more sensory stimuli (i.e. visual, audial, tactile, etc.) allowing a user to perform singular or multiple related specific tasks. The term "editing" is used herein to refer to creating a new multimedia computer application, modifying an existing multimedia computer application, and/or interacting with an existing multimedia computer application.

The term "program" is used herein to refer to generally to a language having a form that a machine is configured to understand and/or follow. The term "debugging" is used herein to refer to a process for detecting and locating program faults for fixing faults in a program. The term "programming language" is used herein to refer to an artificial language for expressing computations, algorithms, and logic for directing a machine to perform a particular function and/or action. The term "compiler" is used herein to refer to a computer program that transforms the written source code into machine language that can be executed by a computer processor. The term "object relational mapping" is used herein to refer to a programming technique for converting data between incompatible type systems in object-oriented programming languages.

The term "asset" is used herein to refer to any image, audio, video, text, SWF (Shockwave Flash), XML (Extensible Markup Language) or other external multimedia formats used in the multimedia computer application. The term "object" is used herein to include, but are not limited by, a primitive object, a container object, and/or an interactive object. The term "primitive object" is used herein to describe a single object, such lines, curves, and/or other basic as geometric shapes. The term "container object" is used herein to describe an object that can contain one or more other objects. Examples include, but are not limited by, an arena object and/or a gadget object. A container object can contain any of the other objects. The term "interactive object" is used herein to describe an object that is configured for interaction with a user, wherein the visual representation of the object is changeable upon the interaction with the user. Examples include a slider object and/or a path object. A primitive object having certain properties can be an interactive object, if the visual representation of the primitive object is changeable upon the interaction with the user.

The term "tool" is used here in to describe a function for selecting, creating, and/or manipulating an object. The term "tool box" is used herein to describe a visual representation displaying one or more tool icons. The term "tool icon" is used herein to describe a graphical pictogram that represents a tool, that is displayed on a screen of a display device. The tool icon may be clicked and/or selected by a user interacting with the GUI to activate a tool associated with the selected tool icon for selecting, creating, and/or manipulating an object.

The term "application data" is used herein to refer to the current state of the multimedia computer application. The term "project data" is used herein to refer to the serialized aggregate of all objects, all interactions between the objects, and all assets used in the multimedia computer application.

The term "graphical user interface" (i.e., GUI) is used herein to refer to a type of user interface that generally offers visual indicators that can be manipulated by a user for performing actions (such as, for example, select commands, call up files, start programs, and do other routine tasks) as opposed to having to type in text commands.

The term "programming environment" is used herein to refer to software run on a computer processor which allows the use of programming expressions (such as written code, graphics, drawings, animation or icons) in the process of programming a multimedia computer application. The term "runtime environment" is used herein to refer to software run on a computer processor which allows a user to run (i.e. sending instructions to the computer's processor and accessing the computer's memory (RAM) and other system resources) an executed multimedia computer application. The term "real-time collaboration" is used herein to refer to software run on a computer processor which allows several people to concurrently edit a multimedia computer application using different computers. The term "single combined programming and runtime implementation" is used herein to refer to software run on a computer processor which allows a user to use programming expressions (such as written code, graphics, drawings, animation or icons) in the process of programming a multimedia computer application and concurrently allows a user to run (i.e. sending instructions to the computer's processor and accessing the computer's memory (RAM) and other system resources) an executed multimedia computer application.

This disclosure provides systems and techniques for creating and implementing graphical user interfaces (GUIs) for wiring and binding objects including graphical and logical objects. The systems provided herein can include a GUI generator that generates the GUIs. The GUIs can be used to create various objects from an object library. For each object created, a message center can be created from a message ribbon library to link with such object.

The message center can include various ribbons relating to inputs, properties and/or outputs of the object. Inputs can be receptors that may accept triggers and affect certain behaviors of the object such as whether the object is visible or hidden. Properties can be any aspects of the object that may be changed such as the position or color of the object. Outputs can be triggers that may affect inputs (receptors) upon occurrence of certain events such as whether the object has been clicked.

The systems can also include a wire manager that creates visual wires from a wire library to link the objects together by locking different properties of the objects where those properties share the same value or value and also manages the functioning of the visual wires created. The visual wires created can represent binding connections between the objects such that a change in a property or properties of any one object may induce corresponding property changes in the rest of the objects respectively.

A binding connection linking two objects can be bi-directional in that a property change in any one of the two linked objects may cause a corresponding property change in the other object. A binding connection can be customized in its binding direction using a master/slave relation in that when there is a race condition a property change at the master end of the binding connection would induce a corresponding property change at the slave ends, but not the other way around.

The binding connections can be created in any suitable manner and can be unlimited in number. For example, the binding connections can be created to link multiple objects in series where a property change in any one of the linked objects may cause a corresponding property change in the rest of the linked objects. The binding connections can be created to link a network of objects so as to facilitate complex interactions among different properties of the linked objects.

The systems can further include a wire controller in communication with the wire manager so as to direct the wire manager to affect necessary event changes in the binding wires. The systems can also include a wire mediator that detects any event changes the may occur at the binding wires and notifies the wire controller on such event changes detected.

The systems can further include an object manager that regulates the behaviors of the objects created. The systems and techniques provided herein allow a user to build simple objects that can communicate with each other through visual wirings. The simple objects built can then be combined to build increasingly complex objects that can be used to create gadgets, simulations and complete interactive courses and projects.

Figure 1:
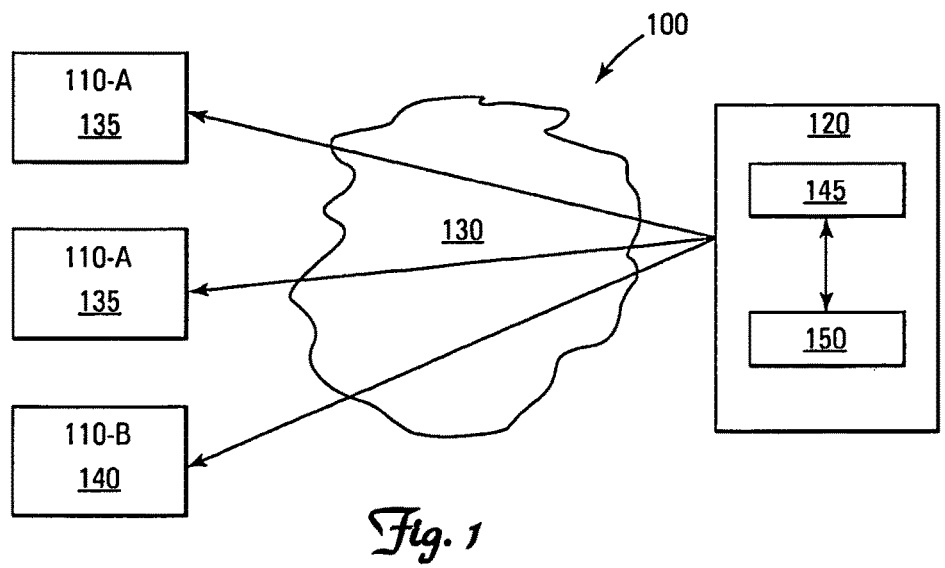
FIG. 1 is a schematic of a system for providing a combined programming and running implementation for creating a multimedia computer application.

FIG. 1 is a schematic of a system 100 for providing a combined programming and running implementation for creating, modifying and/or interacting with a multimedia computer application, according to one embodiment. The system 100 includes a plurality of user terminals 110-A and 110-B, a back end server 120, a storage database 130. The user terminals 110-A and 110-B communicate with the back end server 120 via the network 130.

The user terminals 110-A and 110-B allow a user to create a multimedia computer application that is stored in the back end server 120 and to modify and/or interact with a multimedia computer application via the network 130. The user terminals 110-A use a web browser 135 to create, modify and/or interact with a multimedia computer application hosted on back end server 120 via the network 130. The user terminal 110-B can use either a web browser 135 or a combined programming and running application 140 to create, modify and/or interact with a multimedia computer application hosted on the back end server 120 via the network 130. Regardless of whether the multimedia computer application is accessed via the web browser 135 or the combined programming and running application 140, the back end server provides a unified codebase to the user terminals 110-A and 110-B for a user to create, modify and/or interact with the multimedia computer application.

In some embodiments, a multimedia computer application can be stored in the user terminal 110-B and the back end server 120. In these embodiments, when the user terminal 110-B does not have access to the network 130, the user can still create, modify and/or interact with the multimedia computer application via the combined programming and running application 140. When the user terminal 110-B does connect to the network 130, any changes, modifications and/or interactions to the multimedia computer application can then be updated to the multimedia computer application stored in the back end server.

Also, in some embodiments the combined programming and running application 140 contains additional functionality over the web browser 135 including allowing the import of assets from the native operating system of the user terminal 110-B, providing advanced methods of exporting a multimedia computer application and its assets to the back end server 120, and, as discussed above, offline editing of the multimedia computer application. One example of an advanced method for exporting a multimedia computer application and its contents is to convert the multimedia computer application and its contents into a single zip file that can be unzipped by the combined programming and running application 140.

Figure 6A:
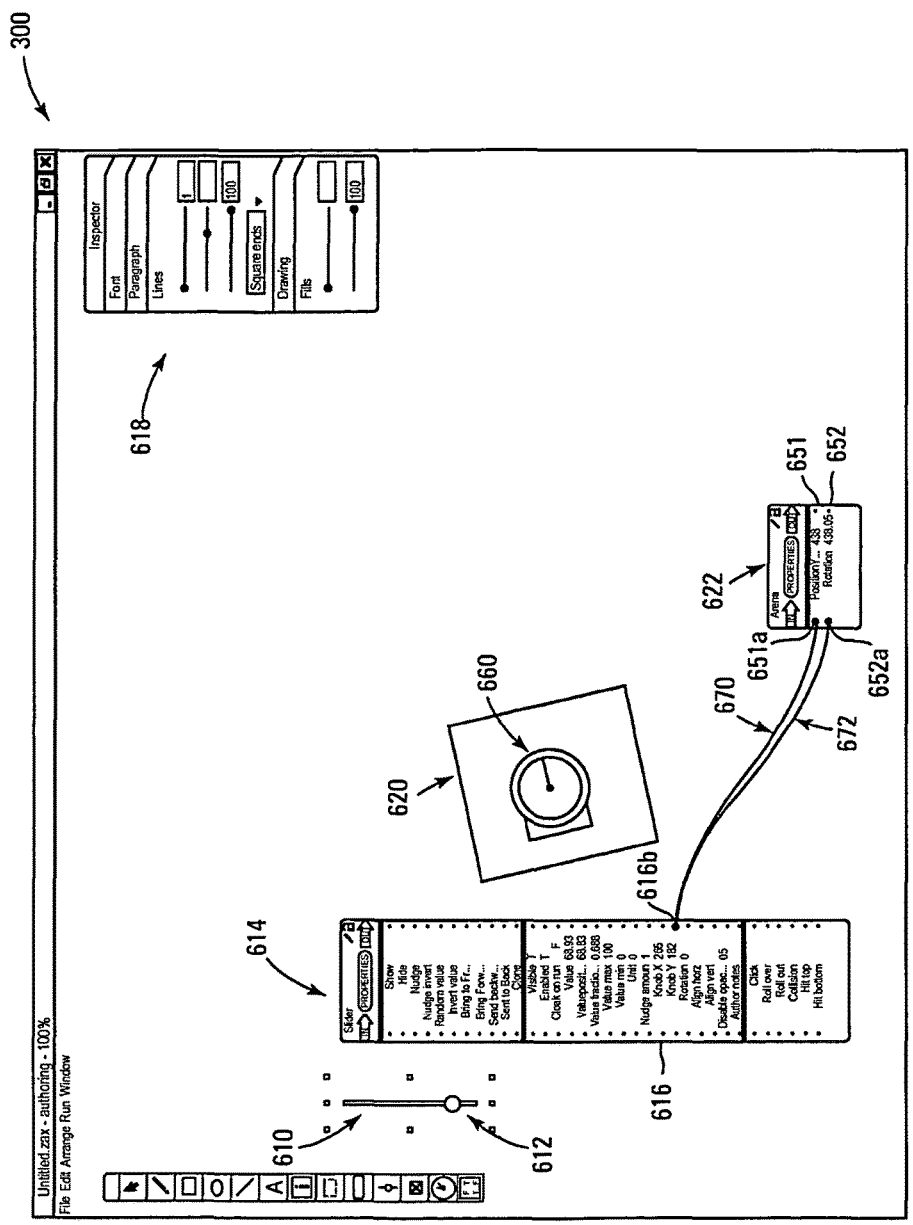
FIGS. 6A-6B are two example screenshots of the exemplary GUI shown in FIG. 3 for creating two binding connections between a property of one object and two properties of another object.
Figure 6E:
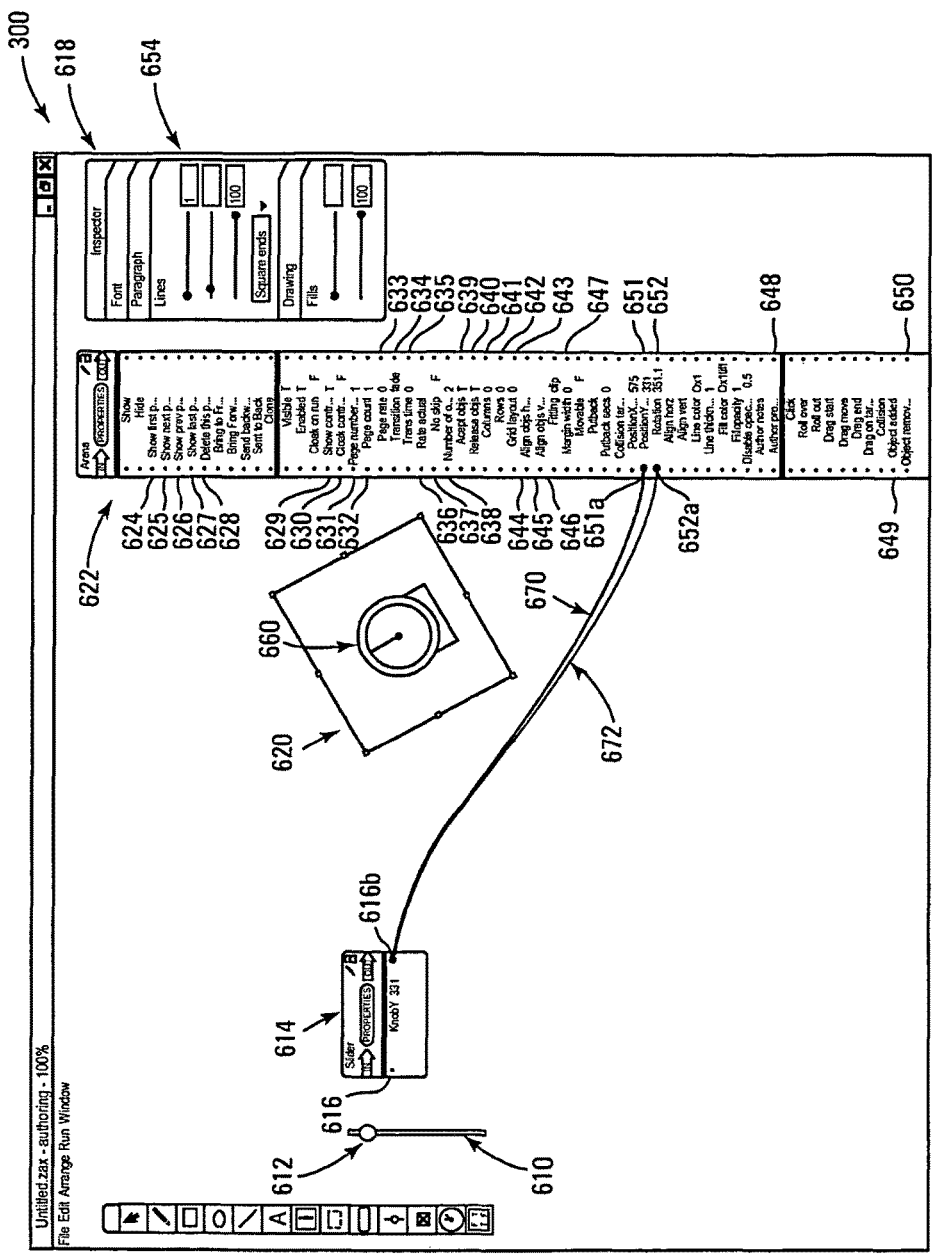

In one embodiment, each of the user terminals 110-A and 110-B is a computing device, such as the computing device shown in FIG. 6. Examples of web browsers that can be used include, for example, Microsoft Explorer, Mozilla Firefox, Apple Safari, etc.

The back end server 120 hosts the programming and runtime environments in a single combined programming and running implementation 145. The back end server 120 also stores multimedia computer applications and assets created or provided while using the combined programming and running implementation 145. The back end server 120 stores the created multimedia computer applications and the assets in a database 150.

In one embodiment, the network 130 is an Internet based network that allows any computing device with access to the Internet to access a particular multimedia computer application or asset through the single combined programming and running implementation 145. In another embodiment, the network 140 is an Intranet based network that allows only those communicating devices (i.e., user terminals 110-A and 110-B) that are granted secure access to the network 140 to access a particular multimedia computer application or asset through the single combined programming and running implementation 145.

Figure 2A:
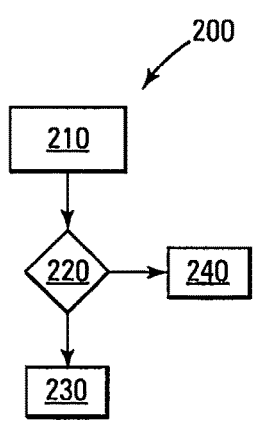
FIG. 2A is a flowchart of a process for providing a combined programming and running implementation for creating a multimedia computer application to a user via a web browser.

FIG. 2A is a flowchart 200 of a process for providing a user access to a combined programming and running implementation for creating a multimedia computer application via a web browser, according to one embodiment. The flowchart 200 begins at step 210, where a user terminal, such as user terminal 110-A or 110-B shown in FIG. 1, connects to a back end server, such as back end server 120, via a web browser. After the user terminal successfully connects to the back end server, the flowchart 200 proceeds to step 220.

At step 220, a user via the user terminal requests access to a particular multimedia computer application or requests to create a new multimedia computer application. The back end server determines whether the user terminal has the necessary access permission to access the multimedia computer application or create a new multimedia computer application. If the back end server determines that the user terminal has the necessary access permission, the flowchart 200 proceeds to step 230. If the back end server determines the user terminal does not have the necessary access permission to access the multimedia computer application, the flowchart 200 proceeds to step 240. At step 240, the process ends.

The back end server can determine whether the user terminal has the necessary access permission based on different factors. For example, in some embodiments, the back end server checks whether the user terminal has provided the back end server correct password and login information to access a particular multimedia computer application or create a new multimedia computer application.

At step 230, if the user terminal requested a particular multimedia computer application, the back end server provides access to a front end portion of the combined programming and running implementation for creating a multimedia computer application. The back end server also provides the user terminal access to the particular multimedia computer application or the new multimedia computer application via the combined programming and running implementation. If the user requested to create a new multimedia computer application, the back end server provides a combined programming and running implementation for creating a multimedia computer application with a new multimedia computer application to the user terminal.

Figure 2B:
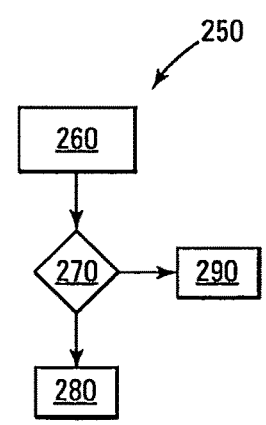
FIG. 2B is a flowchart of a process for providing a combined programming and running implementation for creating a multimedia computer application to a user via a combined programming and running software application stored on a user terminal.

FIG. 2B is a flowchart 250 of a process for providing a user access to a combined programming and running implementation for creating a multimedia computer application via a combined programming and running software application stored on the user terminal, according to one embodiment. The flowchart 250 begins at step 260, where a user terminal, such as user terminal 110-B shown in FIG. 1, connects to a back end server, such as back end server 120, via a combined programming and running software application stored on the user terminal. After the user terminal successfully connects to the back end server, the flowchart 250 proceeds to step 270.

At step 270, a user via the user terminal requests access to a particular multimedia computer application or requests to create a new multimedia computer application. The back end server determines whether the user terminal has the necessary access permission to access the multimedia computer application or create a new multimedia computer application. If the back end server determines that the user terminal has the necessary access permission, the flowchart 250 proceeds to step 280. If the back end server determines the user terminal does not have the necessary access permission to access the multimedia computer application, the flowchart 250 proceeds to step 290. At step 290, the process ends.

At step 280, if the user terminal requested a particular multimedia computer application, the back end server provides access to the particular multimedia computer application that can be modified using a front end portion of the combined programming and running software application stored on the user terminal. If the user terminal requested to create a new multimedia computer application, the back end server, the back end server provides a new multimedia computer application that can be modified using the combined programming and running software application stored on the user terminal.

Referring now to FIG. 3, an exemplary GUI 300 operating in an authoring mode is provided for a user to create various objects. The GUI 300 includes a GUI screen 305 within which a user can create various objects. The GUI also includes a tool box 310 that a user can use to create various objects. In this example, the tool box 310 includes an arrow tool 312 that indicates the selection of an object; a pencil tool 313 for drawing a desired object; a rectangle tool 314 for creating a rectangle or square; an eclipse tool 315 for creating an oval or circle; a line tool 316 for drawing a straight line; a text tool 317 for typing text on the GUI screen in the authoring mode which is not editable at runtime; a text input tool 318 for inputting text in a text box at runtime; an arena tool 319 for creating an arena that can hold other objects; a button tool 320 for creating a button where a user can click the button to perform a given action such as open a file, apply text format including boldface and italic, or print a document; a slider tool 321 for creating a slider that can change values within a specified range; a checkbox tool 322 for creating a checkbox that allows a user to make selections from two or more options; a clock tool 323 for creating a clock that can control actions across time; and a truth table tool 324 for creating a truth table where a user can choose responses to any combinations of an interaction. Other suitable tools can also be included in the tool box 310. For example, a hand tool can be included in the tool box 310 for dragging a work area. A magnifying glass tool can be included in the tool box 310 for zooming in/out an object. An audio tool can be included in the tool box 310 for creating and/or playing sound recordings. A sketching tool can be included in the tool box 310 for rendering hand sketches and primitives (e.g., rectangle, oval, line, etc.) as vector graphics.

In various implementations, the tool box 310 can be used in two different states. In one state, a user can click a tool once so that the tool is highlighted to indicate the selection of the tool. The user can then use the tool to create an object. After the user creates the object, the arrow tool is then highlighted instead so that the object created would stay selected and the user can move the object as needed. In another state, a user can click a tool once and then double-click the tool to highlight the tool. The user can then use the tool to create as many objects of the same type as the user desires. The selected tool remains highlighted until the user selects another tool.

In various implementations, a user can use the tool box 310 to create different objects on the GUI screen 305. For example, a user can click the rectangle tool 314 in the tool box 310 once and then draw a rectangle 330 on the GUI screen 305 as shown in FIG. 3; a user can click the slider tool 321 in the tool box 310 once and then double-click the slider tool 321 and then draw multiple sliders in sequence on the GUI screen 305; and so on. In some implementations, a user can group multiple objects together to create a more complex object.

For each object created, a message center can be linked with such object. A message center is a graphical interface that has various inputs, properties and outputs and provides wiring ports for the inputs, properties and outputs for the purpose of affecting interactive behavior between different objects. In a message center, inputs can be any calls that trigger a change in the state of objects. Typically, inputs include one or more actions that an object would take upon receiving a message or command from another object. For instance, inputs can include showing or hiding an object, bring an object forward or sending an object backward, rotating an object, dropping an object onto a target, colliding two or more objects, playing a movie, and the like. Properties can be any aspects of an object that may be changed. For instance, properties can include the position of an object, the color of an object, whether an object should be visible or hidden, the volume of an audio object, and the like. Outputs can be any events that deliver a trigger upon a particular change in the state of an object. Typically, outputs include one or more messages or commands that one object can send to another object when certain events or conditions occur or exist. For instance, outputs can include that a user has clicked an object, a user has rotated an object, an object has collided with a target, an audio object has reached its endpoint, and the like. In various implementations, a ribbon, which is a graphical entity embedded in a message center, can be used to represent an input, property or output with an inlet port for wiring and binding from another ribbon and an outlet port for wiring and binding to another object.

In this example, the GUI 300 includes a message center 335 that is linked with the rectangle 330. The message center 335 includes an input section 337, a property section 347 and an output section 371. The input section 337 includes a 'Show' ribbon 339 for showing the rectangle 330 on the GUI screen 305; a 'Hide' ribbon 340 for hiding the rectangle 330 from the GUI screen 305; a 'Bring to front' ribbon 341 for moving the rectangle 330 to the very front display layer of the GUI screen 305; a 'Bring forward' ribbon 342 for moving the rectangle 330 to the next display layer toward the front of the GUI screen 305; a 'Send backward' ribbon 343 for moving the rectangle 330 to the next display layer toward the back of the GUI screen 305; a 'Send to back' ribbon 344 for moving the rectangle 330 to the very back display layer of the GUI screen 305; and a 'Clone' ribbon 345 for producing a copy of the rectangle 330. Other suitable input ribbons as described herein can also be included in the input section 337.

In various implementations, the input section on a message center can be used to trigger a change in the state of an object. In this example, a command can be received at the 'Hide' ribbon 339 on the input section 337 so as to hide the rectangle 330 from the GUI screen 305; a command can be received at the 'Send to back' ribbon 344 on the input section 337 so as to send the rectangle 330 to the back of the GUI screen 305; and so on.

The property section 347 includes a 'Visible' ribbon 349 where a user can show or hide the rectangle 330 by setting the Boolean variable to 'T' or 'F'; an 'Enabled' ribbon 350 where a user can enable or disable the rectangle 330 for display by setting the Boolean variable to 'T' or 'F'; a 'Cloak on run' ribbon 351 where a user can specify whether or not the rectangle 330 is hidden during runtime by setting the Boolean variable to 'T' or 'F'; a 'Movable' ribbon 352 where a user can specify whether or not the rectangle 330 is movable by setting the Boolean variable to 'T' or 'F'; a 'Put back' ribbon 353 where a user can specify whether or not the rectangle 330 can return to its initial position after being dragged by setting the Boolean variable to 'T' or 'F'; a 'Putback secs' ribbon 354 where a user can vary the number of seconds within which the rectangle 330 returns to its initial position after being dragged when the 'Put back' ribbon 353 is enabled; a 'Collision target' ribbon 355 where a user can collide the rectangle 330 with a specific target by inputting a preselected target value; a 'Drop target' ribbon 356 where a user can drop the rectangle 330 onto a target by inputting a preselected target value; a 'PositionX' ribbon 357 where a user can move the rectangle 330 to a particular horizontal position by inputting a preselected position value; a 'PositionY' ribbon 358 where a user can move the rectangle 330 to a particular vertical position by inputting a preselected position value; a 'Height' ribbon 359 where a user can vary the height of the rectangle 330 by inputting a preselected height value; a 'Width' ribbon 360 where a user can vary the width of the rectangle 330 by inputting a preselected width value; a 'Rotation' ribbon 361 where a user can rotate the rectangle 330 for a specific number of degrees by inputting a preselected rotation angle value; a 'Align horz' ribbon 362 that a user can use to align the rectangle 330 and other objects horizontally within a container (e.g., an arena); a 'Align vert' ribbon 363 that a user can use to align the rectangle 330 and other objects vertically within a container (e.g., an arena); a 'Line color' ribbon 364 where a user can change the frame of the rectangle 330 to a particular color by inputting a preselected color value; a 'Line thickness' ribbon 365 where a user can change the frame of the rectangle 330 to a particular thickness by inputting a preselected thickness value; a 'Fill color' ribbon 366 where a user can fill the rectangle 330 with a specific color by inputting a preselected color value; a 'Fill opacity' ribbon 367 where a user can fill the rectangle 330 with a specific opacity by inputting a preselected opacity value; a 'Disable opacity' ribbon 368 where a user can input a preselected opacity value to set a specific opacity for the rectangle 330 in a disabled state; and an 'Author notes' ribbon 369 where a user can record notes. Other suitable property ribbons as described herein can also be included in the property section 347.

In various implementations, the property section on a message center can be used to change one or more properties of an object. In this example, a user can select 'T' on the 'Visible' ribbon 349 in the property section 347 to make the rectangle 330 visible on the GUI screen 305 or select 'F' on the 'Visible' ribbon 349 to hide the rectangle 330 from the GUI screen 305, or a message or command can be received at the 'Visible' ribbon 349 so that the rectangle 330 is shown or hidden as commanded; a user can type a preselected value of rotation angle at the input box of the 'Rotation' ribbon 361 in the property section 347 so as to rotate the rectangle 330 clockwise or counterclockwise by that preselected angle, or a message or command can be received at the 'Rotation' ribbon 361 so that the rectangle 330 is rotated by a specific number of degrees as commanded; a user can type a preselected color value in the 'Fill color' ribbon 366 in the property section 347 to fill the rectangle 330 with that preselected color, or a message or command can be received at the 'Fill color' ribbon 366 so that the rectangle 330 is filled with a particular color as commanded; and so on.

The output section 371 includes a 'Click' ribbon 373 to send a message or command to another object when a user clicks the rectangle 330; a 'Roll over' ribbon 374 to send a message or command to another object when a user rolls over the rectangle 330; a 'Roll out' ribbon 375 to send a message or command to another object when a user rolls out the rectangle 330; a 'Drag start' ribbon 376 to send a message or command to another object when a user starts to drag the rectangle 330; a 'Drag move' ribbon 377 to send a message or command to another object when a user is in the process of dragging the rectangle 330; a 'Drag end' ribbon 378 to send a message or command to another object when a user finishes dragging the rectangle 330; a 'Drop on target' ribbon 379 to send a message or command to another object when a user drops the rectangle 330 onto a target; and a 'Collision' ribbon 380 to send a message or command to another object when a user collides the rectangle 330 with one or more other objects. Other suitable output ribbons as described herein can also be included in the output section 371.

In various implementations, the output section on a message center can be used to deliver a trigger upon a change in the state of an object. In this example, the 'Click' ribbon 373 in the output section 371 can be used to send a message or command to another object to trigger a predetermined change in that object (e.g., hiding that object) when a user clicks the rectangle 330; the 'Drop on target' ribbon 379 in the output section 371 can be used to send a message or command to another object to trigger a predetermined change in that object (e.g., sending that object backward) when a user drops the rectangle 330 into a target area; and so on.

For each object created, an inspector can also be linked with such object. An inspector is a graphical palette that enables a user to affect property changes for an object. In this example, the GUI 300 includes an inspector 385 that is linked with the rectangle 330. The inspector 385 includes a 'Lines' section 387 and a 'Fills' section 394. The 'Lines' section 387 allows a user to vary the frame thickness, color and/or opacity of the rectangle 330. For instance, a user can change the frame thickness, color and/or opacity of the rectangle 330 by respectively sliding the solid circles along lines 389, 390, 391 or by inputting respective preselected values of thickness, color and/or opacity at the input boxes right next to lines 389, 390, 391 respectively. The 'Lines' section 387 also allows a user to vary the end shape of the rectangle 330 by selecting 'Square ends,' 'Round ends,' or 'Bevel ends' from a dropdown box 392. The 'Fills' section 394 allows a user to change the fill color and opacity of the rectangle 330. For instance, a user can change the fill color and/or opacity of the rectangle 330 by respectively sliding the solid circles on lines 396, 397 or by inputting respective preselected values of color and/or opacity at the input boxes right next to lines 396, 397 respectively.

Figure 4:
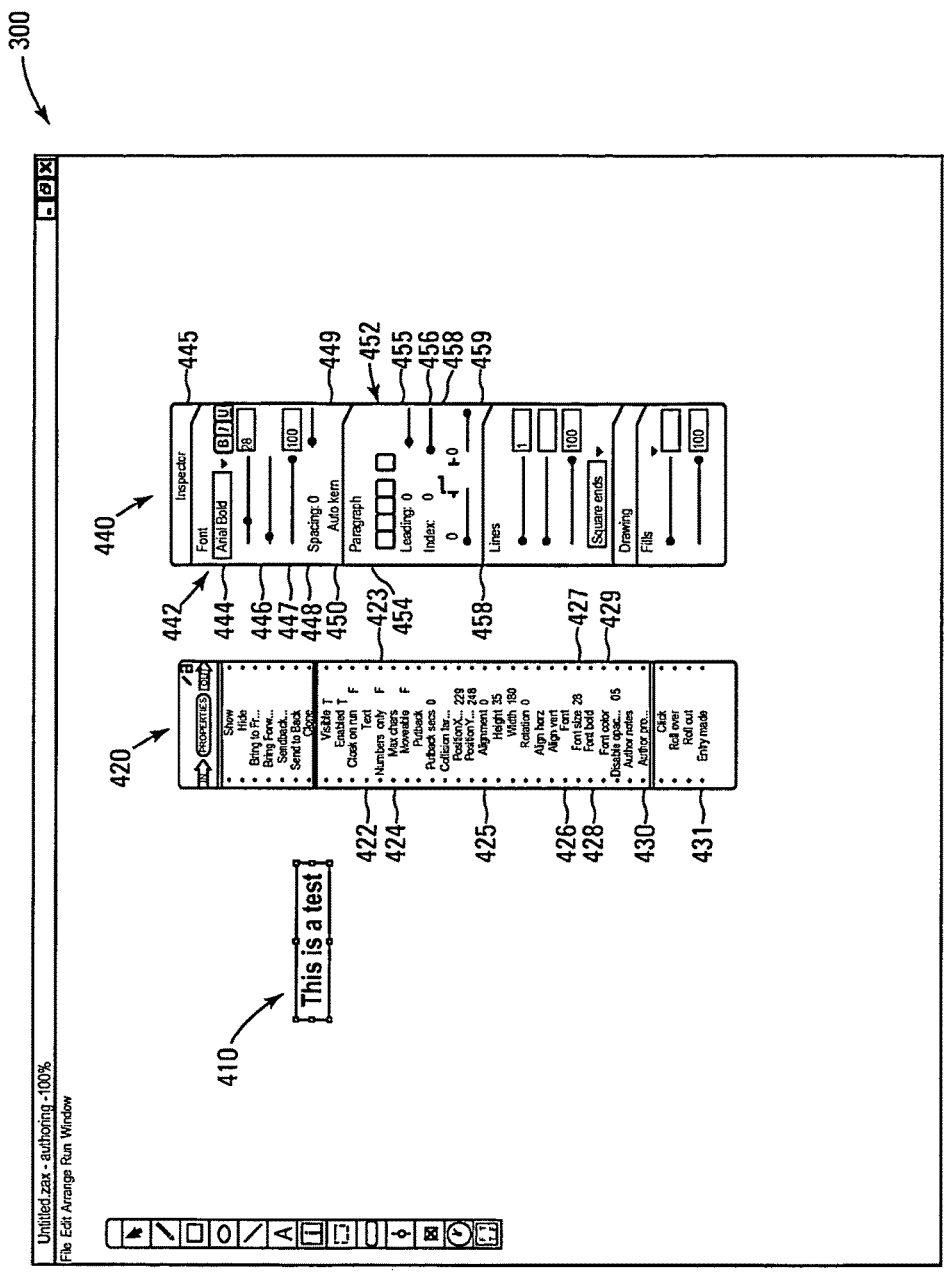
FIG. 4 is an example screenshot of the exemplary GUI shown in FIG. 3 that includes an object linked with a message center and an inspector.

The ribbon contents of a message center and an inspector depend on the particular object with which the message center and the inspector are linked. Turning now to FIG. 4, the exemplary GUI 300 includes an input text object 410 that is linked with a message center 420 and an inspector 440. In this example, the message center 420 includes one or more ribbons that can be specific to the text input object 410. For instance, the message center 420 includes a 'Text' ribbon 422 where a user can input text so as to show the text in the text box; a 'Numbers only' ribbon 423 where a user can specify whether or not only numbers can be inputted in the text box by setting the Boolean variable to 'T' or 'F'; a 'Max chars' ribbon 424 where a user can define the maximum number of characters that may be typed in the text box by inputting a preselected maximum value; an 'Alignment' ribbon 425 where a user can define whether the inputted text is left aligned, centered, right aligned, or justified; a 'Font' ribbon 426 where a user can select the font type for the inputted text; a 'Font size' ribbon 427 where a user can choose the font size for the inputted text; a 'Font bold' ribbon 428 where a user can specify whether or not the inputted text is bolded; a 'Font color' ribbon 429 where a user can select the font color for the inputted text; an 'Author prompt' ribbon 430 to prompt a user for input; and an 'Entry made' ribbon 431 to send a message or command to another object when a user has inputted some text in the text box.

The inspector 440 also includes one or more sections that can be specific to the text input object 410. For instance, the inspector 440 includes a 'Font' section 442 that allows a user to define the font properties of the inputted text. For example, a user can choose the font type for the inputted text from a dropdown box 444; specify whether the inputted text is bolded, italicized or underlined by respectively clicking proper buttons 445; change the font size of the inputted text by sliding the solid circle along line 446 or by inputting a preselected value of font size at the input box right next to line 446; change the font color of the inputted text by sliding the solid circle along line 447 or by inputting a preselected value of font color at the input box right next to line 447; change the font opacity by sliding the solid circle along line 448 or by inputting a preselected value of font opacity at the input box right next to line 448; vary the text spacing by sliding the solid circle along line 449 or by inputting a preselected value of text spacing at the input box right next to line 449; and/or make the inputted text auto-kerning by checking the 'Auto kern' checkbox 450. The inspector 440 also includes a 'Paragraph' section 452 that allows a user to define the paragraph properties of the inputted text. For example, a user can make a paragraph left aligned, centered, right aligned or justified by respectively clicking proper buttons 454; create a bulleted listing by clicking button 455; change leading (line spacing) by sliding the solid circle along line 456 or by inputting a preselected value of line spacing at the input box right next to line 456; vary both the left indentation and the right indentation of a paragraph at the same time by sliding the solid circle along line 457 or by inputting a preselected indentation value at the input box right next to line 457; vary the right indentation only by sliding the solid circle along line 458 or by inputting a preselected indentation value at the input box right above line 458; and vary the left indentation only by sliding the solid circle along line 459 or by inputting a preselected indentation value at the input box right above line 459.

Referring now to FIGS. 5A-5B, 6A-6B, 8A-8B, 9A-9B, 10A-10D and 11A-11D, the exemplary GUI 300 shown in FIG. 3 operates in an authoring mode where a user can create one or more binding connections between two or more objects. A binding connection is a link between one property of object A and one property of object B where the two properties share the same value so that a change in the value of the property of object A would lead to a corresponding change in the value of the property of object B, or vice versa. For instance, a binding connection can include locking the horizontal positions of two objects together so that moving one object in the horizontal direction would cause the other object to also move in the horizontal direction; locking the volume of two audio objects together so that increasing or decreasing the volume of one audio object would cause the volume of the other audio object to also increase or decrease; locking the proportional values of two sliders together so that sliding the knob of one slider up and down would cause the knob of the other slider to also move up and down; and the like.

In various implementations, a binding connection can link two dissimilar properties of two objects. For instance, a binding connection can lock the check status of a checkbox object (a Boolean variable where a 'True' value indicates the checkbox is checked or a 'False' value indicates the checkbox is unchecked) with the fill color of a rectangle object such that when the checkbox is checked (i.e., the Boolean variable is set to 'True') the rectangle would be filled with one color (e.g., green) and when the checkbox is unchecked (i.e., the Boolean variable is set to 'False') the rectangle would be filled with another color (e.g., blue), or vice versa.

Figure 5A:
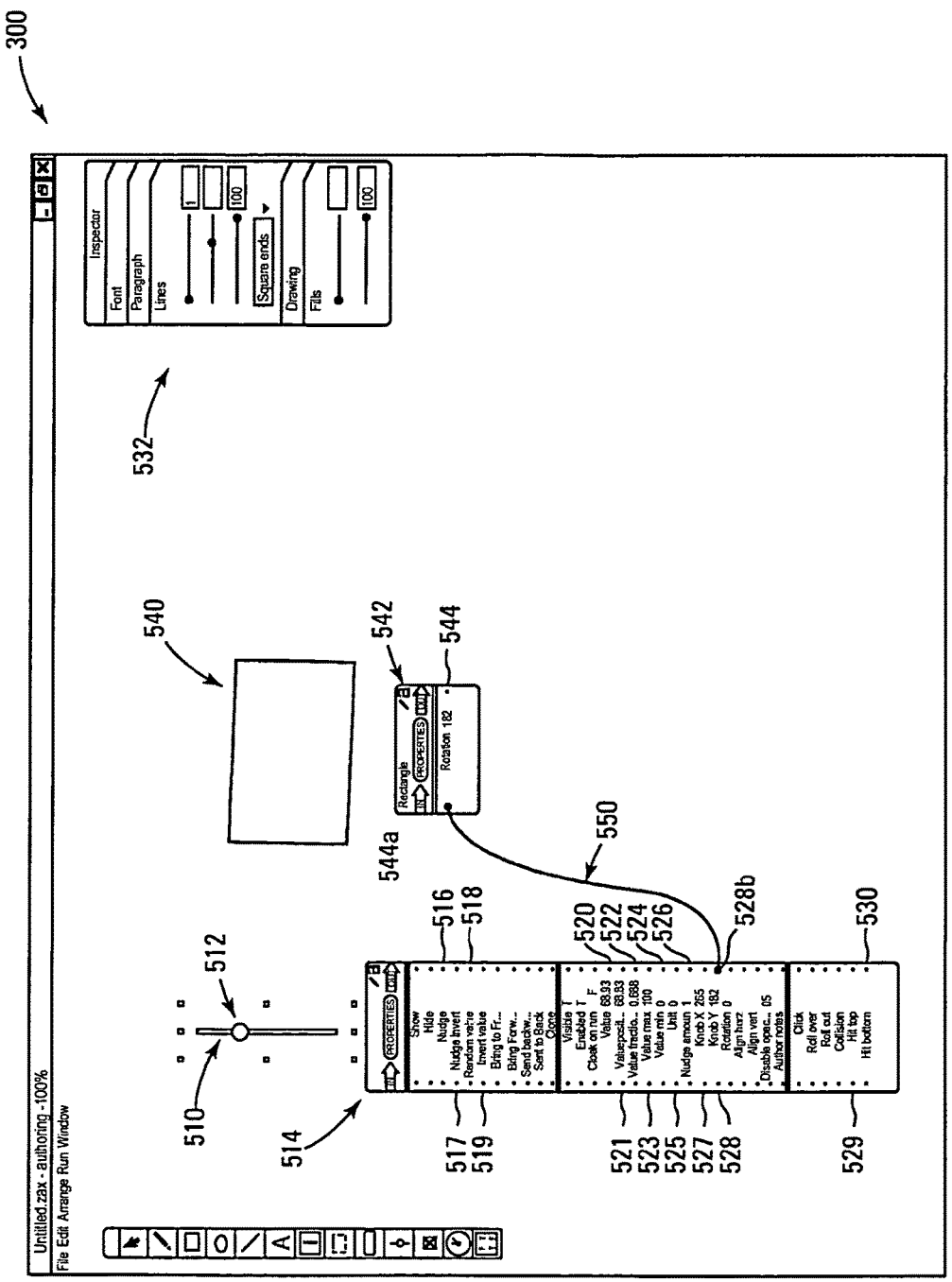
FIGS. 5A-5B are two example screenshots of the exemplary GUI shown in FIG. 3 for creating a binding connection between a property of one object and a property of another object.
Figure 5B:
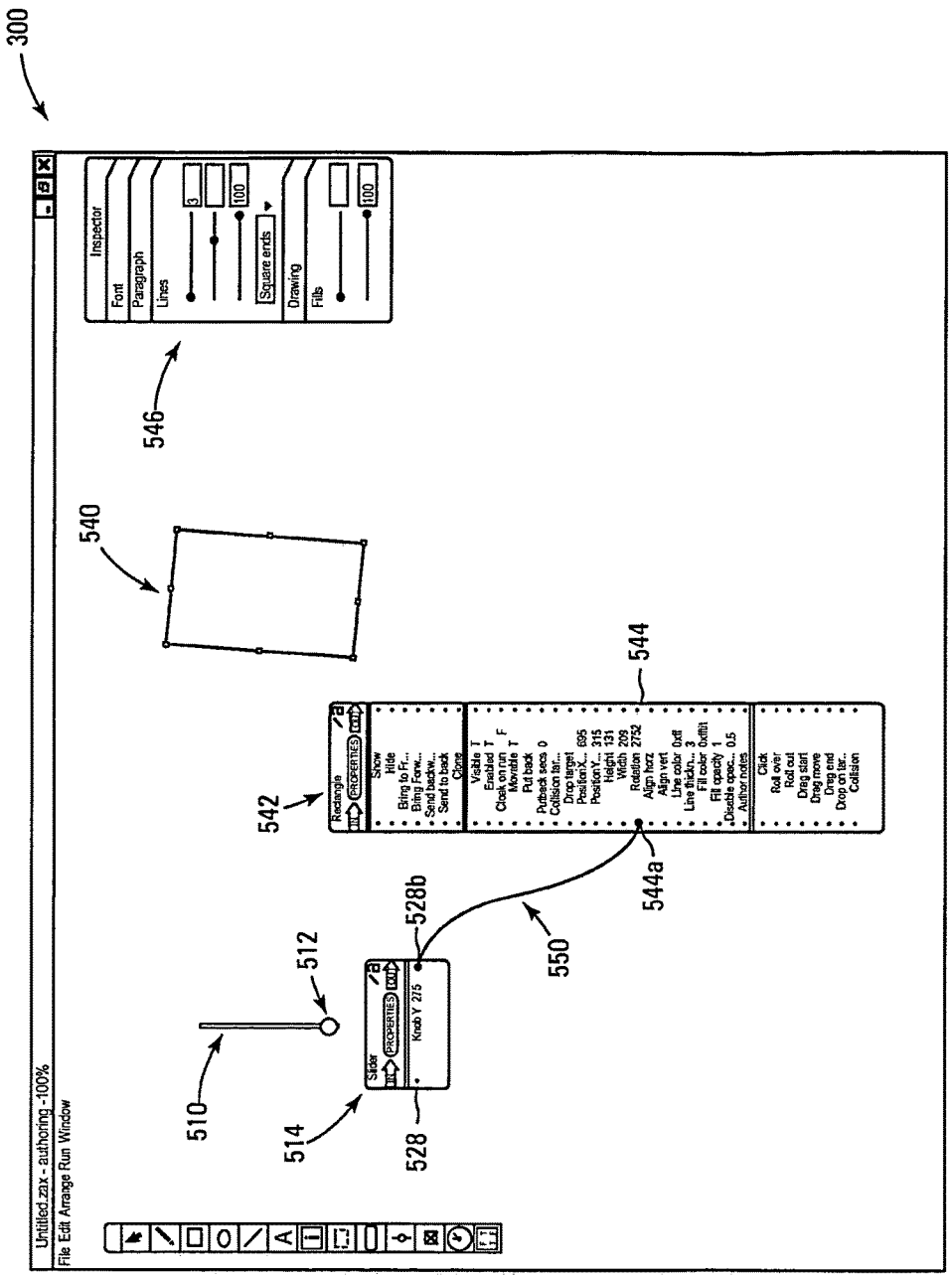

In FIGS. 5A-5B, the exemplary GUI 300 is used to create a binding connection between a property of one object and a property of another object. In this example, the GUI 300 includes a slider 510 having a knob 512 that is linked with a message center 514 and an inspector 532. The message center 514 includes one or more input ribbons that can be specific to the slider 510. For instance, the message center 514 includes a 'Nudge' ribbon 516 for nudging the slider 510; a 'Nudge invert' ribbon 517 for nudging the slider 510 in a reverse direction; a 'Random value' ribbon 518 for randomly choosing a value for a specific position of the knob 512 on the slider 510; an 'Invert value' ribbon 519 for setting a value with the same Magnitude but an opposite sign with respect to the current value. The message center 514 also includes one or more property ribbons that can be specific to the slider 510. For instance, the message center 514 includes a 'Value' ribbon 520 where a user can place the knob 512 at a specific position on the slider 510 by inputting a preselected value that determines the position of the slider knob 512; a 'Value position ribbon' 521 where a user can also place the knob 512 at a specific position on the slider 510 by inputting a preselected value that determines the position of the slider knob 512; a 'Value Fraction' ribbon 522 to indicate the fraction of the value that the current position of the slider knob 512 represents with respect to the value range within which the slider 510 can vary; a 'Value max' ribbon 523 where a user can specify the maximum value to which the slider 510 can vary by inputting a preselected maximum value; a 'Value min' ribbon 524 where a user can specify the minimum value to which the slider 510 can vary by inputting a preselected minimum value; a 'Unit' ribbon 525 where a user can define a unit for the values that the slider 510 controls by inputting a preselected unit value; a 'Nudge amount' ribbon 526 to show the nudge amount; a KnobX' ribbon 527 where a user can change the horizontal position of the slider knob 512 by inputting a preselected position value; and a 'KnobY' ribbon 528 where a user can change the vertical position of the slider knob 512 by inputting a preselected position value. The message center 514 further includes one or more output ribbons that can be specific to the slider 510. For instance, the message center 514 includes a 'Hit top' ribbon 529 that can send a message or command to another object when the knob 512 hits the top of the slider 510; and a 'Hit bottom' ribbon 530 that can send a message or command to another object when the knob 512 hits the bottom of the slider 510.

The GUI 300 also includes a rectangle 540 that is also linked with a message center 542 and an inspector 546. In this example, the 'KnobY' ribbon 528 of the slider 510 that correlates to the vertical position of the slider knob 512 is connected with the 'Rotation' ribbon 544 of the rectangle 540 that correlates to the rotation angle of the rectangle 540 via a visual wire 550 that is used to send messages or commands between the slider 510 and the rectangle 540. For instance, a user can pull the wire 550 from an outlet port 528b of the 'KnobY' ribbon 528 of the slider 510 and extend the wire 550 to connect it to an inlet port 544a of the 'Rotation' ribbon 544 of the rectangle 540 so as to bind the slider 510 and the rectangle 540 together by locking the vertical position of the slider knob 512 with the rotation angle of the rectangle 540.

Through such a binding connection 550, a user can move the slider knob 512 up and down to rotate the rectangle 540. For example, in FIG. 5A the vertical position of the slider knob 512 is set to about 182. Since the 'KnobY' ribbon 528 of the slider 510 is bound to the 'Rotation' ribbon 544 of the rectangle 540, the rotation angle of the rectangle 540 is also set to about 182. In FIG. 5B a user can continuously change the vertical position of the slider knob 512 from about 182 to about 275 by moving the knob 512 downward along the slider 510. This would cause the rectangle 540 to rotate clockwise accordingly where the rotation angle of the rectangle 540 varies continuously from about 182 to about 275. The rectangle 540 rotates clockwise as the knob 512 moves downward along the slider 510, and the variation in the rotation angle of the rectangle 540 tracks the change in the vertical position of the slider knob 512 in real time. A user can also enter 275 at the input box of the 'KnobY' ribbon 528 of the slider 510 to move the slider knob 512 to a vertical position of 275. This would cause the rotation angle value at the 'Rotation' ribbon 544 of the rectangle 540 to correspondingly change to 275 and at the same time rotate the rectangle 540 to an angle of 275.

In various implementations, a binding connection can be bi-directional. Using FIG. 5B as an illustrative example, a user can also rotate the rectangle 540 to move the slider knob 512 up and down through the binding connection 550. For instance, a user can continuously change the rotation angle of the rectangle 540 from about 182 to about 275 by rotating the rectangle 540 clockwise. This would cause the slider knob 512 to move downward along the slider 510 accordingly where the vertical position of the slider knob 512 varies continuously from about 182 to about 275. The slider knob 512 moves simultaneously with the rotation of the rectangle 540, and the variation in the vertical position of the slider knob 512 matches the change in the rotation angle of the rectangle 540 in real time. A user can also enter 275 at the input box of the 'Rotation' ribbon 544 of the rectangle 540 to rotate the rectangle 540 to an angle of 275. This would cause the vertical position value at the 'KnobY' ribbon 528 of the slider 510 to correspondingly change to 275 and in the meantime move the slider knob 512 to a vertical position of 275.

In various implementations, a user can customize the binding direction of a binding connection. For example, a user can designate one end of the binding connection as a master end while the other end as a slave end so that, when property values at both ends of the binding connection are changed at the same instant, the change in the property value at the master end would induce a corresponding change in the property value at the slave end, not the other way around.

In various implementations, the linking wire can self-configure its position, shape and/or curvature based on the movement of the objects, message centers and/or other graphical entities so that the wire would remain a smooth curve and minimize overlapping with the objects, message centers and/or other graphical entities. For example, the linking wire can be configured in real time by calculating a Bézier curve of variable orders to obtain a smooth curve that can connect an inlet/outlet port of a ribbon of one message center with an outlet/inlet port of a ribbon of another message center. To which two ports the linking wire connects may depend on a distance between the inlet/outlet ports of the two ribbons. The linking wire can be adapted to connect the two closest ports of the respective ribbons.

In FIGS. 6A-6B, the GUI 300 is used to create two binding connections between a property of one object and two properties of another object. In this example, the GUI 300 includes a slider 610 having a knob 612 that is linked with a message center 614 and an inspector 618. The GUI 300 also includes an arena 620 that is also linked with a message center 622 and an inspector 654. An arena is an object that can hold other objects where those other objects can be dragged into or out of the arena in real time. In this example, the arena 620 holds a clock 660. In some embodiments, an arena can hold a group of objects which allows the group of objects to send and receive messages or commands as a group (see, e.g., FIG. 7A). In some embodiments, an arena can clip the portion of an object held by the arena that exceeds the boundary of the arena so as to fit the object within the arena (see, e.g., FIG. 7A). In some embodiments, an arena can hold other arenas (see, e.g., FIG. 7B). In some embodiments, an arena can include two or more pages so as to form a flipbook (see, e.g., FIG. 7C). For example, an arena can hold multiple objects on separate pages where each page can hold one or more objects such that another object can command the arena (flipbook) to show a specific page or to show a sequence of several pages similar to a slide show. In some embodiments, multiple arenas, each holding one or more objects, can form a grid so as to align and/or organize many objects as desired (see, e.g., FIG. 7D).

The message center 622 includes one or more input ribbons that can be specific to the arena 620. For instance, the message center 622 includes a 'Show first page' ribbon 624 for showing the first page in the arena 620; a 'Show next page' ribbon 625 for showing the next page in the arena 620; a 'Show previous page' ribbon 626 for showing the previous page in the arena 620; a 'Show last page' ribbon 627 for showing the last page in the arena 620; and a 'Delete this page' ribbon 628 for deleting the current page from the arena 620. The message center 622 also includes one or more property ribbons that can be specific to the arena 620. For instance, the message center 622 includes a 'Show control' ribbon 629 where a user can specify whether or not the arena 620 can convert into a multi-page container or a flip-book by setting the Boolean variable to 'T' or 'F'; a 'Cloak control' ribbon 630 where a user can specify whether or not the arena 620 is hidden during runtime by setting the Boolean variable to 'T' or 'F'; a 'Page number' ribbon 631 to show the page number of the page that is currently displayed in the arena 620; a 'Page count' ribbon 632 to show the total number of pages in the arena 620; a 'Page rate' ribbon 633 where a user can set a predetermined rate to display the arena 620 page by page in an animation; a 'Transition' ribbon 634 where a user can set a specific transition (e.g., cross fade) to apply between pages in the animation; a 'Trans time' ribbon 635 where a user can establish a preselected time period within which the transition between pages would occur; a 'No skip' ribbon 637 where a user can specify whether or not a page change of more than one increment or one decrement is forbidden from the current page by setting the Boolean variable to 'T' or 'F'; a 'Number of objects' ribbon 638 to show the total number of objects held by the arena 620; an 'Accept objs' ribbon 639 where a user can specify whether or not dragging a new object into the arena 620 is permitted by setting the Boolean variable to 'T' or 'F'; a 'Release objs' ribbon 640 where a user can specify whether or not dragging an object out of the arena 620 is allowed by setting the Boolean variable to 'T' or 'F'; a 'Columns' ribbon 641 where a user can specify the number of columns in a grid of arenas; a 'Rows' ribbon 642 where a user can specify the number of rows in a grid of arenas; a 'Grid layout' ribbon 643 where a user can specify the layout of an arena grid to be created; an 'Align objs h' ribbon 644 for aligning the objects held by the arena 620 in a horizontal direction; an 'Align objs v' ribbon 645 for aligning the objects held the arena 620 in a vertical direction; 'Fitting' ribbon 646 for fitting an object inside the arena 620; a 'Margin width' ribbon 647 where a user can establish a predetermined margin between objects within the arena 620; and an 'author prompt' ribbon 648 to prompt a user for inputs. The message center 622 further includes one or more output ribbons that can be specific to the arena 620. For instance, the message center 622 includes an 'Object added' ribbon 649 to send a message or command to another object when an object is added to the arena 620; and an 'Object removed' ribbon 650 to send a message or command to another object when an object is removed from the arena 620.

In this case, the 'KnobY' ribbon 616 of the slider 610 that correlates to the vertical position of the slider knob 612 is connected, via two wires 670, 672, with the 'PositionY' ribbon 651 and the 'Rotation' ribbon 652 of the arena 620 that respectively correlate to the vertical position and the rotation angle of the arena 620. For example, a user can first pull the wire 670 from an outlet port 616b of the 'KnobY' ribbon 616 of the slider 610 and extend the wire 670 to bind it to an inlet port 651a of the 'PositionY' ribbon 651 of the arena 620 and then pull the wire 672 from the outlet port 616b of the 'KnobY' ribbon 616 of the slider 610 and extend the wire 672 to bind it to an inlet port 652a of the 'Rotation' ribbon 652 of the arena 620 so as to connect the slider 610 and the arena 620 together by locking the vertical position of the slider knob 612 with both the vertical position and the rotation angle of the arena 620.

Through such binding connections 670, 672, a user can slide the knob 612 up and down along the slider 610 to move the arena 620 up and down and rotate the arena counter-clockwise and clockwise at the same time. For instance, in FIG. 6A the vertical position of the knob 612 is set to about 438. Since the 'KnobY' ribbon 616 of the slider 610 is linked with the 'PositionY' ribbon 651 and the 'Rotation' ribbon 652 of the arena 620 respectively, the vertical position and the rotation angle of the arena 620 are also respectively set to about 438. In FIG. 6B a user can continuously vary the vertical position of the slider knob 612 from about 438 to about 331 by moving the knob 612 upward along the slider 610. This would cause the arena 620 to simultaneously move up and rotate counter-clockwise accordingly where both the vertical position and the rotation angle of the arena 620 change continuously from about 438 to about 331. The simultaneous translation and rotation of the arena 620 occurs as the slider knob 612 moves, and the simultaneous variations in the vertical position and the rotation angle of the arena 620 follows the change in the vertical position of the slider knob 612 in real time. A user can also enter 331 at the input box of the 'KnobY' ribbon 616 of the slider 610 to move the slider knob 612 to a vertical position of 331. This would cause both the vertical position value at the 'PositionY' ribbon 651 of the arena 620 and the rotation angle value at the 'Rotation' ribbon 652 of the arena 620 to correspondingly change to 331 and concurrently move the arena 620 to a position where the arena 620 has a vertical position and a rotation angle that both are 331.

In this example, the clock 660, the object held by the arena 620, also moves with the arena 620 as the slider knob 612 is used to move the arena 620. In this case, the arena 620 is linked with the slider 610. In various implementations, the object(s) contained in an arena can be linked with one or more objects outside the arena. Using this case as an illustrative example, a user can also link the clock 660 with the slider 610 such that the slider 610 can be used to control the operation of the clock 660.

As shown in FIGS. 5A-5B and 6A-6B, the exemplary GUI 300 can be used to create one or two binding connections between one property of one object and one or two properties of another object. In various implementations, the exemplary GUI 300 can be used to create three or more binding connections between one property of one object and three or more properties of another object. For example, the GUI 300 can be used to create three binding connections between one property of one object and three properties of another object; the GUI 300 can also be used to create five binding connections between one property of one object and five properties of another object; and so on. In general, the GUI 300 can be used to create N binding connections between one property of one object and N properties of another object (N is an integer and N≥1).

In FIGS. 8A-8B, the GUI 300 is used to create two binding connections between two properties of one object and two properties of another object. In this example, the GUI 300 includes an eclipse 810 that is linked with a message center 812 and an inspector 818. The GUI 300 also includes a rectangle 820 that is also linked with a message center 822 and an inspector 828. The 'Height' ribbon 814 and the 'Width' ribbon 815 of the eclipse 810 that respectively correlate to the height and the width of the eclipse 810 are respectively connected, via two wires 830, 832, with the 'Height' ribbon 824 and the 'Width' ribbon 825 of the rectangle 820 that respectively correlate to the height and the width of the rectangle 820. For example, a user can first pull the wire 830 from an outlet port 814*b* of the 'Height' ribbon 814 of the eclipse 810 and extend the wire 830 to bind it to an inlet port 824*a* of the 'Height' ribbon 824 of the rectangle 820 and then pull the wire 832 from an outlet port 815*b* of the 'Width' ribbon 815 of the eclipse 810 and extend the wire 832 to bind it to an inlet port 825*a* of the 'Width' ribbon 825 of the rectangle 820 so as to connect the eclipse 810 and the rectangle 820 together by respectively locking the height and the width of the eclipse 810 with the height and the width of the rectangle 820.

Through such binding connections 830, 832, a user can expand and shrink the eclipse 810 to expand and shrink the rectangle 820. For instance, in FIG. 8A the height and the width of the eclipse 810 are set to about 146 and about 202 respectively. Since the 'Height' ribbon 814 and 'Width' ribbon 815 of the eclipse 810 are respectively connected to the 'Height' ribbon 824 and the 'Width' ribbon 825 of the rectangle 820, the height and the width of the rectangle 820 are also set to about 146 and about 202 respectively. In FIG. 8B a user can continuously expand the eclipse 810 by increasing the height and the width respectively from about 146 to about 211 and from about 202 to about 316. This would cause the rectangle 820 to expand accordingly where the height and the width of the rectangle 820 continuously increase respectively from about 146 to about 211 and from about 202 to about 316. The rectangle 820 expands at the same time when the eclipse 810 expands, and the increases in the height and the width of the rectangle 820 respectively match the increases in the height and width of the eclipse 820 in real time. A user can also enter 211 and 316 respectively at the input boxes of the 'Height' ribbon 814 and the 'Width' ribbon 815 of the eclipse 810 to expand the eclipse 810 to a size of 211×316. This would cause the height value at the 'Height' ribbon 824 of the rectangle 820 and the width value at the 'Width' ribbon 825 of the rectangle 820 to correspondingly change to 211 and 316 respectively and simultaneously expands the rectangle 820 such that the rectangle 820 has a height of 211 and a width of 316.

In this example, the exemplary GUI 300 is used to create two binding connections between two properties of one object and two properties of another project. In various implementations, the exemplary GUI 300 can also be used to create three or more binding connections between two or more properties of one object and three or more properties of another object. For example, the GUI 300 can be used to create three to six binding connections between two properties of one object and three properties of another object; the GUI 300 can be used to create three to nine binding connections between three properties of one object and three properties of another object; the GUI can be used to create four to twelve binding connections between three properties of one object and four properties of another object; and so on. In general, the GUI 300 can be used to create M (M≥N) or N (N≥M) to M*N binding connections between M properties of one project and N properties of another object (M and N are both integers and M≥2 and N≥2).

In FIGS. 9A-9B, the GUI 300 is used to create three binding connections between a property of one object and three properties of three other objects where each of the three other objects has one separate property of the three properties. In this example, the GUI 300 includes a slider 910 having a knob 912 that is linked with a message center 914 and an inspector 918. The GUI 300 also includes a first rectangle 920, an eclipse 930 and a second rectangle 940 that each is also linked respectively with a message center 922, 932, 942 and an inspector (not shown). The 'KnobY' ribbon 916 of the slider 910 that correlates to the vertical position of the slider knob 912 is respectively connected, via three wires 950, 952, 954, with the 'PositionX' ribbon 924 of the first rectangle 920 that correlate to the horizontal position of the first rectangle 920, the 'Rotation' ribbon 934 of the eclipse 930 that correlates to the rotation angle of the eclipse 930, and the 'Width' ribbon 944 of the second rectangle 940 that correlates to the width of the second rectangle 940. For example, a user can first pull the wire 950 from an outlet port 916*b* of the 'KnobY' ribbon 916 of the slider 910 and extend the wire 950 to bind it to an inlet port 924*a* of the 'PositionX' ribbon 924 of the first rectangle 920 and then pull the wire 952 from the outlet port 916*b* of the 'KnobY' ribbon 916 of the slider 910 and extend the wire 752 to bind it to an inlet port 934*a* of the 'Rotation' ribbon 934 of the eclipse 930 and then pull the wire 954 from the outlet port 916*b* of the 'KnobY' ribbon 916 of the slider 910 and extend the wire 754 to bind it to an inlet port 944*a* of the 'Width' ribbon 944 of the second rectangle 944 so as to respectively connect the slider 910 with the first rectangle 920, the eclipse 930 and the second rectangle 940 by respectively locking the vertical position of the slider 910 with the horizontal position of the first rectangle 920, the rotation angle of the eclipse 930, and the width of the second rectangle 940.

Through such binding connections 950, 952, 954, a user can move the knob 912 up and down along the slider 910 to simultaneously move the first rectangle 920 toward left and right, rotate the eclipse 930 counter-clockwise and clockwise, and increase and decrease the width of the second rectangle 940. For instance, in FIG. 9A the vertical position of the slider knob 912 is set to about 396. Since the 'KnobY' ribbon 916 of the slider 910 is respectively linked with the 'PositionX' ribbon 924 of the first rectangle 920, the 'Rotation' ribbon 934 of the eclipse 930, and the 'Width' ribbon 944 of the second rectangle 940, the horizontal position of the first rectangle 920, the rotation angle of the eclipse 930, and the width of the second rectangle 940 are also set to about 396 respectively. In FIG. 9B a user can continuously vary the vertical position of the slider knob 912 from about 396 to about 305 by moving the knob 912 upward along the slider 910. This would cause the first rectangle 920 to move toward left, the eclipse 930 to rotate counter-clockwise and the second rectangle 940 to increases in its width at the same time where the horizontal position of the first rectangle 920, the rotation angle of the eclipse 930 and the width of the second rectangle 940 all vary continuously from about 396 to about 305. The simultaneous respective translation, rotation and widening of the first rectangle 920, the eclipse 930 and the second rectangle 940 occurs as the knob 912 moves upward along the slider 910, and the simultaneous variations in the horizontal position of the first rectangle 920, the rotation angle of the eclipse 930 and the width of the second rectangle 940 all track the change in the vertical position of the slider knob 912 in real time. A user can also enter 305 at the input box of the 'KnobY' ribbon 916 of the slider 910 to move the slider knob 912 to a vertical position of 305. This would cause the horizontal position value at the 'PositionX' ribbon 924 of the first rectangle 920, the rotation angle value at the 'Rotation' ribbon 934 of the eclipse 930 and the width value at the 'Width' ribbon 944 of the second rectangle 940 to correspondingly change to 305 respectively and simultaneously shift the first rectangle 920 to a horizontal position of 305, rotates the eclipse 930 to an angle of 305 and increase the width of the second rectangle 940 to 305.

In this example, the exemplary GUI 300 is used to create three binding connections between one property of one object and three properties of three other objects where each of the three other objects has one separate property of the three properties. In various implementations, the exemplary GUI 300 can be used to create two or more binding connections between one or more properties of one object and two or more properties of two or more other objects where each of the two or more other objects can have one or more separate properties of the two or more properties. For example, the GUI 300 can be used to create two binding connections between one property of one object and two properties of two other objects where each of the two other objects has one separate property of the two properties; the GUI can be used to create four binding connections between one property of one object and four properties of four other objects where each of the four other objects has one separate property of the four properties; the GUI can be used to create three to six binding connections between two properties of one object and three properties of three other objects where each of the three other objects has one separate property of the three properties; the GUI can be used to create four to eight binding connections between two properties of one object and four properties of three other objects where one of the three other objects has two separate properties of the four properties and the other two of the three other objects each has one separate property of the two remaining properties; and so on. In general, the GUI 300 can be used to create M (M≥N) or N (N≥M) to M*N binding connections between M properties of one object and N properties of X other objects (M, N, X are all integers and M≥1 and N≥X≥2).

In FIGS. 10A-10D, the GUI 300 is used to create two binding connections between two properties of two objects, where each of the two objects has one separate property of the two properties, and two properties of another object. In this example, the GUI 300 includes a first checkbox 1010 and a second checkbox 1020 that each is respectively linked with a message center 1012, 1022 and an inspector 1019, 1029. Each of the message centers 1012, 1022 includes one or more input ribbons that can be specific to respective checkbox 1010, 1020. For instance, each message center 1012, 1022 includes a 'Toggle' ribbon 1014, 1024 for toggling respective checkbox 1010, 1020; a 'Check' ribbon 1015, 1025 for checking respective checkbox 1010, 1020; and a 'Uncheck' ribbon 1016, 1026 for unchecking respective checkbox 1010, 1020. Each of the message centers 1012, 1022 also includes one or more property ribbons that can be specific to respective checkbox 1010, 1020. For instance, each message center 1012, 1022 includes a 'Checked' ribbon 1017, 1027 where a user can check or uncheck respective checkbox 1010, 1020 by setting the Boolean variable to 'T' or 'F'.

The GUI 300 also includes a truth table 1030 that is also linked with a message center 1032 and an inspector 1046. The message center 1032 includes one or more input ribbons that can be specific to the truth table 1030. For instance, the message center 1032 includes a 'Restart' ribbon 1034 for restarting the truth table 1030. The message center 1032 also includes one or more property ribbons that can be specific to the truth table 1030. For instance, the message center 1032 includes a 'Value' ribbon 1035 where a user can store a result of the truth table 1030 as an integer.

In this case, the 'Checked' ribbon 1017 of the first checkbox 1010 that indicates whether or not the first checkbox 1010 is checked is connected, via one wire 1050, with the first 'CheckBox Checked' ribbon 1037 of the truth table 1030 that correlates to the first four Boolean variables of the first row 1038 of the truth table 1030, and the 'Checked' ribbon 1027 of the second checkbox 1020 that indicates whether or not the second checkbox 1020 is checked is connected, via another wire 1052, with the second 'CheckBox Checked' ribbon 1039 of the truth table 1030 that correlates to the first four Boolean variables of the second row 1040 of the truth table 1030. For example, a user can first pull the wire 1050 from an outlet port 1017*b* of the 'Checked' ribbon 1017 of the first checkbox 1010 and extend the wire 1050 to bind it to an inlet port 1037*a* of the first 'CheckBox Checked' ribbon 1037 of the truth table 1030 and then pull the wire 1052 from an outlet port 1027*b* of the 'Checked' ribbon 1027 of the second checkbox 1020 and extend the wire 1052 to bind it to an inlet port 1039*a* of the second 'CheckBox Checked' ribbon 1039 of the truth table 1030 so as to respectively connect the first and second checkboxes 1010, 1020 with the truth table 1030 by locking the Boolean variable indicating the check status of the first checkbox 1010 with the first four Boolean variables of the first row 1038 of the truth table 1030 and by locking the Boolean variable indicating the check status of the second checkbox 1020 with the first four Boolean variables of the second row 1040 of the truth table 1030.

Figure 10A:
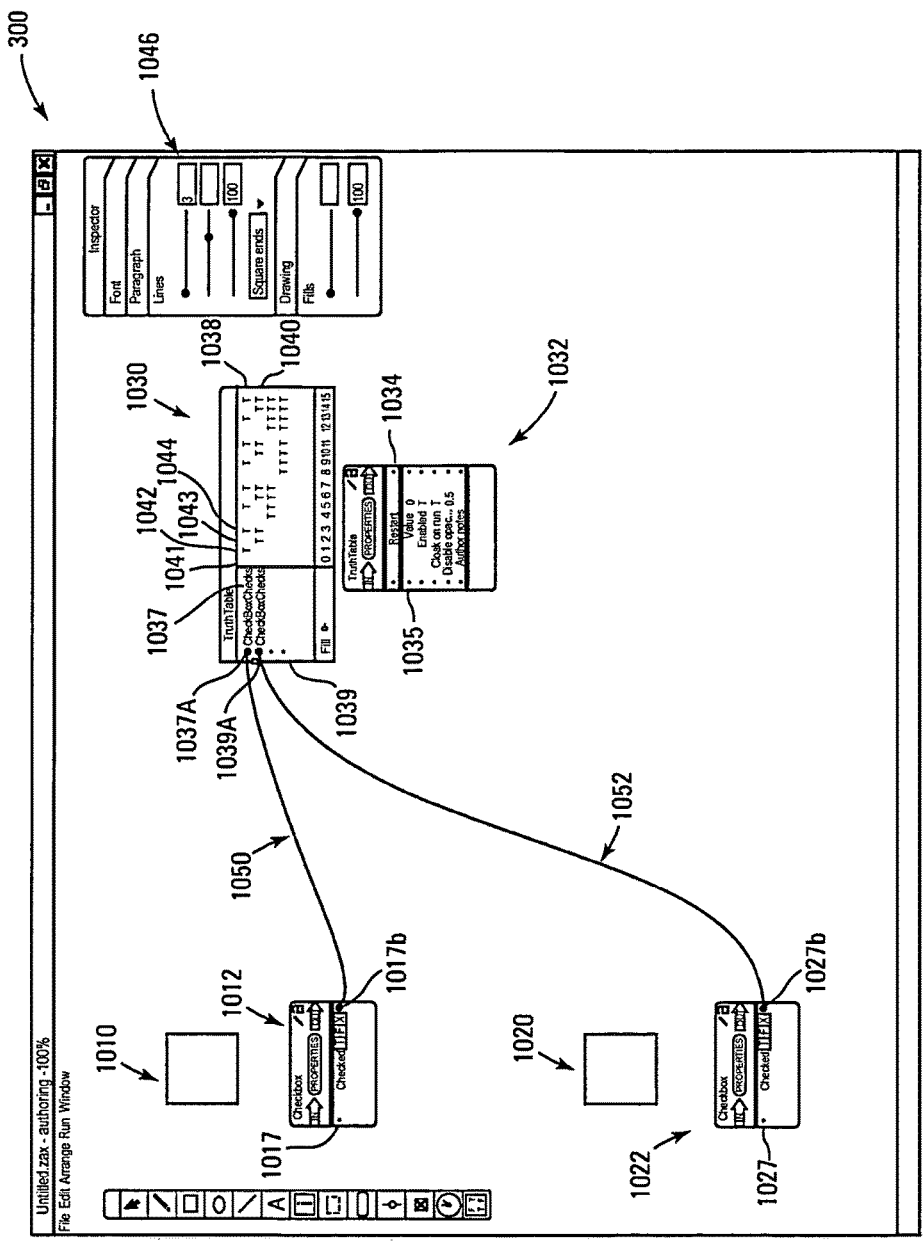
Figure 10B:
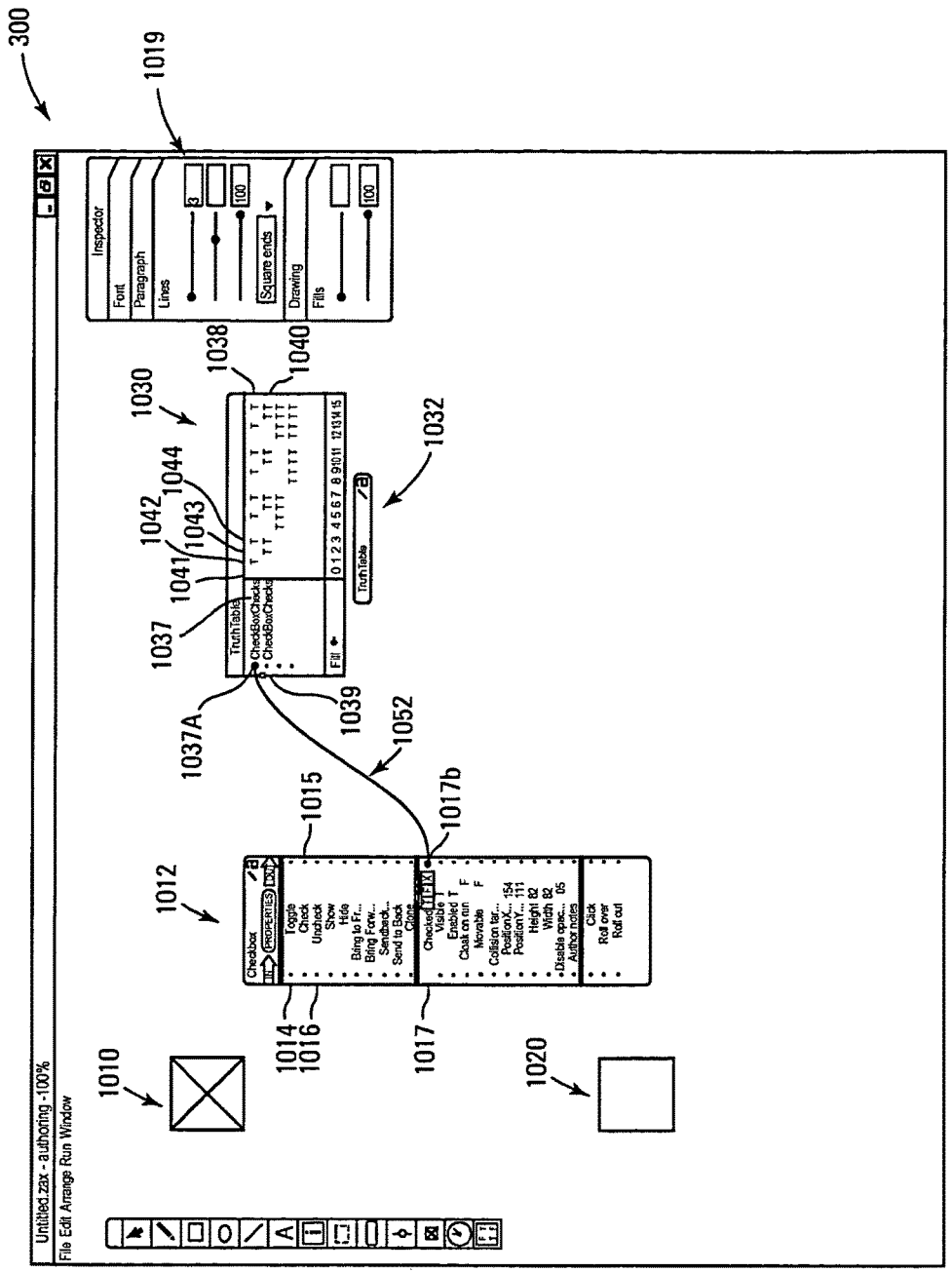
Figure 10A:
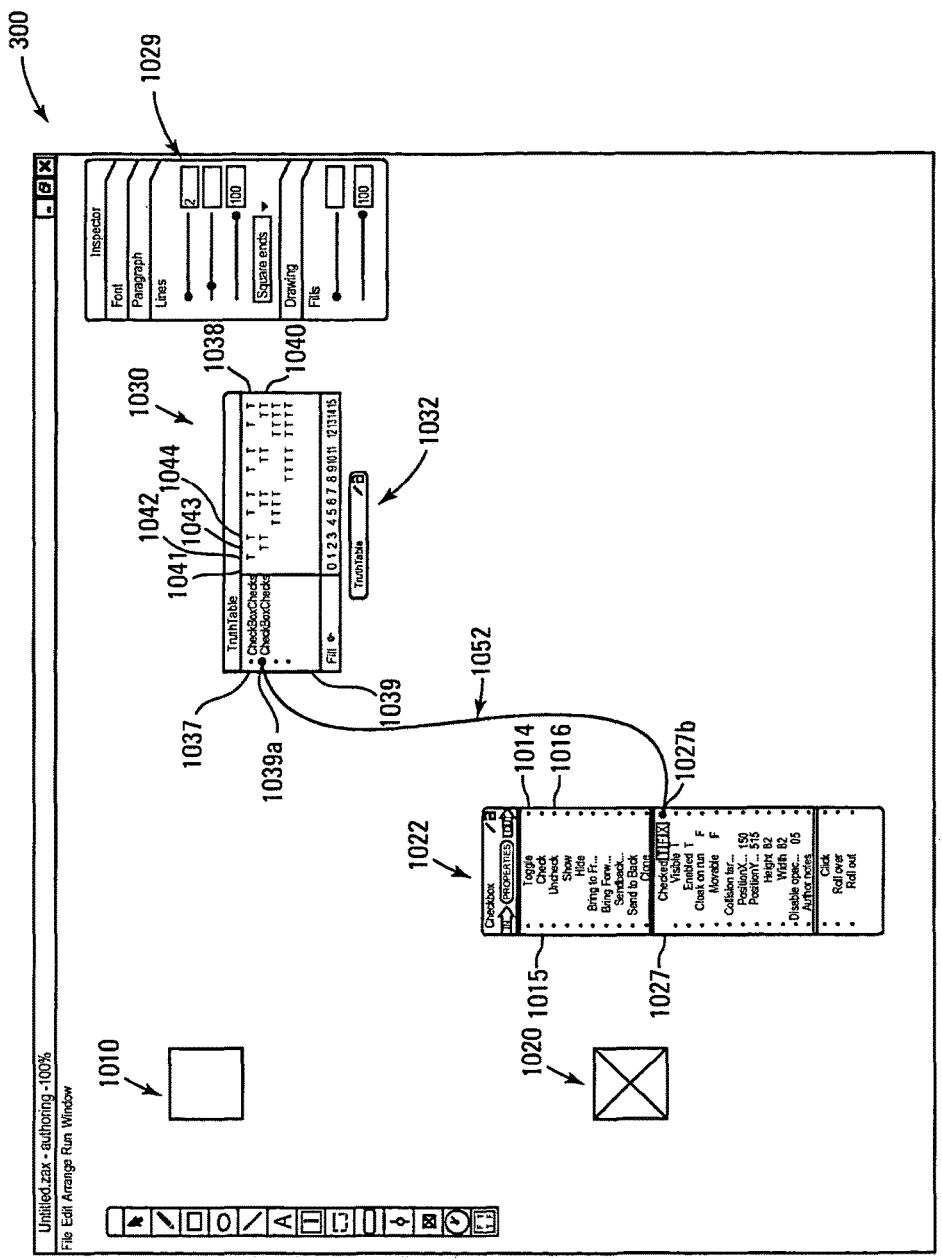
Figure 10D:
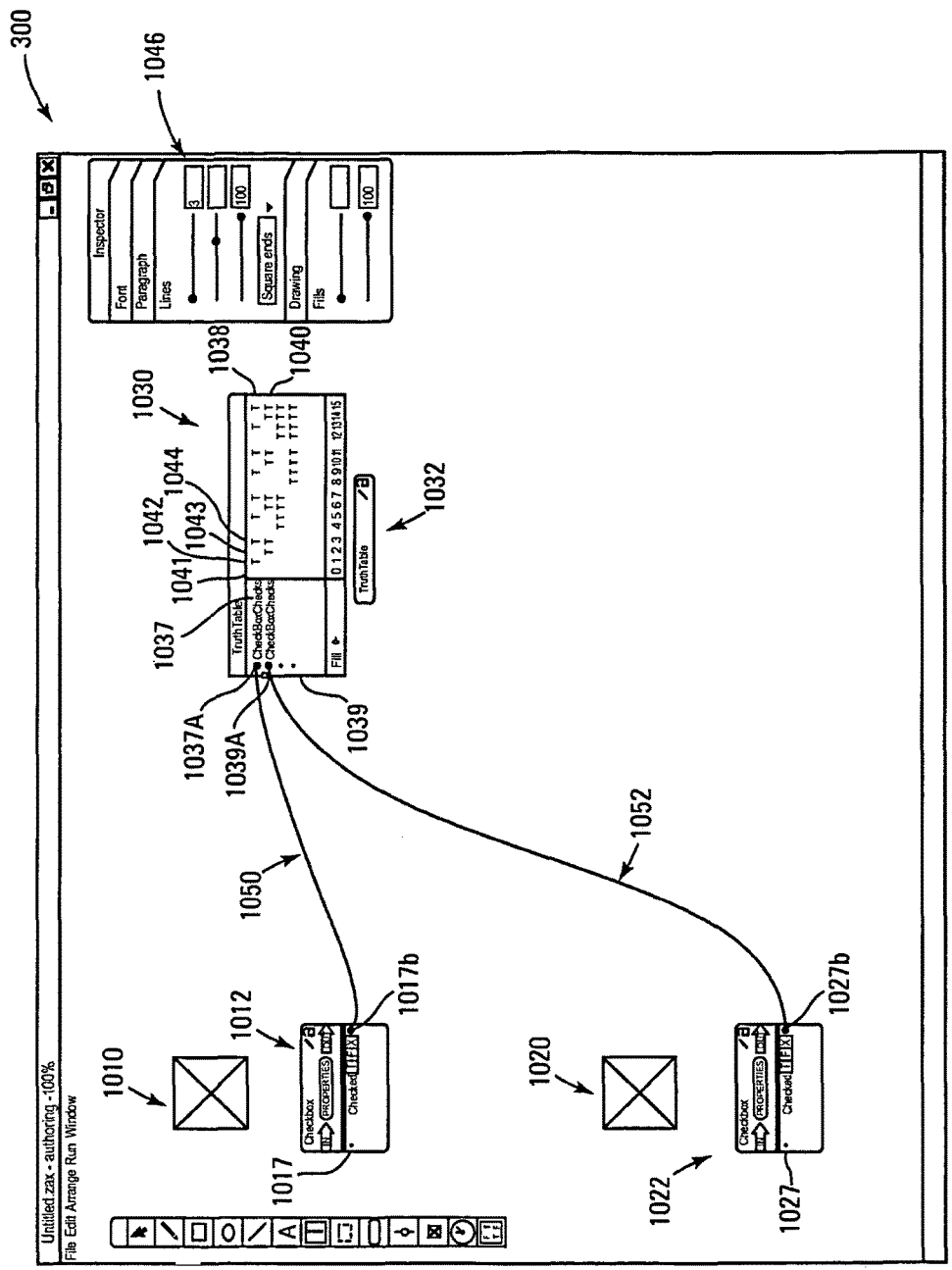

Through such binding connections 1050, 1052, a user can selectively check and/or uncheck the first and/or second checkboxes 1010, 1020 to vary the first four Boolean variables of both the first row 1038 and the second row 1040 of the truth table 1030 in any suitable combinations. For instance, in FIG. 10A both the first checkbox 1010 and the second checkbox 1020 are unchecked. This is reflected in the truth table 1030 as the first column 1041 being highlighted where the first Boolean variable of both the first row 1038 and the second row 1040 of the truth table 1030 is set to 'F'. In FIG. 10B the first checkbox 1010 is checked while the second checkbox 1020 is unchecked. This is reflected in the truth table 1030 as the second column 1042 being highlighted where the second Boolean variable of the first row 1038 of the truth table 1030 is set to 'T' while the second Boolean variable of the second row 1040 of the truth table 1030 is set to 'F'. In FIG. 10C the first checkbox 1010 is unchecked while the second checkbox 1020 is checked. This is reflected in the truth table 1030 as the third column 1043 being highlighted where the third Boolean variable of the first row 1038 of the truth table 1030 is set to 'F' while the third Boolean variable of the second row 1040 of the truth table 1030 is set to 'T'. In FIG. 10D both the first checkbox 1010 and the second checkbox 1020 are checked. This is reflected in the truth table 1030 as the fourth column 1044 being highlighted where the fourth Boolean variables of both the first row 1038 and the second row 1040 of the truth table 1030 are set to 'T'.

In this example, the exemplary GUI 300 is used to create two binding connections between two properties of two objects, where each of the two objects has one separate property of the two properties, and two properties of another object. In various implementations, the exemplary GUI 300 can be used to create two or binding connections between two or more properties of two or more objects, where each of the two or more objects can have one or more separate properties of the two or more properties, and two or more properties of one or more other objects, where each of the one or more other objects can have one or more separate properties of the two or more properties. For example, the GUI 300 can be used to create three to six binding connections between two properties of two objects, where each of the two objects has one separate property of the two properties, and three properties of two other objects, where one of the two other objects has one separate property of the three properties and the other of the two other objects has the two remaining properties; the GUI 300 can be used to create six to twenty-four binding connections between four properties of three objects, where one of the three objects has two separate properties of the four properties and the other two of the three objects each has one separate property of the two remaining properties, and six properties of three other objects, where each of the three other objects has two separate properties of the six properties; and so on. In general, the GUI 300 can be used to create M (M≥N) or N (N≥M) to M*N binding connections between M properties of X objects and N properties of Y other objects (M, X, N, Y are all integers; M≥X≥; N≥Y≥1).

In FIGS. 11A-11D, the GUI 300 is used to create two binding connections that bind three objects in series. In this example, the GUI 300 includes a rectangle 1110, an eclipse 1120, and a slider 1130 having a knob 1132 that each is respectively linked with a message center 1112, 1122, 1134 and an inspector (only the inspector 1126 for the eclipse 1120 is shown). The 'PositionY' ribbon 1114 of the rectangle 1110 that correlates to the vertical position of the rectangle 1110 is connected, via a wire 1140, with the 'PositionX' ribbon 1124 of the eclipse 1120 that correlates to the horizontal position of the eclipse 1120 and the 'PositionX' ribbon 1124 of the eclipse 1120 is connected, via a wire 1142, with the 'KnobY' ribbon 1136 of the slider 1130 that correlates to the vertical position of the slider knob 1132. For example, a user can first pull the wire 1140 from an outlet port 1114b of the 'PositionY' ribbon 1114 of the rectangle 1110 and extend the wire 1140 to bind it to an inlet port 1124a of the 'PositionX' ribbon 1124 of the eclipse 1120 and then pull the wire 1142 from an outlet port 1124b of the 'PositionX' ribbon 1124 of the eclipse 1120 and extend the wire 1142 to bind it to an inlet port 1136a of the 'KnobY' ribbon 1136 of the slider 1130 so as to connect the rectangle 1110, the eclipse 1120 and the slider 1130 together in series by locking the vertical position of the rectangle 1110 with the horizontal position of the eclipse 1120 and by locking the horizontal position of the eclipse 1120 with the vertical position of the slider knob 1132 and in turn also locking the horizontal position of the rectangle 1110 with the vertical position of the slider knob 1132.

Figure 11A:
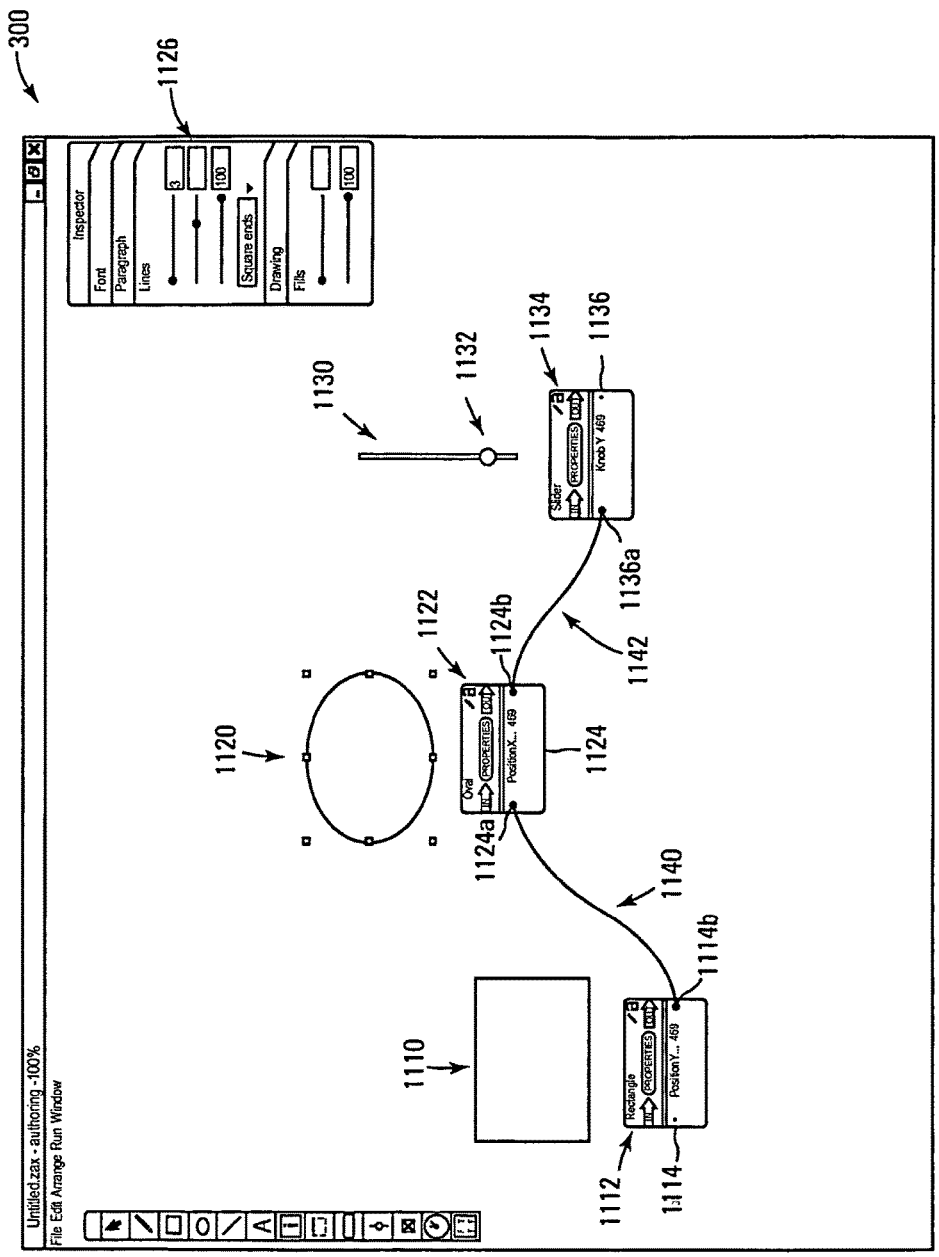
Figure 11B:
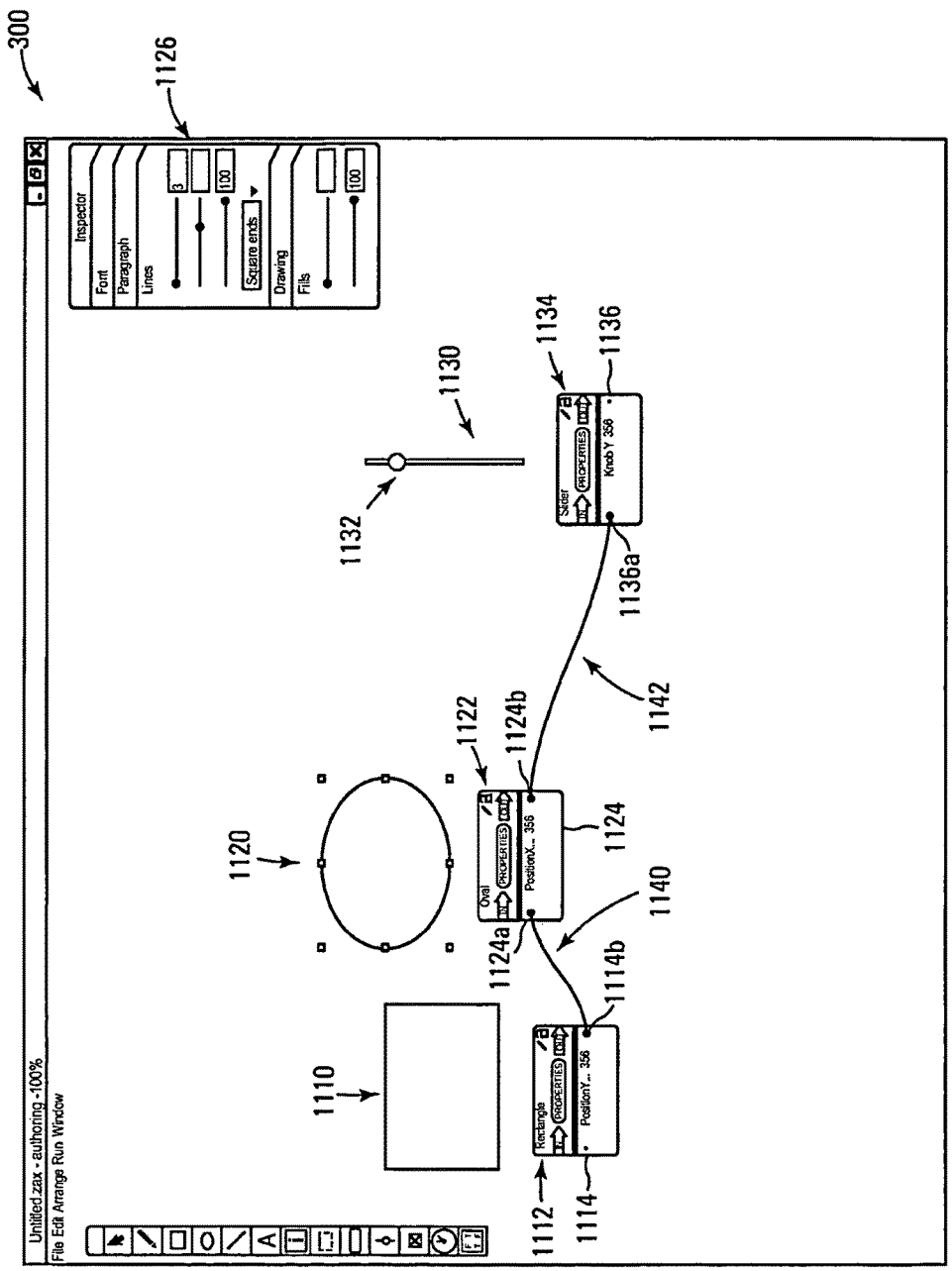
Figure 11A:
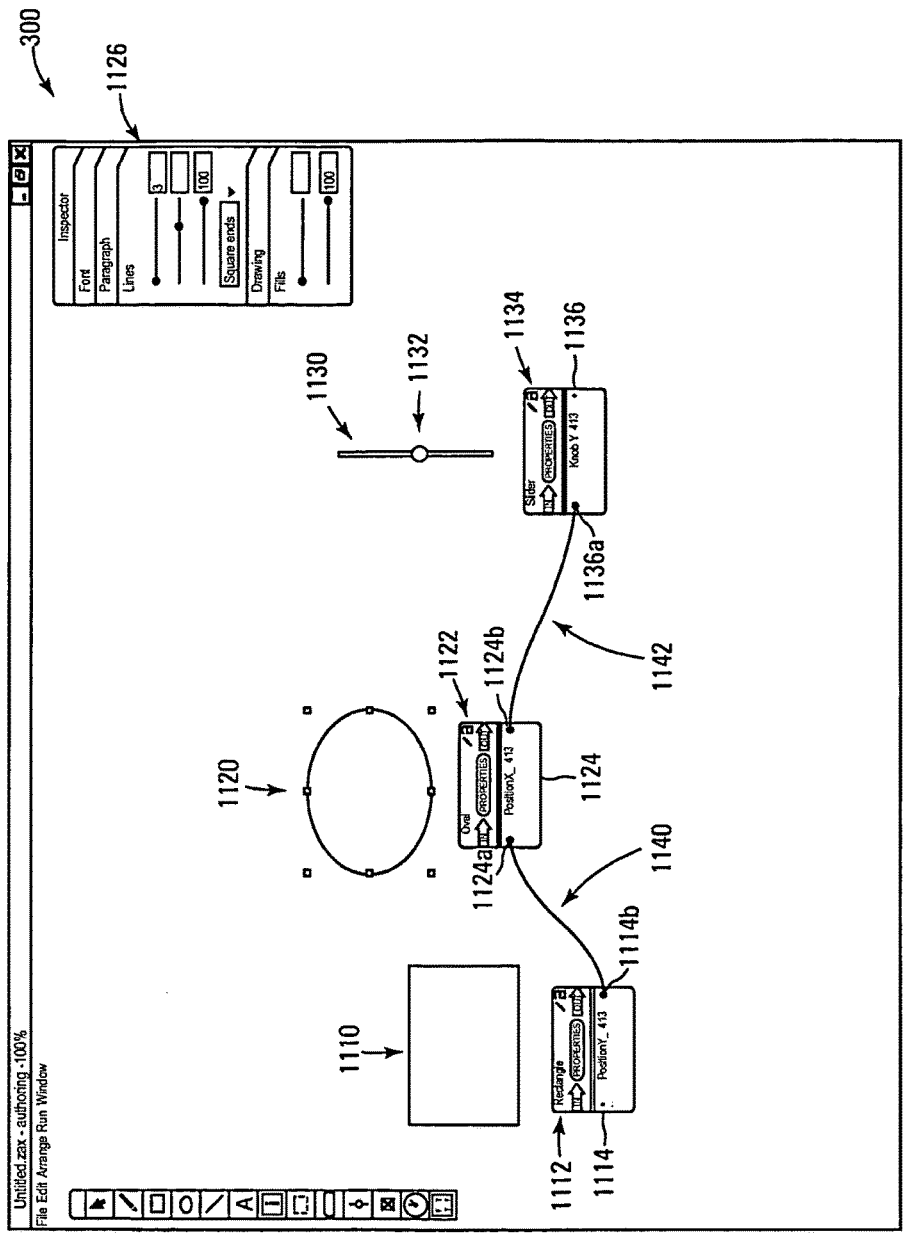
Figure 11D:
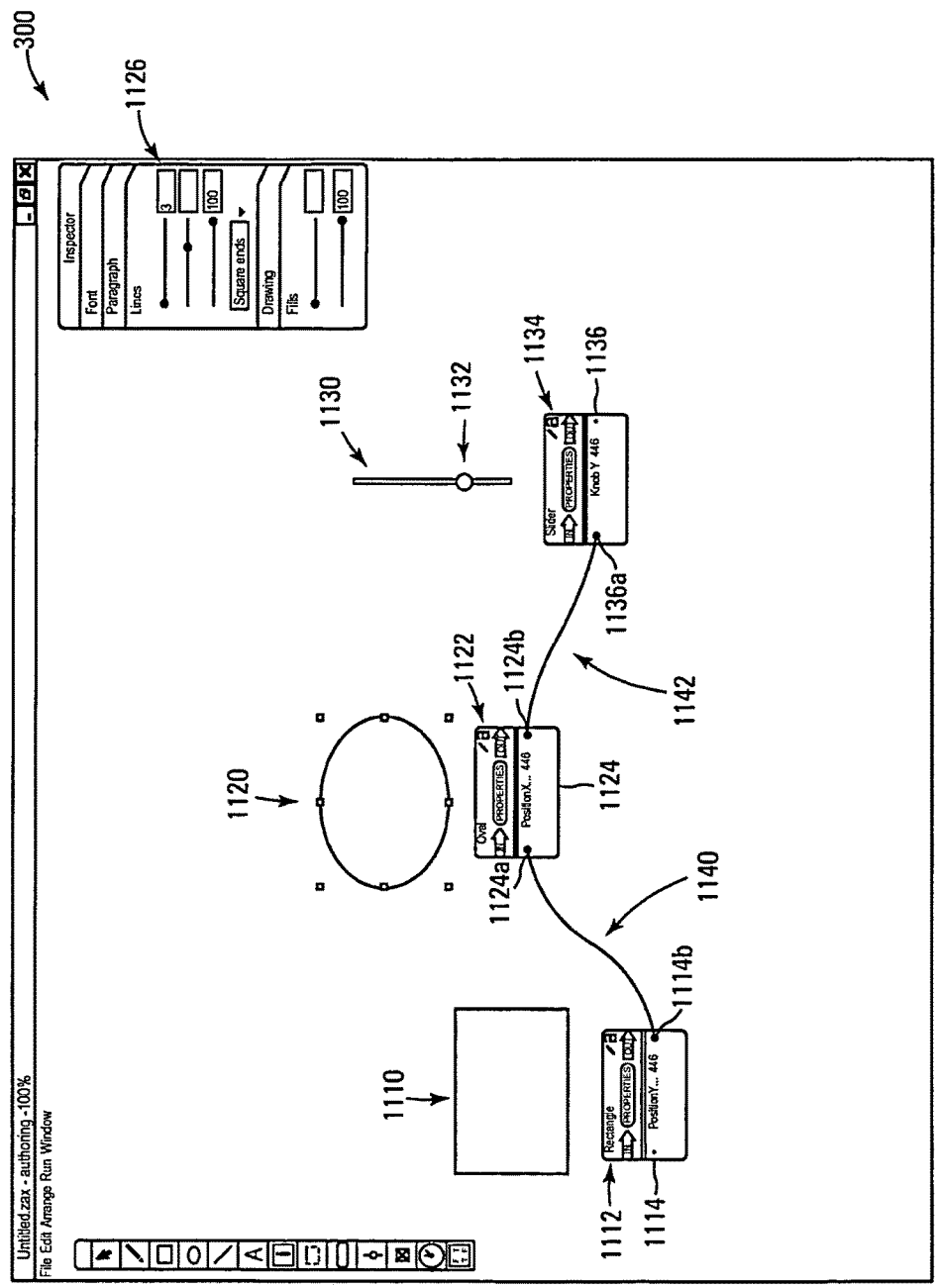

Through such binding connections 1140, 1142, a user can move the rectangle 1110 up and down to simultaneously move the eclipse 1120 horizontally and the slider knob 1132 vertically, or move the eclipse 1120 left and right to simultaneously move the rectangle 1110 and the slider knob 1132 vertically, or slide the knob 1132 up and down along the slider 1130 to simultaneously move the rectangle 1110 vertically and the eclipse 1120 horizontally. For instance, in FIG. 11A the vertical position of the rectangle 1110 is set to about 469. Since the 'PositionY' ribbon 1114 of the rectangle 1110 is linked with the 'PositionX' ribbon 1124 of the eclipse 1120 which is further linked with the 'KnobY' ribbon 1136 of the slider 1130, the horizontal position of the eclipse 1120 and the vertical position of the slider knob 1132 are also set to about 469 respectively. In FIG. 11B a user can continuously change the vertical position of the rectangle 1110 from about 469 to about 356 by moving the rectangle 1110 upward. This would cause the eclipse 1120 to move toward left and the slider knob 1132 to move upward simultaneously where both the horizontal position of the eclipse 1120 and the vertical position of the slider knob 1132 also continuously vary from about 469 to about 356. The concurrent translations of the eclipse 1120 and the slider knob 1132 occurs at the same time as the rectangle 1110 moves, and the variations in the horizontal position of the eclipse 1120 and the vertical position of the slider knob 1132 track the change in the vertical position of the rectangle 1110 in real time. A user can also enter 356 at the input box of the 'PositionY' ribbon 1114 of the rectangle 1110 to shift the rectangle 1110 to a vertical position of 356. This would cause both the horizontal position value at the 'PositionX' ribbon 1124 of the eclipse 1120 and the vertical position value at the 'KnobY' ribbon 1136 of the slider 1130 to correspondingly change to 356 and simultaneously move the eclipse 1120 to a horizontal position of 356 and the slider knob 1132 to a vertical position of 356. In FIG. 11C a user can continuously vary the horizontal position of the eclipse 1120 from about 356 to about 413 by moving the eclipse 1120 toward right. This would cause the rectangle 1110 and slider knob 1132 to move downward simultaneously where the vertical positions of both the rectangle 1110 and the slider knob 1132 also change continuously from about 356 to about 413. The simultaneous translations of the rectangle 1110 and the slider knob 1132 occur at the same time as the eclipse 1120 moves, and the changes in the horizontal positions of both the rectangle 1110 and the slider knob 1132 match the variation in the horizontal position of the eclipse 1120 in real time. A user can also enter 413 at the input box of the 'PositionX' ribbon 1124 of the eclipse 1120 to move the eclipse 1120 to a horizontal position of 413. This would cause the vertical position values at both the 'PositionY' ribbon 1114 of the rectangle 1110 and the 'KnobY' ribbon 1136 of the slider 1130 to correspondingly change to 413 and concurrently shift both the rectangle 1110 and the slider knob 1132 to a vertical position of 413. In FIG. 11D a user can continuously change the vertical position of the slider knob 1132 from about 413 to about 446 by moving the slider knob 1132 downward. This would cause the eclipse 1120 to move toward right and the rectangle 1110 to move downward simultaneously where both the horizontal position of the eclipse 1120 and the vertical position of the rectangle 1110 also vary continuously from about 413 to about 446. The concurrent translations of the eclipse 1120 and the rectangle 1110 occur at the same time as the slider knob 1132 moves, and the variations in the horizontal position of the eclipse 1120 and the vertical position of the rectangle 1110 follow the change in the vertical position of the slider knob 1132 in real time. A user can also enter 446 at the input box of the 'KnobY' ribbon 1135 of the slider 1130 to shift the slider knob 1132 to a vertical position of 446. This would cause the horizontal position value at the 'PositionX' ribbon 1124 of the eclipse 1120 and the vertical position value at the 'PositionY' ribbon 1114 of the rectangle 1110 to both change correspondingly to 446 and at the same time move the eclipse 1120 to a horizontal position of 446 and the rectangle 1110 to a vertical position of 446.

In this example, the exemplary GUI 300 is used to create two binding connections that bind three objects in series where a change in the value of a property of one object would cause a corresponding change in the respective values of two separate properties of the other two objects. In various implementations, the exemplary GUI 300 can be used to create three or more binding connections that bind four or more objects in series where a change in the value of a property of any one object would cause a corresponding change in the respective values of multiple separate properties of the rest of the objects. In some embodiments, one or more of the objects connected in series can be linked to one or more other objects so as to create a network of binding connections.

Turning now to FIGS. 12A-12C, 13A-C, 14A-C and 15A-C, a first user can utilize the exemplary GUI 300 shown in FIG. 3 to allow a second user to change one or more properties of one or more objects at runtime without giving the second user physical access to the one or more properties of the one or more objects. For example, the first user can first set the exemplary GUI 300 to operate in an authoring mode where the first user can create one or more binding connections between one or properties of one or more other objects and the one or more properties of the one or more objects. The one or more binding connections created link together the one or more properties of the one or more other objects and the one or more properties of the one or more objects so that the one or more properties of the one or more other objects and the one or more properties of the one or more objects respectively share the same value or values. As such, a change in the value or values of the one or more properties of the one or more other objects at runtime leads to a corresponding change in the value or values of the one or more properties of the one or more objects at runtime. The first user can then set the GUI 300 to operate in a run mode where the one or more binding connections created by the first user and the message centers linked with those objects are no longer shown by the GUI 300. The second user thus has no physical access to the one or more properties of the one or more objects, for example, via a message center or message centers, where the second user can directly change the value or values of the one or more properties of the one or more objects, like the first user can while the GUI operates in an authoring mode. The second user, however, can still vary the one or more properties of the one or more objects at runtime, through the one or more binding connections that the first user creates at the authoring mode, by changing the one or more properties of the one or more other objects at runtime. To illustrate using an example, if the first user creates a binding connection between the horizontal position of a rectangle and the vertical position of an eclipse while the GUI 300 operates in an authoring mode, the first user gives the second user a right to change the vertical position of the eclipse by moving the rectangle in the horizontal direction.

In FIGS. 12A-12C, the first user employs the exemplary GUI 300 to allow the second user to change a property of one object at runtime without giving the second user a direct access to that property of the one object. In FIG. 12A, the GUI 300 operates in an authoring mode. In this example, the GUI 300 includes a slider 1210 having a knob 1212 that is linked with a message center 1214 and an inspector (not shown). The GUI 300 also includes a drawing 1220 that also is linked with a message center 1222 and an inspector 1226. In this case, the drawing 1220 includes a Roman numeral '2'. While authoring, the first user can create a binding connection between the slider 1210 and the drawing 1220 via a visual wire 1230. For instance, the first user can pull the wire 1230 from an outlet port 1216b of a 'Value' ribbon 1216 of the slider 1210, which ribbon correlates to the position of the knob 1212 on the slider 1210, and extend the wire 1230 to bind it to an inlet port 1224a of a 'Rotation' ribbon 1224 of the drawing 1220, which ribbon correlates to the rotation angle of the drawing 1220, so as to connect the slider 1210 and the drawing 1220 together by locking the position of the knob 1212 on the slider 1210 with the rotation angle of the drawing 1220. In this example, the position of the knob 1212 on the slider 1210 is set to about 0. Since the 'Value' ribbon 1216 of the slider 1210 is linked with the 'Rotation' ribbon 1224 of the drawing 1220, the rotation angle of the drawing 1220 is also set to about 0. FIG. 13B shows the GUI 300 where the first user sets the GUI 300 in a run mode after the first user creates the binding connection 1230. At the run mode, the GUI 300 no longer displays the binding connection 1230 that the first user creates at the authoring mode and the message centers 1214 and 1222 for direct access to control various properties of the slider 1210 and the drawing 1220 respectively. In FIG. 13C, the GUI 300 still operates in the run mode where the second user can rotate the drawing 1220 clockwise and counter-clockwise by moving the knob 1212 up and down along the slider 1210. At runtime, the second user cannot physically access the message center 1222 to vary the rotation angle of the drawing 1220 as the message center 1222 is not shown by the GUI 300. The second user, however, can still rotate the drawing 1220 by moving the knob 1212 along the slider 1210. In this example, the second user rotates the drawing 1220 clockwise by about 75 degrees by moving the slider knob 1212 from the bottom of the slider 1210 that has a value of 0 to a position on the slider 1210 having a value of about 75 (the top of the slider has a value of 100). As the second user moves the slider knob 1212 upward or downward, the drawing 1220 simultaneously rotates clockwise or counter-clockwise in real time.

In FIGS. 13A-13C, the first user utilizes the exemplary GUI 300 to allow the second user to simultaneously change two properties of one object at runtime without giving the second user direct access to those two properties of the one object. In FIG. 13A, the GUI 300 operates in an authoring mode. In this example, the GUI 300 includes a slider 1310 having a knob 1312 that is linked with a message center 1314 and an inspector (not shown). The GUI 300 also includes a button 1320 that also is linked with a message center 1322 and an inspector 1331. The message center 1322 includes one or more property ribbons that can be specific to the button 1320. For instance, the message center 1322 includes a 'Momentary' ribbon 1324 where a user can specify whether or not the button 1320 behaves like momentary switch by setting the Boolean variable to 'T' or 'F'; an 'On' ribbon 1325 where a user can switch the button 1320 between an On state and an Off state by setting the Boolean variable to 'T' or 'F'; an 'OnColor' ribbon 1326 where a user can specify the color of the button 1320 when the button 1320 is at the On state by inputting a preselected color value; and a 'Corner Radius' ribbon 1327 where a user can specify the radius of the four button corners by inputting a preselected radius value. While authoring, the first user can create two binding connections between the slider 1310 and the button 1320 via two wires 1340, 1342. For instance, the first user can pull the wire 1340 from an outlet port 1316b of a 'Value' ribbon 1316 of the slider 1310, which ribbon correlates to the position of the knob 1312 on the slider 1310, and extend the wire 1340 to bind it to an inlet port 1328a of a 'Text' ribbon 1328 of the button 1320, which ribbon correlates to the text shown on the button 1320, and then pull the wire 1342 from the outlet port 1316b of the 'Value' ribbon 1316 of the slider 1310 and extend the wire 1342 to bind it to an inlet port 1329a of a 'Height' ribbon 1329 of the button 1320, which ribbon correlates to the height of the button 1320, so as to connect the slider 1310 and the button 1320 together by respectively locking the position of the knob 1312 on the slider 1310 with the text shown on the button 1320 and with the height of the button 1320. In this example, the position of the knob 1312 on the slider 1310 is set to about 50. Since the 'Value' ribbon 1316 of the slider 1310 is respectively linked with the 'Text' ribbon 1328 and the 'Height' ribbon 1329 of the button 1320, the text shown on the button 1320 and the height of the button 1320 are also set to about 50 respectively. FIG. 13B shows the GUI 300 where the first user sets the GUI 300 in a run mode after the first user creates the two binding connections 1340, 1342. At the run mode, the GUI 300 does not display the two binding connections 1340, 1342 that the first user creates at the authoring mode and the message centers 1314 and 1322 where a user can access to manage various properties of the slider 1310 and the button 1320 respectively. In FIG. 13C, the GUI 300 still operates in the run mode where the second user can concurrently increase or decrease the text value shown on the button 3120 and the height of the button 1320 by moving the knob 1312 up and down along the slider 1310. At runtime, the second user cannot directly access the message center 1322 to vary the text value shown on the button 3120 and/or the height of the button 1320 as the GUI 300 no longer shows the message center 1322. The second user, however, can still simultaneously vary the text value shown on the button 1320 and the height of the button 1320 by moving the knob 1312 along the slider 1310. In this example, the second user increases both the text value shown on the button 1320 and the height of the button 1320 from about 50 to about 100 by moving the slider knob 1312 from the middle of the slider 1310 having a value of 50 to the top of the slider having a value of 100 (the bottom of the slider has a value of 0). Both the text value shown on the button 1320 and height of the button 1320 increase or decrease at the same time as the second user moves the slider knob 1312 upward or downward.

As shown in FIGS. 12A-12C and 13A-13C, a first user can use the exemplary GUI 300 to allow a second user to change one or two properties of one object at runtime by linking, via one or two binding connections, the one or two properties of the one object with a property of another object during authoring. In various implementations, the first user can use the exemplary GUI 300 to allow the second user to vary one or more properties of one object either individually or together or in any suitable combinations by linking, via one or more binding connections, the one or more properties of the one object with one or more properties of one or more other objects during authoring. For instance, while authoring the first user can respectively link a property of one object with three separate properties of another object via three binding connections so that the second user can vary the property of the one object during runtime by respectively changing the three properties of the another object; during authoring the first user can respectively link three separate properties of one object with three separate properties of another object via three to nine binding connections such that the second user can change the three properties of the one object at runtime either individually or together or in any suitable combinations by varying the three properties of the another object at runtime either individually or together or in any suitable combinations; while authoring the first user can link three separate properties of one object with two separate properties of another object via three to six binding connections where one property of the one object is linked with one property of the another object and the remaining two properties of the one object are respectively linked with the other property of the another object, so that the second user can change the one property of the one object that has one binding connection, or the remaining two properties of the one object that have two binding connections, or all three properties of the one object together by varying the two properties of the another object separately or simultaneously; during authoring the first user can link two separate properties of one object with three separate properties of another object via three to six binding connections where one property of the one object is linked with one property of the another object and the other property of the one object is respectively linked with the remaining two properties of the another object, such that the second user can vary the two properties of the one object separately or concurrently by changing the one property of the another object that has one binding connection or by respectively changing the two remaining properties of the another object that have two binding connections, or in any suitable combinations thereof; and so on. In general, the first user can use the exemplary GUI 300 to allow the second user, at runtime, to change N property or properties of one object either individually or together or in any suitable combinations by linking, while authoring, the N property or properties of the one object with M property or properties of X other object or objects via N (N≥M) or M (M≥N) to M*N binding connections (N, M, X are all integers that are 1 or greater and M≥X).

In FIGS. 14A-14C, the first user employs the exemplary GUI 300 to allow the second user to change two properties of two objects at runtime without giving the second user direct access to those two properties of the two objects. In FIG. 14A, the GUI 300 operates in an authoring mode. In this example, the GUI 300 includes a slider 1410 having a knob 1412 that is linked with a message center 1414 and an inspector (not shown). The GUI 300 also includes a line 1420 and an eclipse 1430 that each is also linked with a message center 1422, 1432 and an inspector (only the inspector 1436 for the eclipse is shown). While authoring, the first user can create two binding connections between the slider 1410 and the line 1420 and the eclipse 1430 via two wires 1450, 1452. For instance, the first user can pull the wire 1450 from an outlet port 1416b of a 'Value' ribbon 1416 of the slider 1410, which ribbon correlates to the position of the knob 1412 on the slider 1410, and extend the wire 1450 to bind it to an inlet port 1424a of a 'Rotation' ribbon 1424 of the line 1420, which ribbon correlates to the rotation angle of the line 1420, and then pull the wire 1452 from the outlet port 1417b of a 'Value position' ribbon 1417 of the slider 1410, which ribbon also correlates to the position of the knob 1412 on the slider 1410, and extend the wire 1452 to bind it to an inlet port 1434a of a 'Rotation' ribbon 1434 of the eclipse 1430, which ribbon correlates to the rotation angle of the eclipse 1430, so as to connect together the slider 1410 and the line 1420 and the eclipse 1430 respectively by locking the position of the knob 1412 on the slider 1410 with the respective rotation angles of the line 1420 and eclipse 1430. In this example, the position of the knob 1412 on the slider 1410 is set to about 0. Since the 'Value' ribbon 1416 and the 'Value position' ribbon 1417 of the slider 1410 are linked with the respective 'Rotation' ribbons 1424, 1434 of the line 1420 and the eclipse 1430, the rotation angles of both the line 1420 and the eclipse 1430 are also set to about 0. FIG. 14B shows the GUI 300 where the first user sets the GUI 300 in a run mode after the first user creates the two binding connections 1450, 1452. At the run mode, the GUI 300 does not show the two binding connections 1450, 1452 that the first user creates at the authoring mode and the message centers 1414, 1422, 1432 for direct access to control various properties of the slider 1410, the line 1420 and the eclipse 1430 respectively. In FIG. 14C, the GUI 300 still operates in the run mode where the second user can rotate the line 1420 and eclipse 1430 together clockwise or counter-clockwise by sliding the knob 1412 up and down along the slider 1410. At runtime, the second user cannot physically access the message centers 1422, 1432 to vary the rotation angle for either the line 1420 or the eclipse 1430 since the message centers 1422, 1432 are no longer displayed by the GUI 300. The second user, however, can still simultaneously rotate the line 1420 and the eclipse 1430 by moving the knob 1412 along the slider 1410. In this example, the second user rotates both the line 1420 and the eclipse 1430 clockwise by about 90 degrees by sliding the slider knob 1412 from the bottom of the slider 1310 that has a value or position value of 0 to a position having a value or position value of about 90 (the top of the slider has a value or position value of 100). As the second user moves the slider knob 1412 upward or downward, the line 1420 and the eclipse 1440 rotates concurrently in real time.

In this example, the first user uses the exemplary GUI 300 to allow the second user to change two properties of two objects, where each of the two objects has a separate property of the two properties, at runtime by respectively linking, via two binding connections, the two properties of the two objects with two separate properties of another object during authoring. In various implementations, the first user can use the exemplary GUI 300 to allow the second user to vary two or more properties of two or more objects, where each of the two or more objects has one or more separate properties of the two or more properties, either individually or together or in any suitable combinations by linking, via two or more binding connections, the two or more properties of the two or more objects with one or more properties of one or more other objects, where each of one or more other objects has one or more separate properties of the one or more properties, during authoring. For instance, while authoring the first user can respectively link three properties of three objects, each of the three objects has a separate property of the three properties, with a property of another object via three binding connections so that the second user can vary the three properties of the three objects together during runtime by changing the property of the another object; during authoring the first user can respectively link three properties of three objects, each of the three objects has a separate property of the three properties, with three properties of three others objects, each of the three other objects has a separate property of the three properties, via three to nine binding connections such that the second user can change the three properties of the three objects at runtime either individually or together or in any suitable combinations by varying the three properties of the three other objects at runtime either individually or together or in any suitable combinations; while authoring the first user can link four properties of three objects, where one of the three objects has two separate properties of the four property while the remaining two of the three objects each has a separate property of the remaining two properties, with two properties of two other objects, each of the two other objects has a separate property of the two properties, via four to eight binding connections so that the second user can change the four properties of the three objects either individually or together or in any suitable combinations by varying the two properties of the two other objects separately concurrently; during authoring the first user can link two properties of two objects, each of the two objects has a separate property of the two properties, with three properties of three other objects, each of the three other objects has a separate property of the three properties, via three to six binding connections such that the second user can vary the two properties of the two objects either separately or simultaneously by changing the three properties of the three other objects either individually or together or in any suitable combinations. In general, the first user can use the exemplary GUI 300 to allow the second user, at runtime, to change N properties of X objects either individually or together or in any suitable combinations by linking, while authoring, the N properties of the X objects with M property or properties of Y other object or objects via N (N≥M) or M (M≥N) to M*N binding connections (N, X, M, Y are all integers; N≥X≥2 and M≥Y≥1).

Figure 15A:
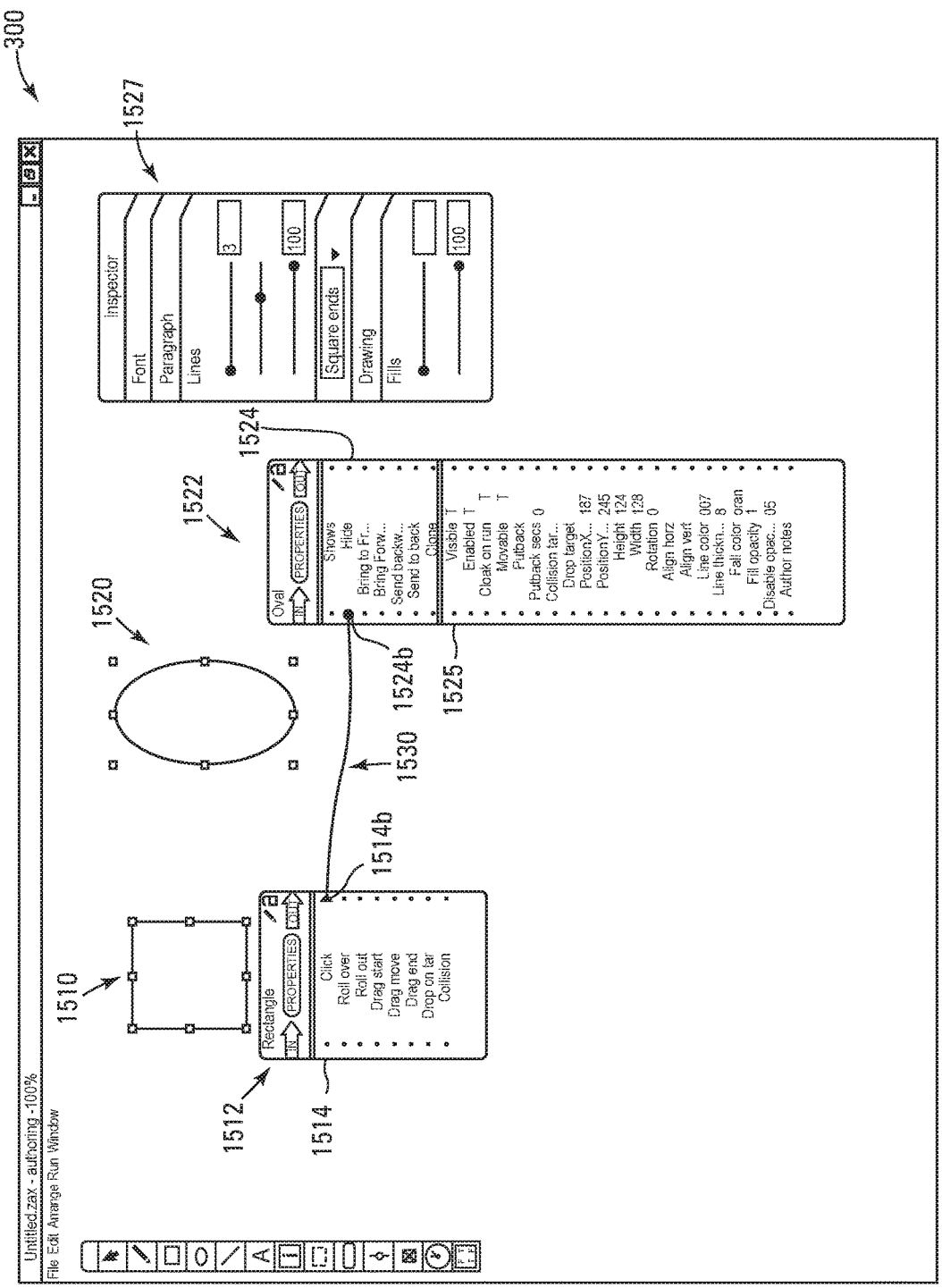
Figure 15B:
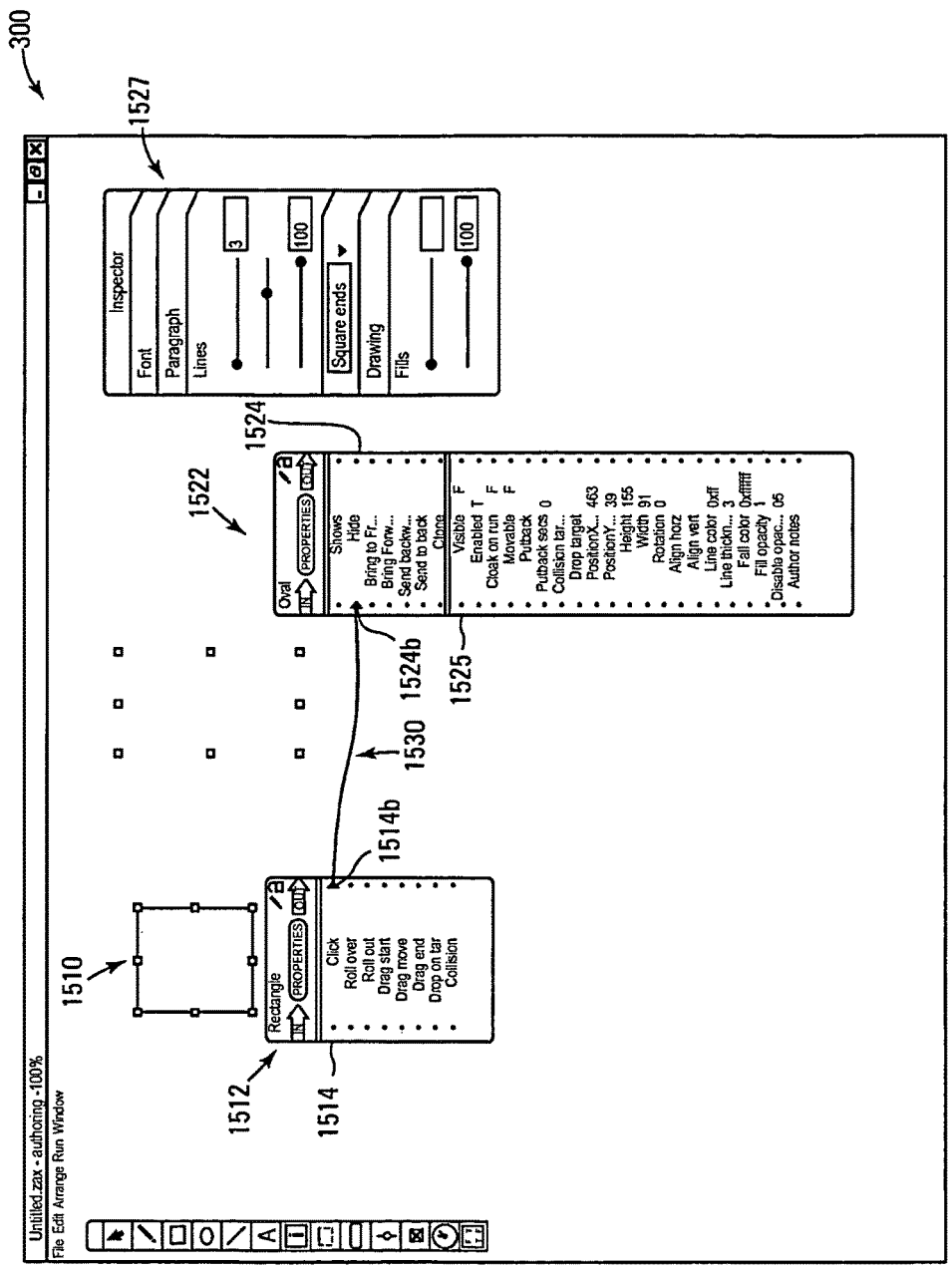
Figure 15A:
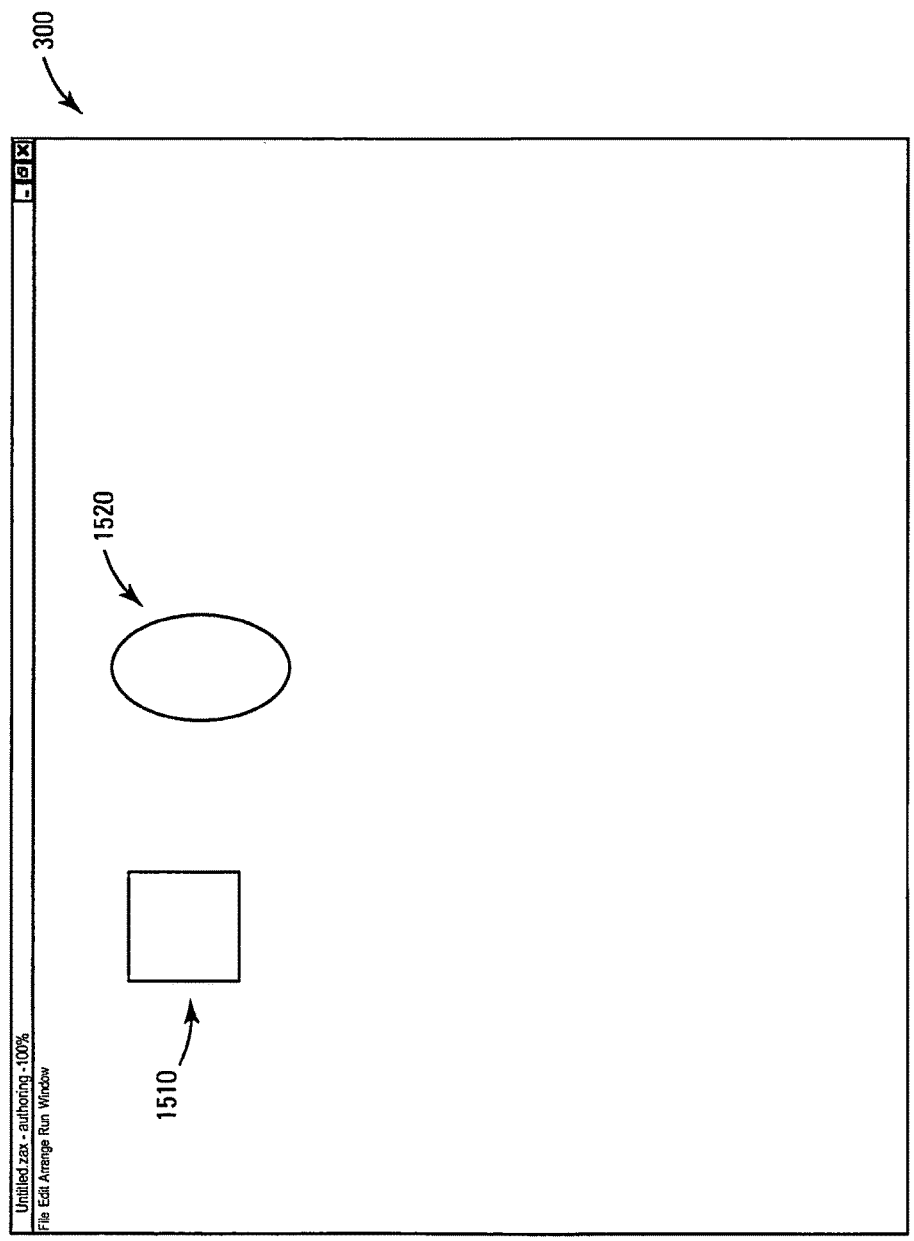
Figure 15D:
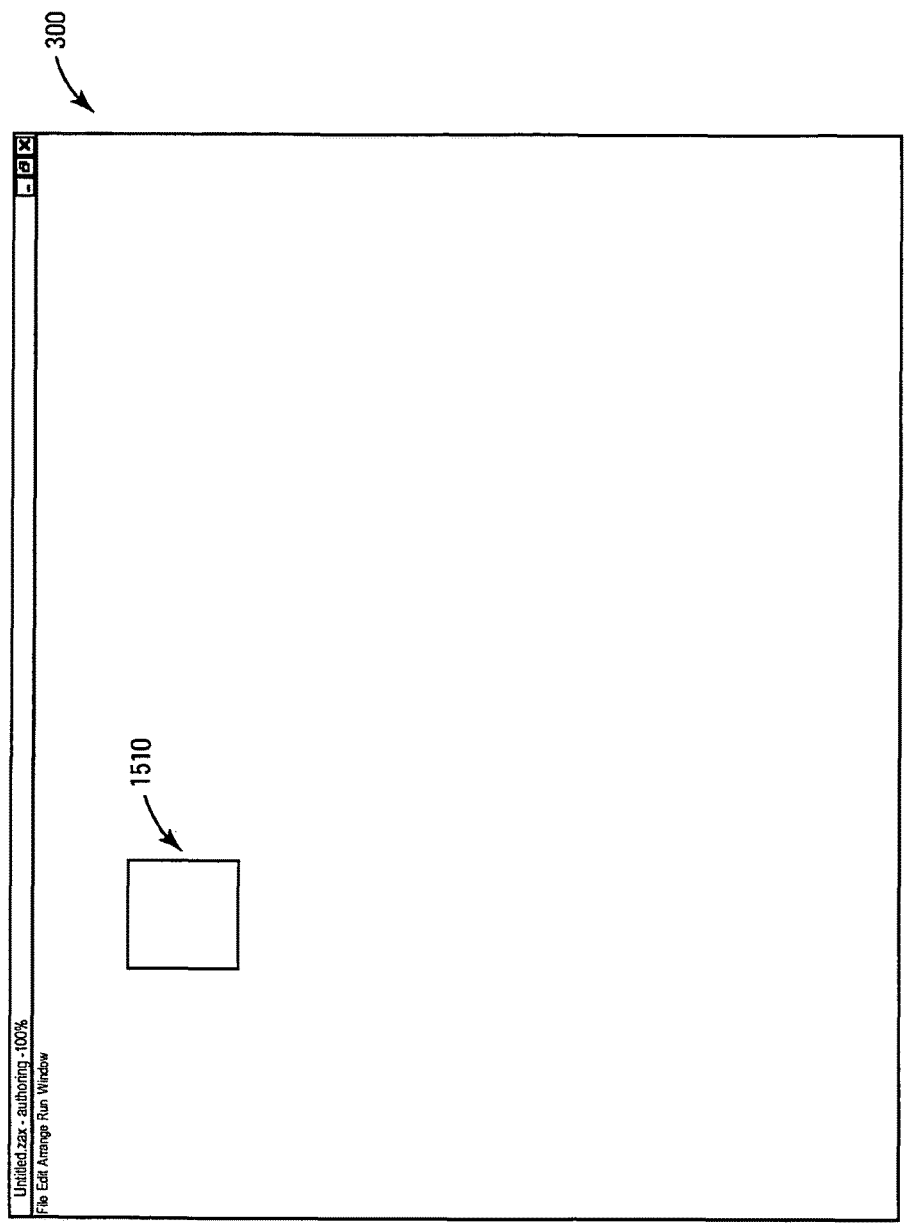

In FIGS. 15A-15D, the exemplary GUI 300 is used to change a state of one object during authoring and/or at runtime by varying a state of another object via a binding connection created while authoring that links an input ribbon of the one object with an output ribbon of the another object. In FIG. 12A, the GUI 300 operates in an authoring mode. In this example, the GUI 300 includes a rectangle 1510 and an eclipse 1520 that each is respectively linked with a message center 1512, 1522 and an inspector (only the inspector 1527 of the eclipse 1520 is shown). While authoring, a first user can create a binding connection between the rectangle 1510 and the eclipse 1520 via a visual wire 1530. For instance, the first user can pull the wire 1530 from an outlet port 1514b of a 'Click' ribbon 1516 of the rectangle 1510, which ribbon can send a message or command to another object when the rectangle 1510 is clicked by a user, and extend the wire 1530 to bind it to an inlet port 1524a of a 'Hide' ribbon 1524 of the eclipse 1520, which ribbon can hide the eclipse 1520 from the GUI screen upon receiving a message or command from another object, so as to connect the rectangle 1510 and the eclipse 1520 together by locking the status of whether or not the rectangle 1510 is clicked with the status of whether the eclipse 1520 is visible or hidden. In FIG. 15B the first user can make the eclipse 1520 disappear while the GUI 300 is at the authoring mode by clicking the rectangle 1510. As soon as the eclipse 1520 disappears from the GUI screen, the Boolean variable at the 'Visible' ribbon 1525 of the eclipse 1520 is changed from 'T' to 'F'. FIG. 15C shows the GUI 300 where the first user sets the GUI 300 in a run mode after the first user creates the binding connection 1530. At the run mode, the GUI 300 no longer displays the binding connection 1530 that the first user creates at the authoring mode and the message centers 1512 and 1522 that are respectively associated with rectangle 1510 and the eclipse 1520. In FIG. 13C the first user or a second user can make the eclipse 1520 disappear while the GUI 300 operates at the run mode by clicking the rectangle 1510.

In various implementations, the exemplary GUI 300 can be used to change one or more states of one or more objects during authoring and/or at runtime by varying one or more states of one or more other objects via one or more binding connections created while authoring that link one or more input ribbons of the one or more objects with one or more output ribbons of the one or more other objects. For instance, a user can use the GUI 300 to create two binding connections between two input ribbons of one object, which two ribbons can respectively change two different states of the one object upon receiving a message or command, and one output ribbon of another object, which ribbon can send out a message or command when a specific state of the another object is varied, so that the user and/or another user can change the two different states of the one object by varying the specific state of the another object during authoring or at runtime; a user can use the GUI 300 to create two binding connections between one input ribbon of one object, which ribbon vary a state of the one object upon receiving a message or command, and two output ribbons of another object, which two ribbons can respectively send out a message or command when two specific states of the another object are varied respectively, such that the user and/or another user can vary the state of the one object by respectively changing the two specific states of the another object during authoring or at runtime; a user can use the GUI 300 to create two binding connections between two input ribbons of two objects, each of the two ribbons can separately change a state of one of the two objects upon receiving a message or command, and one or two output ribbons of another object, which ribbon or ribbons can send out a message or command when a specific state or two specific states of the another object is or are varied, so that the user and/or another user can change two separate states of the two objects at the same time or one at a time by varying the specific state or the respective two specific states of the another object during authoring or at runtime; and so on. In some embodiments, the exemplary GUI 300 can be used to create one or more binding connections between one or more input ribbons of one object and one or more output ribbon of the same object. For instance, the 'Click' ribbon of a rectangle can be linked to the 'Hide' ribbon of the same rectangle so that, when a user clicks the rectangle, the same rectangle disappears from the GUI screen.

Referring now to FIG. 16, an exemplary system 1600 is provided that can be used to generate an exemplary GUI 1610 for wiring and binding two objects 1620, 1622. Some representative screenshots of the GUI 1610 are described above with reference to FIGS. 5A-5B, 6A-6B, 8A-8B, 12A, 13A and 15A-15B. The system 1600 includes a GUI generator 1640 that a user can use to define scenes for the GUI 1610. For example, the GUI generator 1630 can be a what-you-see-is-what-you-get (WYSIWYG) design interface that allows the user to select various objects from an object library 1640 that can include different objects as described above with reference to FIG. 3. For instance, the user can select from the object library 1640 a slider as object A (1620) and a rectangle as object B (1622) and then create the slider and the rectangle on the GUI screen. The user can then select appropriate message ribbons from a message ribbon library 1650 that can include various input, property and output ribbons as described above with reference to FIGS. 3, 4, 5A, 6B, 8A, 10A-10D, 12A and 13A to create message center A and B (1660, 1662) and then link the message centers A and B (1660, 1662) with objects A and B (1620, 1622) respectively. Alternatively, the GUI generator 1630 can create message centers A and B (1660, 1662) from the message ribbon library 1650 based on some predetermined selections of message ribbons that respectively correspond to objects A and B (1620, 1622) and then link message centers A and B (1660, 1662) with objects A and B (1620, 1622) respectively. In the case where the user selects a slider as objet A (1620) and a rectangle as object B (1622), the user or the GUI generator 1630 can create message center A (1660) similar to the message center 335 shown in FIG. 3 and message center B (1672) similar to the message center 514 shown in FIG. 5A and then respectively link message centers A and B (1660, 1662) with objects A and B (1620, 1622) (in this case the slider and the rectangle).

The user can then use the GUI generator 1630 to create one or more binding connections 1670 between objects A and B (1620, 1622) (in this case n is an integer that is 1 or greater). For example, the user can create one or more connecting wires 1670 from a wire library 1680 that can provide various wiring shapes, curvatures and/or configurations as described above with reference to FIGS. 5A-5B, 6A-6B, 8A-8B, 9A-9B, 10A-10D, 11A-11D, 12A, 13A, 14A and 15A-15B to bind one or more property ribbons in message center A (1660) to one or more property ribbons in message center B (1662). Through such binding connections 1670, the one or more properties of object A (1620) share the same value or values as the one or more properties of object B (1622). As such, the user can change the one or more properties of object A (1620) while authoring or at runtime by varying the one or more properties of object B (1622), or vice versa. In some implementations, the user can create one or more connecting wire 1670 from the wire library 1680 to bind one or more output ribbons in message center A (1660) or message center B (1662) to one or more input ribbons in message center B (1662) or message center A (1660) so that the user can trigger a change in one or more states of object A (1620) or object B (1622) by initiating one or more events or conditions on object B (1622) or object A (1620). Using the case where a slider is selected as objet A (1620) and a rectangle is selected as object B (1622) as an illustrative example, the user can create a visual wire to bind the 'Value' ribbon of the slider to the 'Rotation' ribbon of the rectangle and another visual wire to bind the 'KnobY' ribbon of the slider to the 'PositionY' ribbon of the rectangle such that the user can simultaneously rotate the rectangle and move the rectangle vertically by sliding the knob up and down along the slider. The user can also create a visual wire to bind the 'Hit top' ribbon of the slider to the 'Hide' ribbon of the rectangle so that the user can make the rectangle disappear by sliding the knob all the way to the top of the slider.

In some implementations, the output of the GUI generator 1630 is a machine-readable file that the system 1600 can interpret so as to display the GUI 1610 on a display device. The machine-readable file can include a markup language file such as a hybrid XML and JSON file that may define various attributes of the objects, message centers and/or wiring connections created by the user while designing the GUI 1610 with the GUI generator 1630.

Turning now FIG. 17, an exemplary method is provided that can be used to implement the exemplary system 1600 shown in FIG. 16 to wire and bind two objects using the GUI 1610. At step 1710, a user creates on the GUI screen 1610 a first object selected from the object library 1640. The first object has one or more properties suitable for that object. At step 1720, the user or the GUI generator 1630 creates a first message center that corresponds to the first object. The first message center includes one or more ribbons selected from the message ribbon library 1650. The first message center is then linked with the first object so that the one or more ribbons in the first message center can control the one or more properties of the first object. At step 1730, the user creates on the GUI screen 1610 a second object also selected from the object library 1640. The second object also has one or more properties suitable for that object. At step 1740, the user or the GUI generator creates a second message center that corresponds to the second object. The second message center also includes one or more ribbons also selected from the message ribbon library 1650. The second message center is then linked with the second object such that the one or more ribbons in the second message center can control the one or more properties of the second object. At step 1750, the user creates one or more binding connections in terms of one or more visual wires from the wire library 1680 to bind the one or more ribbons in the first message center to the one or more ribbons in the second message center. The one or more binding connections created lock the one or more properties of the first object with the one or more properties of the second object such that the respective one or more properties of the first and second objects share the same value or values. At step 1760, the user can thus change the one or more properties of the first object so as to induce a corresponding change in the one or more properties of the second object via the one or more binding connections created.

Referring now to FIG. 18, an exemplary subsystem 1800 suitable for use in the exemplary system 1600 shown in FIG. 16 is provided for creating and regulating a binding connection. The subsystem 1800 includes a wire manager 1810 that can create a binding wire 1820 selected from a wire library 1830 and controls the functioning of the binding wire 1820. The wire manager 1810 can be a subcomponent embedded within the GUI generator 1630 shown in FIG. 16 or a separate component within the exemplary system 1600 shown in FIG. 16 that communicates with the GUI generator 1630. The binding wire 1820 links two objects 1840, 1846 via their respective message centers 1842, 1848. At one end, the binding wire 1820 connects to the message center 1842 of the master object 1840. This wire end can be denoted as the master end. At the other end, the binding wire 1820 connects to the message center 1848 of the slave object 1846. This wire end can be denoted as the slave end. The wire manager 1810 includes a master object pointer 1650 and a slave object pointer 1652 that point to the respective properties of the master object 1840 and the slave object 1846 that are linked together by the binding wire 1820. The wire manager 1810 also includes a master object modifier 1670 and a slave object modifier 1672 that can initiate and/or register a property or state change at the master object 1840 and the slave object 1846 respectively. When a property or state change occurs at the master object 1840 or the slave object 1846, the master object modifier 1860 or the slave object modifier 1862 sends the property or state change to the slave object modifier 1862 or the master object modifier 1860, which then initiates a corresponding property or state change in the slave object 1846 or the master object 1840 by way of reference to the slave object pointer 1852 or the master object pointer 1850. In the case of a race condition where property or state changes are detected at both ends of the wire 1820 during a single cycle, the property or state change occurred at the master end would dominate any property or state change at the slave end. This can be accomplished by using a wire mediator 1870 that interfaces between the wire manager 1810 and the GUI 1880 so as to allow the GUI 1880 to interact with the binding wire 1820 to establish wiring directionality. For example, a rotation ribbon of an object can be connected to a value ribbon of a slider having a knob via a first wire and also to a timing value ribbon of a clock via a second wire. When the position of the slider knob and the clock timing value both change during a single cycle, the mediator 1870 can determine the wiring configurations of the first and second wires and communicate the configurations determined to the wire manager 1810 so that the wire manager 1810 can establish a proper wiring direction to influence the rotation of the object. For instance, if the clock is connected to a master end of the second wire, the wire mediator 1870 would communicate the master status of the clock to the wire manager 1810 so as to allow the change of the clock to dominate the change of the slider and thus the object would rotate as the clock timing value changes despite that a user moves the knob along the slider at the same time. On the other hand, if the slider is connected to a master end of the first wire, the wire mediator 1870 would communicate the master status of the slider to the wire manager 1810 so that the change of the slider would dominate the change of the clock and thus the object would rotate as a user slides the knob up and down along the slider even though the clock timing value also changes at the same time. In the case where both the slider and the clock are connected to respective master ends of the first and second wires, the wire manager 1810 can assign one of the slider and the clock as a primary master object and the other as a second master object such that the change of the primary master object would dominate the change of the second master object.

Referring now to FIG. 19, an exemplary method is provided that can be used to customize the binding direction when there is a race condition. At step 1910, a user can first create two objects on a GUI screen where each object has a separate property, and then create a binding connection between the two properties of the two objects, for example, by connecting a visual wire between the respective property ribbons in the message centers that are respectively linked with the two objects. At the step 1920, one end of the binding wire can be designated as the master end and the other end as the slave end. At step 1930, the two properties of the two objects are periodically monitored until a property change is detected at one wiring end. At step 1940, a determination is made with regard to whether a property change also occurs at the other wiring end. If so, at step 1950 the property change at the master end would induce a corresponding property change at the slave end. Otherwise, at step 1960 the property change detected at one wiring end (whether it is the master end or the slave end) would cause a corresponding property change at the other end.

Turning now to FIG. 20, the exemplary system 1600 shown in FIG. 16 is used to generate the exemplary GUI 1610 for wiring and binding three or more objects in series (in this case m is an integer that is 3 or greater). Some representative screenshots of the GUI 1610 are described above with reference to FIGS. 11A-11D. A user can first use the GUI generator 1630 to create three or more objects on the GUI screen. Using the case of three objects (m=3) as an illustrative example, the user can select from the object library 1640, for instance, a rectangle as object 1 (2020), an oval as object 2 (2022), and a slider as object m (2024) and then respectively create object 1 (2020, rectangle), object 2 (2022, oval) and object m (2024, slider) on the GUI screen. Message centers 1, 2 and m (2060, 2062, 2064) can then be created by selecting appropriate message ribbons from the message ribbon library 1650 and linked with objects 1, 2 and m (2020, 2022, and 2024) respectively. In the case where the user selects a rectangle as object 1 (2020), an oval as object 2 (2022) and a slider as object m (2024), message Center 1 (2060) can resemble the message center 335 shown in FIG. 3, message center 2 (2062) can resemble the message center 812 shown in FIG. 8A, and message center m (2064) can resemble the message center 514 shown in FIG. 5A.

The user can then create two or more sets of binding connections to link together the three or more objects created in series (in this case $n_1, n_2 \ldots n_{(m-1)}$ are integers that are 1 or greater and can be equal to or different from one another). Still using the case of three objects (m=3) as an illustrative example, the user can create two sets of binding wires 2070, 2072 from the wire library 1680 so as to connect objects 1, 2 and m (2020, 2022, 2024) in series by linking respective property ribbon or ribbons of message centers 1, 2 and m (2060, 2062, 2064) in series. In this example, the two sets of binding connections 2070, 2072 can have same or different number of wires. In the case where a rectangle is selected as object 1 (2020), an oval is selected as object 2 (2022), and a slider is selected as object m (2024), the user can, for example, create one visual wire to bind the 'PositionY' ribbon of the rectangle to the 'PositionX' ribbon of the oval and another visual wire to bind the 'PositionX' ribbon of the oval to the 'KnobY' ribbon of the slider so that the rectangle, oval and slider are linked together in series.

Through such binding connections 2070, 2072, the user can vary one or more properties of any one of the three or more linked objects to change one or more properties of the rest of the linked objects during authoring and/or at runtime. Still using the case where a rectangle is selected as object 1 (2020), an oval is selected as object 2 (2022), and a slider is selected as object m (2024) as an illustrative example, the user can simultaneously move the oval horizontally and the slider knob vertically by moving the rectangle up and down; simultaneously move the rectangle and the slider knob vertically by moving the oval left and right; or simultaneously move the rectangle vertically and the oval horizontally by moving the slider knob up and down.

In some implementations, the user can create two or more sets of binding connections to link three or more objects in series by connecting one or more output ribbons to one or more inputs on respective message centers of the three or more objects so that the user can initiate one or more events or conditions on any one of the three or more linked objects so as to trigger a change in one or more states of the rest of the linked objects. Using the case of three objects as an illustrative example where a rectangle is selected as object 1 (2020), an oval is selected as object 2 (2022) and a slider is selected as object m (2024), the user can create a visual wire to bind the 'Hit top' ribbon of the slider to the 'Hide' ribbon of the oval and another visual wire to bind the 'Hide' ribbon of the oval to the 'Hide' ribbon of the rectangle so that the user can make both the oval and the rectangle disappear by sliding the knob all the way to the top of the slider.

Referring now to FIG. 21, an exemplary subsystem 2100 suitable for use in the exemplary system 1600 shown in FIGS. 16 and 20 is provided for creating and regulating two or more binding connections that are linked in series. The subsystem 2100 includes a wire manager 2110 that can create from a wire library 1640 two or more binding wires that are linked in series (in this case n is an integer that is 2 or greater). The wire manager 2110 can also control the functioning of the two or more binding wires created. The wire manager 2110 can be a subcomponent embedded within the GUI generator 1630 shown in FIGS. 16 and 20 or a separate component that communicates with the GUI generator 1630. The subsystem 2100 also includes a wire controller 2120 in communication with the wire manager 2110 that can direct the wire manager 2110 to affect necessary event changes in the binding wires. The subsystem 2100 further includes a wire mediator 2130 that can detect a wire event change that may be triggered by a property or state change at any objects linked by the binding wires and then report the wire event change detected to the wire controller 2120. The wire mediator 2130 can include a listener (not shown) that may regularly monitor the linked objects and/or the binding wires for any wire event changes. In some embodiments, the wire controller 2120 can be combined with the wire mediator 2130 to form a single component. In this example, when the wire controller 2120 is notified by the wire mediator 2130 about a wire event change, the wire controller 2120 commands the wire manager 2110 to propagate the wire event change through all relevant binding wires so as to update necessary property or state changes at all relevant objects. The subsystem 2100 can also include an object manager 2140 that can create objects on a GUI screen from an object library (not shown), regulate the behaviors of the objects created, and monitor any property or state changes that may occur at those objects and then communicate the changes to the wire controller 2120. The object manager 2140 can be a subcomponent embedded within the GUI generator 1630 shown in FIGS. 16 and 20 or a separate component that communicates with the GUI generator 1630.

Using the case of three binding wires (n=3) as an illustrative example, a user can use the wire manager 2110 to create three binding wires 2150, 2160, 2170 to connect four objects in series. For each binding wire created, the wire manager 2110 can establish a master object pointer 2152 and a master object modifier 2154 at a master end of the wire 2150, and a slave object pointer 2156 and a slave object modifier 2158 on a slave end of the wire 2150. The wire manager 2110 can also establish a master object pointer 2162 and a master object modifier 2164 on a master end of the wire 2160, and a slave object pointer 2166 and a slave object modifier 2168 on a slave end of the wire 2160. The wire manager 2110 can further establish a master object pointer 2172 and a master object modifier 2174 on a master end of the wire 2170, and a slave object pointer 2176 and a slave object modifier 2178 on a slave end of the wire 2170. In this example, for each wire 2150, 2160, 2170, the master object pointer 2152, 2162, 2172 of the wire 2150, 2160, 2170 points to a specific property or state ribbon of a master object to which the wire 2150, 2160, 2170 is connected at its master end and pairs with the master object modifier 2154, 2164, 2174 of the wire 2150, 2160, 2170, and the slave object pointer 2156, 2166, 2176 of wire 2150, 2160, 2170 points to a specific property or state ribbon of a slave object to which the wire 2150, 2160, 2170 is connected at its slave end and pairs with the slave object modifier 2158, 2168, 2178 of the wire 2150, 2160, 2170. Also, for each wire 2150, 2160, 2170, the master object modifier 2154, 2164, 2174 of the wire 2150, 2160, 2170 can initiate and/or register a property or state change in the master object that is linked to the wire 2150, 2160, 2170, and the slave object modifier 2158, 2168, 2178 of the wire 2150, 2160, 2170 can initiate and/or register a property or state change in the slave object that is linked of the wire 2150, 2160, 2170. In some embodiments, the wire manager 2110 can establish a single object pointer for each wire that includes a master object subsection that points to a specific property or state ribbon of a master object to which the wire is connected at a master end and a slave object subsection that points to a specific property or state ribbon of a slave object to which the wire is connected at a slave end. In some embodiments, the wire manager 2110 can establish a single object modifier for each wire that includes a master object subsection that can initiate and/or register a property or state change in a master object that is linked to the wire end and a slave object subsection that can initiate and/or register a property or state change in a slave object that is linked to the wire.

Using the case of two binding wires, e.g., wire 1 (2150) and wire 2 (2160), linking three objects in series as an illustrative example, the wire mediator 2130 can monitor any wire event changes that may occur at any of the two wires 2150, 2160. When a property or state change occurs at one of the three objects linked, the wire mediator 2130 can detect a wire event change that is triggered by the property or state change and the report the wire event change to the wire controller 2120 by sending, e.g., an object pointer that points to a ribbon at which the property or state has been changed. With the object pointer received, the wire controller 2120 can identify the specific wire(s) that is linked to the ribbon changed by way of mapping the received object pointer to the object pointers stored by the object manager 2140. With the relevant wire or wires identified, the wire controller 2120 can then command the wire manager 2110 to propagate the wire event change through both wires so as to update necessary property or state changes at all of the three objects linked. In the case of a race condition where wire event changes are detected at both wire 1 (2150) and wire 2 (2160) during a single cycle, the wire mediator 2130 can communicate with the wire controller 2120 so as to direct the wire manager 2110 to establish a proper wiring direction where a property or state change occurred at a master end would dominate any property or state changes occurred at other ends, as described above.

Using the case shown in FIG. 20 where a rectangle is selected as object 1 (2020), an oval is selected as object 2 (2022), and a slider is selected as object m (2024) as an illustrative example, the wire manager 2110 of the subsystem 2100 can create two binding wires, e.g., wire 1 (2150) and wire 2 (2160), to connect the three objects 2020, 2022, 2024 in series. Wire 1 (2150) can link the 'Position Y' ribbon of the rectangle 2020 with the 'Position X' ribbon of the oval 2022. Wire 2 (2160) can link the 'Position X' ribbon of the oval 2022 to the 'Position Y' ribbon of the slider 2024. When a user slides the knob of the slider 2024 up and down to change the 'Position Y' property of the slider 2024, depending on whether the slider 2024 is designated as a master object or a slave object, the master object modifier 2164 or slave object modifier 2168 of wire 2 (2160) that is connected to the 'Position Y' ribbon of the slider 2024 would update its value and send a wire event change along with the master object pointer 2162 or the slave object pointer 2166 to the wire mediator 2130. The wire mediator 2130 can then report the wire event change and the master or object pointer 2162, 2166 to the wire controller 2130. The wire controller 2170 can identify that the change has occurred at the master or slave end of wire 2 (2160) by way of mapping the master or slave object pointer 2162, 2166 to the object pointer stored in the object manager 2140. The wire controller 2130 can then direct the wire manager 2110 to send the changed 'Position Y' property to the slave or master object modifier 2168, 2164 of wire 2 (2160). The wire controller 2130 can locate the 'Position X' ribbon of the oval 2022 to which the slave or master end of wire 2 (2160) is connected by way of mapping the slave or master object pointer 2166, 2162 of wire 2 (2160) to the object pointers stored in the object manager 2140 and then direct the wire manager 2110 to update the 'Position X' property of the oval 2022 with the changed 'Position Y' property of the slider 2024. When the 'Position X' property of the oval 2022 has been changed, the subsystem 2100 can propagate the change on wire 2 (2160) to wire 1 (2150) since both wires 2160, 2150 have one end that is connected to the 'Position X' ribbon of the oval 2022. In this case, the subsystem 2100 can change the 'Position Y' property of the rectangle 2020 in a manner that similar to what is described above. As such, the subsystem 2100 can propagate the wire event change that may occur at the master or slave end of wire 2 (2160) through the two relevant wires 2160, 2150. In the case of a race condition where, for example, the 'Position Y' property of the rectangle 2020 and the 'Position Y' property of the slider 2024 both change during a single cycle, the wire mediator 2130 can communicate with the wire controller 2120 to direct the wire manager 2110 to establish a proper wiring direction so as to propagate only one of the two changes above. For instance, if the slider 2024 is connected to the master end of wire 2 (2160), the change in the 'Position Y' property of the slider 2024 would dominate the change in the 'Position Y' property of the rectangle. In this situation, any change on wire 2 (2160) would propagate from wire 2 (2160) to wire 1 (2150). On the other hand, if the rectangle 2020 is connected to the master end of wire 1 (2150), the change in the 'Position Y' property of the rectangle 2020 would dominate the change in the 'Position Y' property of the slider 2024. In this situation, any change on wire 1 (2150) would propagate from wire 1 (2150) to wire 2 (2160). In the case where the slider and the rectangle are respectively connected to the master ends of wire 2 (2160) and wire 1 (2150), one of the two master ends can be designated as the primary master end so that any change on the wire having the primary master end would propagate from such wire to the other wire.

Turning now to FIG. 22, an exemplary method 2200 is provided that can be used to implement the exemplary system 1600 shown in FIG. 20 to wire and bind three or more objects in series using the GUI 1610. At step 2210, a user can create on the GUI screen 1610 three or more objects from the object library 1640 where each object has at least one property. At step 2220, three or more message centers can be created that respectively correspond to the three or more objects created. Each message center can include one or more ribbons that are selected from the message ribbon library 1650. The three or more message centers created can then be linked with the corresponding objects so that the one or more ribbons in each message centers can control the corresponding one or more properties of the respective object. At step 2230, the user can create two or more binding connections in the form of visual wires from the wire library 1680 so as to link the three or more objects together in series by binding the respective one or more ribbons of the three or more message centers to one another. The two or more binding connections created can lock the one or more properties of the three or more objects that are connected together such that the respective one or more properties of all of the three or more objects share the same value or values. At step 2240, the user can change the one or more properties of any one of the three or more objects linked in series. At step 2250, the wire mediator 2130 can detect the property change occurred at step 2240 and report it to the wire controller 2120 by sending a pointer to the object changed and the wire controller 2120 can then identify the object relating to the property change by way of mapping the relevant object pointer to the object pointer stored by the object manager 2140. At step 2260, the wire controller 2120 can determine the wire(s) that is connected to the object identified. At step 2270, the wire manager 2110 can apply the property change to the object that is also linked to the wire and then repeat steps 2260 and 2270 so as to propagate the property change to all of the remaining objects.

FIG. 23 is a schematic diagram of a computer system 2300. The system 2300 can be used for the operations described in association with any of the computer-implement methods described herein. The system 2300 can include various forms of digital computers, such as laptops, desktops, workstations, personal digital assistants, servers, blade servers, mainframes, and other appropriate computers. The system 2300 can also include mobile devices, such as personal digital assistants, cellular telephones, smartphones, and other similar computing devices. Additionally the system 2300 can include portable storage media, such as, Universal Serial Bus (USB) Flash drives. For example, the USB Flash drives may store operating systems and other applications. The USB Flash drives can include input/output components, such as a wireless transmitter or USB connector that may be inserted into a USB port of another computing device.

In this example, the system 2300 includes a processor 2310, a memory 2320, a storage device 2330, and an input/output device 2340. Each of the components 2310, 2320, 2330, and 2340 are interconnected using a system bus 2350. The processor 2310 is capable of processing instructions for execution within the system 2300. The processor 2310 may be designed using any of a number of architectures. For example, the processor 2310 may be a CISC (Complex Instruction Set Computers) processor, a RISC (Reduced Instruction Set Computer) processor, or a MISC (Minimal Instruction Set Computer) processor.

In some implementations, the processor 2310 is a single-threaded processor. In some implementations, the processor 2310 is a multi-threaded processor. The processor 2310 is capable of processing instructions stored in the memory 2320 or on the storage device 2330 to display graphical information for a user interface on the input/output device 2340.

The memory 2320 stores information within the system 2300. In some implementations, the memory 2320 is a computer-readable medium. In some implementations, the memory 2320 is a volatile memory unit. In some implementations, the memory 2320 is a non-volatile memory unit.

The storage device 2330 is capable of providing mass storage for the system 2300. In some implementations, the storage device 2330 is a computer-readable medium. For example, the storage device 2330 may be a floppy disk device, a hard disk device, an optical disk device, or a tape device.

The input/output device 2340 provides input/output operations for the system 2300. In some implementations, the input/output device 2340 includes a keyboard and/or pointing device. In some implementations, the input/output device 2340 includes a display unit for displaying graphical user interfaces.

Referring now to FIGS. 24 and 25, an exemplary screenshot of a GUI 2400 that includes a container object 2401 is provided. The container object 2401 is shown with a vellum 2402 that includes a header bar 2403, a crumble bar 2404, and port bays 2405. The container object 2401 also includes an object space 2406. The container object 2401 shown in FIG. 24 includes a single object 2410 in the object space 2406. The container object 2401 shown in FIG. 25 includes the object 2410 and an object 2411 in the object space 2406. Any type of object or asset can be included within, or "contained" in the container object 2401, including a primitive object, a logical object, an interactive object, a container object and/or any quantity and/or combinations thereof.

The header bar 2403 includes a header title 2407 that can change depending on the state of the container object 2401, a pop-up menu button 2408, and a vellum close button 2409. The header title 2407 describes the current process being performed on the container object 2401 (i.e. editing, running, etc.), the name of the container object 2401 or the title of an object selected within the container object 2401, and the total number of objects in the container object 2401. Also, a user can click and drag the header bar 2403 to move the entire container object 2401 within the GUI 2400.

For example, if an object is being created within the container object 2401, the header title 2407 includes the title of the object being created. In another example, if there are multiple objects within the container object 2401, and one of the objects is selected by the user, the header title 2407 includes the name of the selected object. In yet another example, if there are multiple objects in the container object 2401, and multiple objects are selected by the user, the header title 2407 includes the name "multiple". Further, in another example, if no object(s) in the container objet 2401 are selected by the user, the header title 2407 includes the name of the name of the container object 2401 and the total number of objects within the container object 2401.

As shown in FIG. 26A, the pop-up menu button 2408, when selected by the user, provides a menu containing functional settings for the container object 2401. In the embodiment shown in FIG. 26A, the pop-up menu button 2408 opens a menu 2415 that includes: a "Show Wiring" option that allows the user to choose whether to show all the wirings connections between objects in the container object 2401; a "Lock Wiring" option that allows the user to choose whether to prevent any editing of any of the wiring connections between objects in the container object 2401; a "Lock Assets" option that allows the user to choose whether to prevent any editing of any of the assets in the container object 2401; a "Lock Relative XY Positions" option that allows the user to choose whether to prevent any repositioning of any of the objects or assets within the container object 2401; and a "Delete Unused Ports" option that allows the user to choose whether to delete any unused ports in the port bays 2405.

As shown in FIG. 26B, the vellum close button 2409, when selected by the user, hides the vellum 2402 (including the header bar 2403, the crumble bar 2404, and port bays 2405). When the vellum close button 2409 is selected, all that is shown of the container object 2401 are the objects 2410, 2411 and 2412 in the object space 2406 with a bounding box 2416 around the perimeter of the object space 2406.

The crumble bar 2404 provides a visual representation of the number of objects at each level of an container object 2401. The crumble bar also provides a navigation method for a user to navigate among objects nested within other objects. The crumble bar includes a home square indicating the top most (i.e., highest) level of the container object, one or more object squares with each object square representing an object in the container object, and divider lines between the object squares for grouping and nesting objects within the container object.

For example, as shown in FIG. 27A, the crumble bar 2404 includes a home square 2700 that can be selected by the user to return to the highest level of the container object 2401. The crumble bar 2404 also includes object squares 2701 (with each object square 2701 representing a separate object within the container object 2401) separated by divider lines 2702 for grouping and nesting objects within the container object 2401. As shown in FIG. 27B, when an object square 2701 representing object 2420 is selected by the user, the object 2420 within the container object 2401 is shown at a top layer of the object space 2406 and a bounding box 2421 appears around the object 2420. The header title 2407 will also indicate the name of the object selected and the header bar 2403 will include a "Reset Layers" button 2422 that, when selected by the user, will revert the layers of objects within the container object 2401 to their original settings.

FIGS. 28A and 28B illustrate the functionality of container objects nested within another container object, or used herein to be "contained." As shown in FIG. 28A, the container object 2401 contains container objects 2801 and 2802 in the object space 2406. Similarly, container object 2801 contains container objects 2805 and 2806. Container object 2806 also contains objects 2807, 2808, 2809 and 2810. Container object 2802 contains objects 2811 and 2812, and a container object 2813. The container object 2813 contains object 2814. Objects 2807, 2808, 2809, 2810, 2811, 2812 and 2814 can each be an interactive object, a container object, a primitive object, a logical object and/or an asset.

When a container object nested within another container object is selected by the user by, for example, selecting an object square as shown in FIGS. 27A and 27B, the selected container object is opened within a new vellum. For example, as shown in FIG. 28B, when the container object 2816 is selected, a vellum 2815 is opened for the container object 2816.

Similar to other objects, each container object includes a message center and an inspector associated with it. For example, as shown in FIG. 29, the container object 2401 includes a message center 2900 and an inspector (not shown). Also, as shown in FIGS. 24 and 30, the port bays 2405 include ports 2414 that allow objects within the container object 2401 to wire and bind to objects outside of the container object 2401. In FIG. 30, the container object 2401 includes an object 2901 that includes a message center 2902, and an object 2903 that includes a message center 2904. When a wire, such as wires 2905, are wired between a property ribbon of the message center 2902 or 2904 and one of the ports 2414 the user is given to option to choose where the wire 2905 will be mentioned in the message center 2900 of the container object 2401 and how it will be named.

As shown in FIGS. 31A-31B, all ports 2414 are displayed as dots in the port bays 2405 until they are wired. As the wires 2905 are dragged to the port bays 2405 by the user, they will snap to the nearest port 2414. The wired port 2414 will then indicate the type of wire 2905 (i.e., an input wire, an output wire, a property wire, a read-only property wire, etc.). Each of the ports 2414 operate independently of each other and can be wired to a different wire 2905. The vellum 2402 will expand to contain all message centers of objects within the object space 2406. As the message centers are opened and closed, the vellum 2402 will expand or contract accordingly. As shown in FIG. 31B, when a new port 2414 is wired, a custom ribbon is created in the message center 2900 of the container object 2401. The custom ribbon is displayed in the message center 2900 to confirm that the wire 2905 has been created. As shown in FIG. 31C, when a cursor rolls over a wire that is wired to one of the ports 2414 in the port bays 2405 the wire, the port and the message center 2900 become highlighted. As shown in FIGS. 31D and 31E, when a wire 2905 is deleted, the wired port 2414 remains active and the associated custom ribbon description remains in the message center 2900. If another wire 2905 is connected to the still active port 2414, the new wire will be associated with the previously created custom ribbon description in the message center 2900. As shown in FIG. 31F, if the user wants to delete the active ports and the associated ribbon descriptions in the message center 2900, the user can do so by selecting the pop-up menu 2408 and selecting the "Delete Unused Ports" function.

FIGS. 32A and 32B illustrate how the vellum 2402 is modified if one of the objects 3350 and 3352 are moved within the object space 2406. FIG. 32A shows the objects 3350 and 3352 with the message center 3351 of object 3350 wired to one of the ports 2414 with the wires 2905. As shown in FIG. 32B, when the object 3350 is moved within the object space 2406, the vellum 2402 expands to accommodate the new position of the object 3350 and the wire 2905 remains connected to the same port 2414.

FIGS. 32C and 32D illustrate how the vellum 2402 is modified if a message center of one of the objects 3350 and 3352 is expanded. FIG. 32C shows the objects 3350 and 3352 with the message center 3351 of the object 3350 wired to one of the ports 2414 with the wire 2905 and a message center 3353 of the object 3352 wired to two ports 2414 with the wires 2905. As shown in FIG. 32D, when the message center 3353 is expanded, the vellum 2402 expands to accommodate the new size of the message center 3353 and the wires 2905 remain connected to the same ports 2414.

FIGS. 32E and 32F illustrate how the vellum 2402 is modified if a message center of one of the objects 3350 and 3352 is compressed. FIG. 32E shows the objects 3350 and 3352 with the message center 3351 of the object 3350 wired to one of the ports 2414 with the wire 2905 and the message center 3353 of the object 3352 wired to two ports 2414 with the wires 2905. As shown in FIG. 32F, when the message center 3353 is compressed, the vellum 2402 remains the same size to show that the wires 2905 remain connected to the same ports 2414.

FIGS. 32G-32I illustrate how the vellum 2402 is modified if the ports 2414 are shifted within the port bays 2405. FIG. 32G shows the objects 3350 and 3352 with the message center 3351 of the object 3350 wired to one of the ports 2414 with the wire 2905 and the message center 3353 of the object 3352 wired to two ports 2414 with the wires 2905. As shown in FIG. 32G, when the wires 2905 are connected to the ports 2414 that are in a lower portion of the port bay 2405, the wires 2905 can be selected by the user and dragged to the ports 2414 that are in a higher portion of the port bay 2405. When there are no wires or objects in a lower area of the object space 2406, the vellum 2402 will compress as shown in FIG. 32I.

FIGS. 32J, 32K, 32M and 32N illustrate how a new object is added into the container object 2401. FIG. 32J shows an object 3354 outside of the container object 2401. As shown in FIGS. 32K and 32M, the user can select and drag the object 3354 using, for example a cursor 3355. As shown in FIG. 32N, when the cursor 3355 crosses into the vellum 2402, the vellum 2402 expands to contain the object 3354. The header title 2407 is updated to show an additional object square for the object 353 and the object count in the header title 2407 is updated to include object 3354.

FIGS. 32O-32P illustrate how an object is removed from the container object 2401. As shown in FIG. 32O, once an object, such as object 3354, is included into the container object 2401, such that the container object 2401 contains the object 3354, selecting the object 3354 and dragging the object 3354 out of the object space 2406 will cause the vellum 2402 and the object space 2406 to expand so as to include the object 3354 in its new position. In order to remove the object, such as object 3354, from the container object 2401, the user can select the object 3354 and then on a menu 3356 of the GUI, select the "Delete Object" function or a "Cut Object" function.

FIGS. 32Q-32R illustrate how an object within the container object 2401 is wired to an object outside of the container object 2401. FIG. 32Q shows that a user can drag a wire 2905 for the object 3350 (within the container object 2401) from the message center 3351 directly to the message center 3353 of the object 3352 (outside the container object 2401). FIG. 32R shows that the GUI automatically connects a first wire 3358 from the message center 3351 to one of the ports 2414, generates an associated custom ribbon description in the message center 2900 of the container object 2401, and connects a second wire 3359 from the message center 2900 to the message center 3353 of the object 3352.

FIGS. 33A-33C illustrate how an objects nested within an container object that is within the container object 2401 is wired to an object outside of the container object 2401. FIG. 33A shows container object 3360 and objects 3361 and 3362 within the container object 2401 (shown in FIG. 33B). FIG. 33A shows that a user can drag a wire 2905 from a message center 3364 of an object 3363 within the container object 3360 to a message center 3366 of an object 3365 located outside of the container object 2401. FIG. 33B shows that the GUI automatically connects a first wire 3368 from the message center 3364 to a port 3369 of the container object 3360, generates an associated custom ribbon description in the message center 3367 of the container object 3360, connects a second wire 3370 from the message center 3367 to the port 2414 of the container object 2401, generates an associated custom ribbon description in the message center 2900 of the container object 2401, and connects a third wire 3371 from the message center 2900 to the message center 3366 of the object 3365. In some embodiments, only the vellum of a currently selected object appears. Thus, as shown in FIG. 33C, the user only sees that the message center 3367 is connected to the port 2414 via the second wire 3370 and the message center 2900 is connected to the message center 3366 of the object 3365 located outside of the container object 2401.

FIGS. 34A-34D illustrate how multiple objects within the GUI can be combined into an container object. First, the user selects multiple objects 3401, 3402 and 3403. Then, from a menu 3405 of the GUI, the user selects the "Make Object" function. As shown in FIG. 34C, the objects 3401, 3402 and 3403 are merged into a single container object 3407 with a bounding box 3409, such that with the message centers (not shown) of the objects 3401, 3402, 3403 are hidden and any internal wiring (not shown) between the objects 3401, 3402 and 3403 also hidden. When the user selects and opens the container object 3407, the vellum 3410 and the object space 3415 appear, enabling the user to edit the object 3407.

The Dock, or "Cloud Dock," is method for user to share objects and container objects with a wide community over the cloud network. The Dock provides a range of functions:
uploading objects and container objects to store for an author's use;
uploading objects and container objects to share with an online community;
uploading objects and container objects to sell to members of an online community; and
reviewing objects and container objects to purchase and download for use by an author.

The Dock acts simultaneously as a storage area, a means to share objects and container objects, and as a store to review and purchase objects and container objects.

As shown in FIGS. 35A-35D, in some embodiments, the GUI 2400 includes a Dock 4400 represented by, for example, a cloud shape box. The cloud dock includes buttons 1520 In the cloud dock, applications, objects and assets are represented by icons, and a user can drag a particular icon representing a multimedia computer application, an object, or an asset from the visual dock into a project within the workspace of the community environment.

FIG. 35A shows the primary components of the Dock 4400. The Dock 4400 is a window that appears above the multimedia computer application. It is accessed by clicking the buttons 4402 in the side panels. The Dock contains several elements to navigate the objects and container objects that it contains. There is a Location menu 4403 to choose different areas. There is a Category menu 4404 to choose a category of items to view. There is a search function 4405 (not shown in FIG. 35A) to search for specific objects and container objects. There is a Sort menu 4406 to select how found objects are viewed. There is an Order button 4407 to order the viewing of objects and container objects from highest to lowest, or vice versa. There is an "Add Object" button 4406 to add an object to the Dock 4400.

An object is downloaded to the screen by selecting the object 4440, and then dragging it to the screen 4441, where it can be opened 4442 for editing. If the object is being purchased, the author pays for the object before dragging 4441 the object to the screen.

Figure 35C:
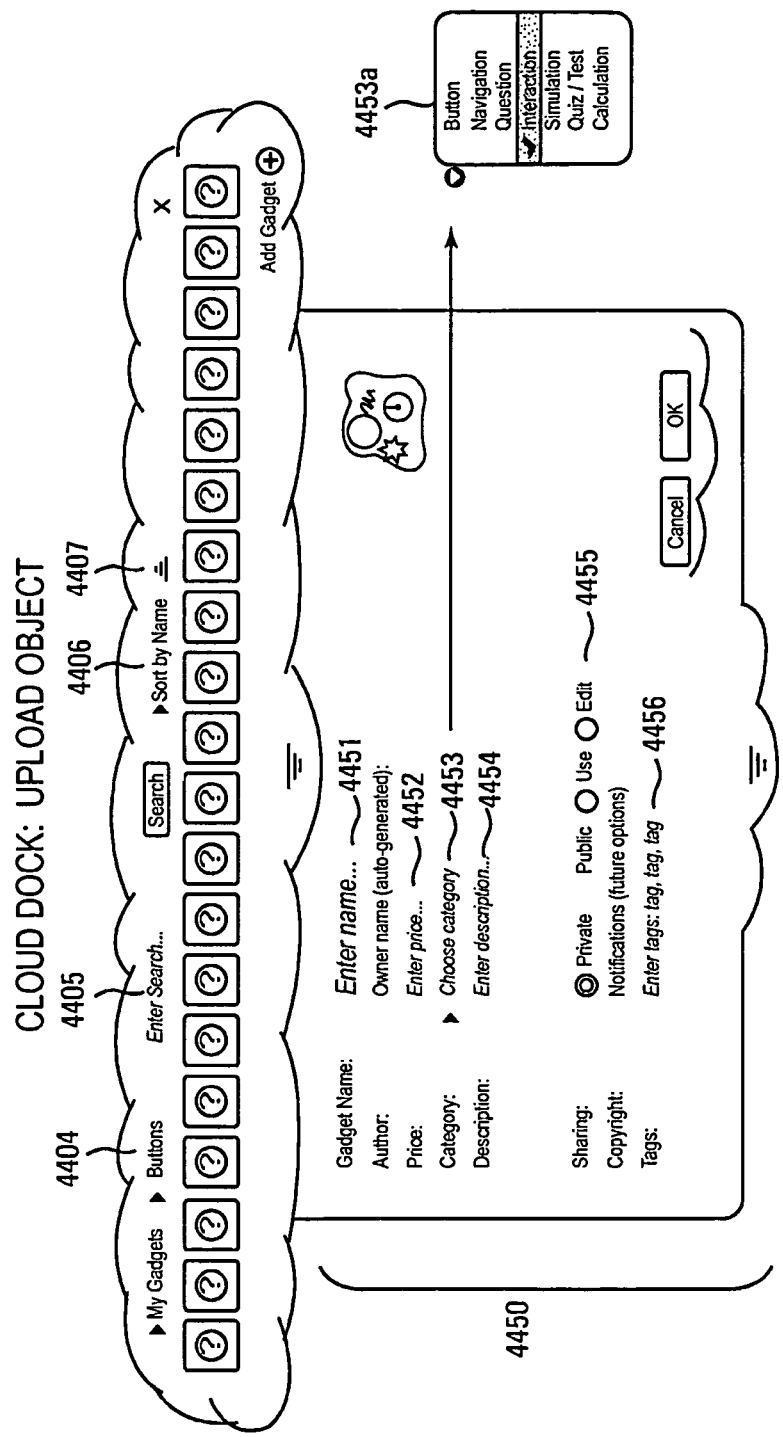

When an object is uploaded to be shared, as shown in FIG. 35C, the author fills out information 4450 about the object, including name 4451, price 4452 if any, category 4453, a description 4454, levels of sharing 4455, and search tags 4456.

FIG. 35D shows when an object is viewed for potential purchase and downloading, the object is selected in the Dock 4461, and an information panel 4460 appears to show information about the object.

In FIG. 36, an exemplary screenshot of the GUI 2400 is shown operating in a run mode, as opposed to an authoring mode. At the run mode, the GUI 2400 still is able to display a binding connection 4500 created in the authoring mode and the message centers 4510 and 4520 for direct access to control various properties of a slider 4530 and an oval 4540 respectively. For example, in FIG. 36, moving a knob 4535 of the slider 4530 varies the opacity of the oval 4540. During the run mode or the authoring mode, the user can physically access the message centers 4510 and 4520 to affect binding properties between the slider 4530 and the oval 4540. The user can also affect the opacity of the oval 4540 by moving the knob 4435 along the slider 4530. In this example, the user can also alter the opacity of the oval 4540 from the message center 4520 and thereby move the slider knob 4535 along the slider 4530. Thus, in these embodiments, the GUI 2400 is configured to allow the user to view and access a message center to affect properties of an object during both the run mode and the authoring mode.

The features described herein can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and Flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features described herein can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network. The relationship of client and server arises by virtue of computer programs running on the respective computers and having a client-server relationship to each other.

The GUIs described herein can be used to develop a wide variety of multimedia applications that range from simple presentations to interactive events to real-time simulations. Across this broad range of applications, authors/creators can manipulate multimedia objects without programming. The GUIs allow authors/creators to begin a project by making sketches on the GUI screens and then add animation and interaction to make sketches come alive. Authors/creators can then test ideas, modify as desired, and eventually replace sketched objects with final multimedia objects by dropping visual and audio objects onto sketched objects. As an illustrative example, an author can use the GUIs to develop a project that allows the author to click a point on a blueprint of a building to view what the building would look like from this perspective. The author can first create a sketch object for the blueprint with various points of view and several sketch objects for different building photos corresponding to different points of view. Each of the sketch objects has a message center that has inputs, properties and outputs. The author can then select the point to be clicked and the photo to be shown where relevant message centers would appear for these two objects. The author can pull a wire from the 'Click release' output on the blueprint message center to the 'Show' input on the photo message center to create an interaction between these two objects. Through such interaction, the author can show the sketched photo area by simply clicking the point. To complete the project, the author can drag finished blueprint and relevant photos onto respective sketch objects so as to substitute the new objects for the sketched objects, keep functionality intact, transfer the logic attached to the sketched objects to the new objects, and producing a final product. Given the broad range of inputs, outputs and adjustable properties described herein for various objects, a user can use the GUIs to create complex products for a wide range of applications including e-learning, gaming, communications and more.

When the GUIs are implemented as a web service, various assets such as sounds, photos, text and graphics can be loaded to a cloud server that allows users to access a number of large projects from anywhere using any connected computer where lengthy downloads or mega files requiring large amounts of local storage may not be needed.

The GUIs allow various levels of collaborations among multiple users. For example, the GUIs allow authors to collaborate. Working on the same project at the same time, authors can sketch alternative solutions, wire assets for each other, and demonstrate problems and opportunities. Such collaboration capabilities may allow teams to create complex projects by simplifying simultaneous and asynchronous contributions by teams that may be geographically distributed. The GUIs also allow users to collaborate with authors and with each other. Project users can post comments and even chat in real time with project authors. If permitted by the authors, the project users can not only chat with each other, but they can also modify the application themselves and submit their changes for approval by the project authors. Such collaboration capabilities may allow a large organization to not only keep information and best practices current, but also support informal learning in which every employee has the ability to share performance tips, solutions, best practices, and information of all sorts with each other.

The embodiments described herein allows for visual programming of a multimedia computer application. Visual programming provides the technical effect of allowing a user to create and edit a multimedia computer application more efficiently and easily than through the use of conventional text based programming. Visual programming also reduces the learning curve of the user in configuring a specialized computing device from a general computing device. That is, visual programming efficiently configures a general computing device into a specialized computing device for efficiently and easily creating a multimedia computer application.

Although a few implementations have been described in detail above, other modifications are possible. For example, the location of various modules or other components as shown in the figures are not intended to be limiting, but are given merely as examples. Additionally, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims. The examples described in this disclosure are to be considered in all respects as illustrative and not limiting. The scope of the disclosure is indicated by the appended claims rather than by the foregoing description; and all changes which come within the meaning and range of equivalency of the claims are intended to be embraced therein.

ASPECTS OF THE INVENTION

Aspects of the Invention are:
Aspect 1. A graphical user interface (GUI) having an authoring mode and a run mode, comprising:

a tool box configured to create a first object and a second object;

a first message center linked with the first object, the first message center comprising a first ribbon configured to change a first property of the first object;

a second message center linked with the second object, the second message center comprising a first ribbon configured to change a first property of the second object; and a first binding connection represented by a first visual wiring for binding the first ribbon of the first message center with the first ribbon of the second message center, the first binding connection being configured to vary the first property of the second object upon a change in the first property of the first object and to vary the first property of the first object upon a change in the first property of the second object at both the authoring mode and the run mode.

Aspect 2. The GUI of Aspect 1, wherein the first binding connection is further configured to vary the first property of the second object upon a change in the first property of the first object at both the authoring mode and the run mode if a change in the first property of the second object occurs within a preselected time period before or after the change in the first property of the first object.

Aspect 3. The GUI of Aspect 1, wherein the second message center further comprising a second ribbon configured to change a second property of the second object; said GUI further comprising:

a second binding connection represented by a second visual wiring for binding the first ribbon of the first message center with the second ribbon of the second message center, the second binding connection being configured to vary the second property of the second object upon a change in the first property of the first object and to vary the first property of the first object upon a change in the second property of the second object at both the authoring mode and the run mode.

Aspect 4. The GUI of Aspect 1, wherein the first message center further comprising a second ribbon configured to change a second property of the first object and the second message center further comprising a second ribbon configured to change a second property of the second object; said GUI further comprising:

a second binding connection represented by a second visual wiring for binding the second ribbon of the first message center with the second ribbon of the second message center, the second binding connection being configured to vary the second property of the second object upon a change in the second property of the first object and to vary the second property of the first object upon a change in the second property of the second object at both the authoring mode and the run mode.

Aspect 5. The GUI of Aspect 1, wherein the tool box is further configured to create a third object; said GUI further comprising:

a third message center linked with the third object, the third message center comprising a first ribbon configured to change a first property of the third object; and a second binding connection represented by a second visual wiring for binding the first ribbon of the first message center with the first ribbon of the third message center, the second binding connection being configured to vary the first property of the third object upon a change in the first property of the first object and to vary the first property of the first object upon a change in the first property of the third object at both the authoring mode and the run mode.

Aspect 6. The GUI of Aspect 1, wherein the first message center further comprising a second ribbon configured to change a second property of the first object; wherein the tool box is further configured to create a third object; said GUI further comprising:

a third message center linked with the third object, the third message center comprising a first ribbon configured to change a first property of the third object; and a second binding connection represented by a second visual wiring for binding the second ribbon of the first message center with the first ribbon of the third message center, the second binding connection being configured to vary the first property of the third object upon a change in the second property of the first object and to vary the second property of the first object upon a change in the first property of the third object at both the authoring mode and the run mode.

Aspect 7. The GUI of Aspect 1, wherein the tool box is further configured to create a third object; said GUI further comprising:

a third message center linked with the third object, the third message center comprising a first ribbon configured to change a first property of the third object; and a second binding connection represented by a second visual wiring for binding the first ribbon of the second message center with the first ribbon of the third message center, the second binding connection being configured to vary the first property of the third object upon a change in the first property of the second object and to vary the first property of the second object upon a change in the first property of the third object at both the authoring mode and the run mode;

wherein a change in the first property of any one of the first, second and third objects causes a corresponding change in the respective first properties of the two remaining objects.

Aspect 8. The GUI of Aspect 7, wherein the first and second binding connections are further configured to vary the first properties of the second and third objects upon a change in the first property of the first object at both the authoring mode and the run mode if a change in the first property of the second or third object occurs within a preselected time period before or after the change in the first property of the first object.

Aspect 9. The GUI of Aspect 7, wherein the first and second binding connections are further configured to vary the first properties of the first and third objects upon a change in the first property of the second object at both the authoring mode and the run mode if a change in the first property of the first or third object occurs within a preselected time period before or after the change in the first property of the second object.

Aspect 10. The GUI of any of Aspects 1-9, wherein the first or second visual wiring is self-configurable for retaining a smooth curve so as to minimize overlapping with other graphical entities.

Aspect 11. A graphical user interface (GUI) having an authoring mode and a run mode, comprising:

a tool box configured to create a first object and a second object;

a first message center linked with the first object, the first message center comprising a first ribbon relating to a first event of the first object;

a second message center linked with the second object, the second message center comprising a first ribbon configured to change a first state of the second object; and a binding connection represented by a visual wiring for binding the first ribbon of the first message center with the first ribbon of the second message center, the binding connection being configured to change the first state of the second object upon an occurrence of the first event of the first object at both the authoring mode and the run mode.

Aspect 12. A graphical user interface (GUI) having an authoring mode and a run mode, comprising:
 a tool box configured to create an object;
 a message center linked with the object, the message center comprising a first ribbon relating to an event of the object and a second ribbon configured to change a state of the object; and
 a binding connection represented by a visual wiring for binding the first and second ribbons of the message center, the binding connection being configured to change the state of the object upon an occurrence of the event of the object at both the authoring mode and the run mode.

Aspect 13. The GUI of Aspects 11 or 12, wherein the visual wiring is self-configurable for retaining a smooth curve so as to minimize overlapping with other graphical entities.

Aspect 14. A computer-implemented method, comprising:
 creating a first object and a second object on a graphical user interface (GUI) having an authoring mode and a run mode;
 linking a first message center with the first object, the first message center comprising a first ribbon configured to change a first property of the first object;
 linking a second message center with the second object, the second message center comprising a first ribbon configured to change a first property of the second object;
 creating a first binding connection between the first ribbon of the first message center and the first ribbon of the second message center by linking an outlet port of the first ribbon of the first message center to an inlet port of the first ribbon of the second message center using a first visual wiring; and
 performing at least one of the following:
  (i) varying the first property of second object by changing the first property of the first object through said first binding connection in the authoring mode or the run mode; and
  (ii) varying the first property of the first object by changing the first property of the second object through said first binding connection in the authoring mode or the run mode.

Aspect 15. The computer-implemented method of Aspect 14, further comprising varying the first property of the second object upon a change in the first property of the first object through said first binding connection in the authoring mode or the run mode if a change in the first property of the second object occurs within a preselected time period before or after the change in the first property of the first object.

Aspect 16. The computer-implemented method of Aspect 14, wherein the second message center further comprising a second ribbon configured to change a second property of the second object; said method further comprising:
 creating a second binding connection between the first ribbon of the first message center and the second ribbon of the second message center by linking an outlet port of the first ribbon of the first message center to an inlet port of the second ribbon of the second message center using a second visual wiring; and
 performing at least one of the following:
  (i) varying the second property of the second object upon a change in the first property of the first object through said second binding connection in the authoring mode or the run mode; and
  (ii) varying the first property of the first object upon a change in the second property of the second object through said second binding connection in the authoring mode or the run mode.

Aspect 17. The computer-implemented method of Aspect 14, wherein the first message center further comprising a second ribbon configured to change a second property of the first object; wherein the second message center further comprising a second ribbon configured to change a second property of the second object; said method further comprising:
 creating a second binding connection between the second ribbon of the first message center and the second ribbon of the second message center by linking an outlet port of the second ribbon of the first message center to an inlet port of the second ribbon of the second message center using a second visual wiring; and
 performing at least one of the following:
  (i) varying the second property of the second object upon a change in the second property of the first object through said second binding connection in the authoring mode or the run mode; and
  (ii) varying the second property of the first object upon a change in the second property of the second object through said second binding connection in the authoring mode or the run mode.

Aspect 18. The computer-implemented method of Aspect 14, further comprising:
 creating a third object on the GUI;
 linking a third message center with the third object, the third message center comprising a first ribbon configured to change a first property of the third object;
 creating a second binding connection between the first ribbon of the first message center and the first ribbon of the third message center by linking an outlet port of the first ribbon of the first message center to an inlet port of the first ribbon of the third message center using a second visual wiring; and
 performing at least one of the following:
  (i) varying the first property of the third object upon a change in the first property of the first object through said second binding connection in the authoring mode or the run mode; and
  (ii) varying the first property of the first object upon a change in the first property of the third object through said second binding connection in the authoring mode or the run mode.

Aspect 19. The computer-implemented method of Aspect 14, wherein the first message center further comprising a second ribbon configured to change a second property of the first object; said method further comprising:
 creating a third object on the GUI;
 linking a third message center with the third object, the third message center comprising a first ribbon configured to change a first property of the third object;
 creating a second binding connection between the second ribbon of the first message center and the first ribbon of the third message center by linking an outlet port of the second ribbon of the first message center to an inlet port of the first ribbon of the third message center using a second visual wiring; and
 performing at least one of the following:
  (i) varying the first property of the third object upon a change in the second property of the first object through said second binding connection in the authoring mode or the run mode; and (ii) varying the second property of the first object upon a change in the first property of the third object through said second binding connection in the authoring mode or the run mode.

Aspect 20. The computer-implemented method of Aspect 14, further comprising:

creating a third object on the GUI;

linking a third message center with the third object, the third message center comprising a first ribbon configured to change a first property of the third object;

creating a second binding connection between the first ribbon of the second message center and the first ribbon of the third message center by linking an outlet port of the first ribbon of the second message center to an inlet port of the first ribbon of the third message center using a second visual wiring; and changing the first property of any one of the first, second and third objects so as to vary the respective first properties of the two remaining objects through said first and second binding connections in the authoring mode or the run mode.

Aspect 21. The computer-implemented method of Aspect 20, further comprising:

varying the first properties of the second and third objects upon a change in the first property of the first object through said first and second binding connections in the authoring mode or the run mode if a change in the first property of the second or third object occurs within a preselected time period before or after the change in the first property of the first object.

Aspect 22. The computer-implemented method of Aspect 20, further comprising:

varying the first properties of the first and third objects upon a change in the first property of the second object through said first and second binding connections in the authoring mode or the run mode if a change in the first property of the first or third object occurs within a preselected time period before or after the change in the first property of the second object.

Aspect 23. The computer-implemented method of any of Aspects 14-22, wherein the first or second visual wiring is self-configurable for retaining a smooth curve so as to minimize overlapping with other graphical entities.

Aspect 24. A computer program product tangibly embodied in a computer readable storage device, the computer program product including instructions that, when executed, perform operations to generate a graphical user interface (GUI) having an authoring mode and a run mode for wiring and binding objects, the operations comprising:

creating a first object and a second object on the GUI;

linking a first message center with the first object, the first message center comprising a first ribbon configured to change a first property of the first object;

linking a second message center with the second object, the second message center comprising a first ribbon configured to change a first property of the second object;

creating a first binding connection between the first ribbon of the first message center and the first ribbon of the second message center by linking an outlet port of the first ribbon of the first message center to an inlet port of the first ribbon of the second message center using a first visual wiring; and performing at least one of the following:

(i) varying the first property of second object by changing the first property of the first object through said first binding connection in the authoring mode or the run mode; and (ii) varying the first property of the first object by changing the first property of the second object through said first binding connection in the authoring mode or the run mode.

Aspect 25. The computer program product of Aspect 24, said operations further comprising varying the first property of the second object upon a change in the first property of the first object through said first binding connection in the authoring mode or the run mode if a change in the first property of the second object occurs within a preselected time period before or after the change in the first property of the first object.

Aspect 26. The computer program product of Aspect 24, wherein the second message center further comprising a second ribbon configured to change a second property of the second object; said operations further comprising:

creating a second binding connection between the first ribbon of the first message center and the second ribbon of the second message center by linking an outlet port of the first ribbon of the first message center to an inlet port of the second ribbon of the second message center using a second visual wiring; and performing at least one of the following:

(i) varying the second property of the second object upon a change in the first property of the first object through said second binding connection in the authoring mode or the run mode; and (ii) varying the first property of the first object upon a change in the second property of the second object through said second binding connection in the authoring mode or the run mode.

Aspect 27. The computer program product of Aspect 24, wherein the first message center further comprising a second ribbon configured to change a second property of the first object; wherein the second message center further comprising a second ribbon configured to change a second property of the second object; said operations further comprising:

creating a second binding connection between the second ribbon of the first message center and the second ribbon of the second message center by linking an outlet port of the second ribbon of the first message center to an inlet port of the second ribbon of the second message center using a second visual wiring; and performing at least one of the following:

(i) varying the second property of the second object upon a change in the second property of the first object through said second binding connection in the authoring mode or the run mode; and (ii) varying the second property of the first object upon a change in the second property of the second object through said second binding connection in the authoring mode or the run mode.

Aspect 28. The computer program product of Aspect 24, said operations further comprising:

creating a third object on the GUI;

linking a third message center with the third object, the third message center comprising a first ribbon configured to change a first property of the third object;

creating a second binding connection between the first ribbon of the first message center and the first ribbon of the third message center by linking an outlet port of the first ribbon of the first message center to an inlet port of the first ribbon of the third message center using a second visual wiring; and performing at least one of the following:
(i) varying the first property of the third object upon a change in the first property of the first object through said second binding connection in the authoring mode or the run mode; and
(ii) varying the first property of the first object upon a change in the first property of the third object through said second binding connection in the authoring mode or the run mode.

Aspect 29. The computer program product of Aspect 24, wherein the first message center further comprising a second ribbon configured to change a second property of the first object; said operations further comprising:
creating a third object on the GUI; linking a third message center with the third object, the third message center comprising a first ribbon configured to change a first property of the third object;
creating a second binding connection between the second ribbon of the first message center and the first ribbon of the third message center by linking an outlet port of the second ribbon of the first message center to an inlet port of the first ribbon of the third message center using a second visual wiring; and
performing at least one of the following:
(i) varying the first property of the third object upon a change in the second property of the first object through said second binding connection in the authoring mode or the run mode; and
(ii) varying the second property of the first object upon a change in the first property of the third object through said second binding connection in the authoring mode or the run mode.

Aspect 30. The computer program product of Aspect 24, said operations further comprising:
creating a third object on the GUI;
linking a third message center with the third object, the third message center comprising a first ribbon configured to change a first property of the third object;
creating a second binding connection between the first ribbon of the second message center and the first ribbon of the third message center by linking an outlet port of the first ribbon of the second message center to an inlet port of the first ribbon of the third message center using a second visual wiring; and
changing the first property of any one of the first, second and third objects so as to vary the respective first properties of the two remaining objects through said first and second binding connections in the authoring mode or the run mode.

Aspect 31. The computer program product of Aspect 30, said operations further comprising:
varying the first properties of the second and third objects upon a change in the first property of the first object through said first and second binding connections in the authoring mode or the run mode if a change in the first property of the second or third object occurs within a preselected time period before or after the change in the first property of the first object.

Aspect 32. The computer program product of Aspect 30, said operations further comprising:
varying the first properties of the first and third objects upon a change in the first property of the second object through said first and second binding connections in the authoring mode or the run mode if a change in the first property of the first or third object occurs within a preselected time period before or after the change in the first property of the second object.

Aspect 33. The computer program product of any of Aspects 24-32, wherein the first or second visual wiring is self-configurable for retaining a smooth curve so as to minimize overlapping with other graphical entities.

Aspect 34. A computing system, comprising:
a graphical user interface (GUI) generator configured to generate a GUI, said GUI comprising:
a tool box configured to create a first object and a second object;
a first message center linked with the first object, the first message center comprising a first ribbon configured to change a first property of the first object;
a second message center linked with the second object, the second message center comprising a first ribbon configured to change a first property of the second object; and
a first binding connection represented by a first visual wiring for binding the first ribbon of the first message center with the first ribbon of the second message center, the first binding connection being configured to vary the first property of the second object upon a change in the first property of the first object and to vary the first property of the first object upon a change in the first property of the second object at both the authoring mode and the run mode;
a wire manager in communication with the GUI generator and configured to create said first visual wiring and affect an event change on said first visual wiring;
a wire controller in communication with the wire manager and configured to direct the wire manager to affect the event change on said first visual wiring; and
a wire mediator in communication with the wire manager and the wire controller and configured to detect a change in the first property of the first or second object and communicate the property change detected to the wire controller.

Aspect 35. The computing system of Aspect 34, further comprising:
an object manager in communication with the wire controller and configured to create said first and second objects and affect a change in the first property of the first or second object.

Aspect 36. A method for providing a graphical user interface (GUI) to a computer for visual programming, the GUI including an authoring mode interface, the method comprising:
displaying on a display of the computer the authoring mode interface including a tool box for creating program objects, and a main window for visual programming, the tool box being configured to allow creation of one or more program objects in the main window;
monitoring for selection of a program object from the tool box;
detecting the selection of the program object;
after detecting the selection of the program object, detecting a position in the main window for creating the program object;
displaying on the display, the program object at the detected position in the main window for creating the program object; and
displaying on the display, a message center associated with the program object, the message center including a ribbon associated with a property of the program object.

Aspect 37. The method according to Aspect 36, further comprising:
monitoring for selection of a second program object from the tool box;
detecting the selection of the second program object;

after detecting the selection of the second program object, detecting a position in the main window for creating the second program object;

displaying on the display, the second program object at the detected position in the main window for creating the second program object;

displaying on the display a second message center associated with the second program object, the second message center including a second ribbon associated with a property of the second program object;

detecting selections of the ribbon and the second ribbon for forming an information exchange between the ribbon and the second ribbon; and displaying on the display, a visual wire connecting the ribbon to the second ribbon in the main window, the visual wire representing information exchange between the ribbon and the second ribbon, the property of the program object being linked to the property of the second program object.

Aspect 38. The method according to Aspect 36, wherein the GUI further includes a run mode interface, the method further comprising:

displaying on the display the run mode interface including a run mode window;

displaying in the run mode window the program object and the second program object; and allowing a user to interact with the program object to affect a change to the property of the second program object.

Aspect 39. The method according to Aspect 38, wherein the GUI further includes an edit mode interface, the method further comprising:

displaying on the display the edit mode interface including an edit mode window; and allowing a user to control whether a program object in the edit mode window is movable in the run mode interface.

Aspect 40. The method according to Aspect 36, wherein the main window includes a first coordinate system, and displaying the program object at the detected position in the main window is according to the first coordinate system;

the program object is a container object, the container object including a window border, and a second coordinate system;

the second coordinate system being independent from the first coordinate system; and the container object being configured to contain another program object positioned according the second coordinate system.

Aspect 41. The method according to Aspect 40, further comprising displaying in the container object an inside program object positioned according to the second coordinate system.

Aspect 42. The method according to Aspect 40, further comprising displaying a window port configured to allow a connection between an inside program object displayed in the container object and an outside program object displayed outside the container object.

Aspect 43. The method according to Aspect 42, further comprising displaying in the container object the inside program object positioned according to the second coordinate system;

displaying in the container object, an inside message center associated with the inside program object, the inside message center including an inside ribbon associated with a property of the inside program object;

detecting selections of the inside ribbon and the port for displaying a visual wire connecting the inside ribbon and the port; and displaying the visual wire connecting the inside ribbon to the port, the visual wire representing information exchange between the inside ribbon and the port.

Aspect 44. The method according to Aspect 43, further comprising displaying a ribbon in the inside message center associated with the inside program object, the ribbon being editable and associated with the connection between the inside ribbon and the port.

Aspect 45. The method according to Aspect 43, further comprising displaying an outside program object positioned according to the first coordinate system in the main window outside the container object;

displaying in the main window, an outside message center associated with the outside program object, the outside message center including an outside ribbon associated with a property of the outside program object;

detecting selections of the outside ribbon and the port for displaying a second visual wire connecting the outside ribbon and the port; and displaying the second visual wire connecting the outside ribbon to the port, the first and second visual wires representing information exchange between the inside ribbon and the outside ribbon, the property of the inside program object being linked to the property of the outside program object.

Aspect 46. The method according to Aspect 45, further comprising displaying an outside program object positioned according to the first coordinate system in the main window outside the container object;

displaying in the main window, an outside message center associated with the outside program object, the outside message center including an outside ribbon associated with a property of the outside program object;

detecting selections of the outside ribbon and the ribbon of the inside message center for displaying a third visual wire connecting the outside ribbon and the ribbon of the inside message center; and displaying the third visual wire connecting the outside ribbon to the ribbon of the inside message center, the first and third visual wires representing information exchange between the inside ribbon and the outside ribbon, the property of the inside program object being linked to the property of the outside program object.

Aspect 47. A graphical user interface (GUI) on a computer with a display, a memory, and one or more processors to execute one or more programs stored in the memory to implement a method for visual programming displayed on the display, the GUI including an authoring mode interface, the method comprising:

displaying on the display of the computer the authoring mode interface including a tool box for creating program objects, and a main window for visual programming, the tool box being configured to allow creation of one or more program objects in the main window;

monitoring for selection of a program object from the tool box;

detecting the selection of the program object;

after detecting the selection of the program object, detecting a position in the main window for creating the program object;

displaying on the display, the program object at the detected position in the main window for creating the program object; and displaying on the display, a message center associated with the program object, the message center including a ribbon associated with a property of the program object.

Aspect 48. The GUI according to Aspect 47, wherein the method further comprising:

monitoring for selection of a second program object from the tool box;

detecting the selection of the second program object;

after detecting the selection of the second program object, detecting a position in the main window for creating the second program object;

displaying on the display, the second program object at the detected position in the main window for creating the second program object;

displaying on the display a second message center associated with the second program object, the second message center including a second ribbon associated with a property of the second program object;

detecting selections of the ribbon and the second ribbon for forming an information exchange between the ribbon and the second ribbon; and displaying on the display, a visual wire connecting the ribbon to the second ribbon in the main window, the visual wire representing information exchange between the ribbon and the second ribbon, the property of the program object being linked to the property of the second program object.

Aspect 49. The GUI according to Aspect 47, further including a run mode interface, the method further comprising:

displaying on the display the run mode interface including a run mode window;

displaying in the run mode window the program object and the second program object; and allowing a user to interact with the program object to affect a change to the property of the second program object.

Aspect 50. The GUI according to Aspect 49, further including an edit mode interface, the method further comprising:

displaying on the display the edit mode interface including an edit mode window; and allowing a user to control whether a program object in the edit mode window is movable in the run mode interface.

Aspect 51 16. The GUI according to Aspect 47, wherein the main window includes a first coordinate system, and displaying the program object at the detected position in the main window is according to the first coordinate system;

the program object is a container object, the container object including a window border, and a second coordinate system;

the second coordinate system being independent from the first coordinate system; and the container object being configured to contain another program object positioned according the second coordinate system.

Aspect 52. The GUI according to Aspect 51, wherein the method further comprises displaying in the container object an inside program object positioned according to the second coordinate system.

Aspect 53. The GUI according to Aspect 51, wherein the method further comprises displaying a window port configured to allow a connection between an inside program object displayed in the container object and an outside program object displayed outside the container object.

Aspect 54. The GUI according to Aspect 53, wherein the method further comprises displaying in the container object the inside program object positioned according to the second coordinate system;

displaying in the container object, an inside message center associated with the inside program object, the inside message center including an inside ribbon associated with a property of the inside program object;

detecting selections of the inside ribbon and the port for displaying a visual wire connecting the inside ribbon and the port; and displaying the visual wire connecting the inside ribbon to the port, the visual wire representing information exchange between the inside ribbon and the port.

Aspect 55. The GUI according to Aspect 54, wherein the method further comprises displaying a ribbon in the inside message center associated with the inside program object, the ribbon being editable and associated with the connection between the inside ribbon and the port.

Aspect 56. The GUI according to Aspect 54, wherein the method further comprises displaying an outside program object positioned according to the first coordinate system in the main window outside the container object;

displaying in the main window, an outside message center associated with the outside program object, the outside message center including an outside ribbon associated with a property of the outside program object;

detecting selections of the outside ribbon and the port for displaying a second visual wire connecting the outside ribbon and the port; and displaying the second visual wire connecting the outside ribbon to the port, the first and second visual wires representing information exchange between the inside ribbon and the outside ribbon, the property of the inside program object being linked to the property of the outside program object.

Aspect 57. The GUI according to Aspect 55, wherein the method further comprises displaying an outside program object positioned according to the first coordinate system in the main window outside the container object;

displaying in the main window, an outside message center associated with the outside program object, the outside message center including an outside ribbon associated with a property of the outside program object;

detecting selections of the outside ribbon and the ribbon of the inside message center for displaying a third visual wire connecting the outside ribbon and the ribbon of the inside message center; and displaying the third visual wire connecting the outside ribbon to the ribbon of the inside message center, the first and third visual wires representing information exchange between the inside ribbon and the outside ribbon, the property of the inside program object being linked to the property of the outside program object.

Aspect 58. A non-transitory computer readable storage medium storing one or more programs, the one or more programs comprising instructions, which when executed by a computer with a display, cause the computer to implement a method for providing a graphical user interface (GUI) for visual programming displayed on the display, the GUI including an authoring mode interface, the method comprising:

displaying on the display of the computer the authoring mode interface including a tool box for creating program objects, and a main window for visual programming, the tool box being configured to allow creation of one or more program objects in the main window;

monitoring for selection of a program object from the tool box;

detecting the selection of the program object;

after detecting the selection of the program object, detecting a position in the main window for creating the program object;

displaying on the display, the program object at the detected position in the main window for creating the program object; and displaying on the display, a message center associated with the program object, the message center including a ribbon associated with a property of the program object.

Aspect 59. The non-transitory computer readable storage medium according to Aspect 58, wherein the method further comprising:

monitoring for selection of a second program object from the tool box;

detecting the selection of the second program object;

after detecting the selection of the second program object, detecting a position in the main window for creating the second program object;

displaying on the display, the second program object at the detected position in the main window for creating the second program object;

displaying on the display a second message center associated with the second program object, the second message center including a second ribbon associated with a property of the second program object;

detecting selections of the ribbon and the second ribbon for forming an information exchange between the ribbon and the second ribbon; and displaying on the display, a visual wire connecting the ribbon to the second ribbon in the main window, the visual wire representing information exchange between the ribbon and the second ribbon, the property of the program object being linked to the property of the second program object.

Aspect 60. The non-transitory computer readable storage medium according to Aspect 58, wherein the GUI further includes a run mode interface, the method further comprising:

displaying on the display the run mode interface including a run mode window;

displaying in the run mode window the program object and the second program object; and allowing a user to interact with the program object to affect a change to the property of the second program object.

Aspect 61. The non-transitory computer readable storage medium according to Aspect 60, wherein the GUI further includes an edit mode interface, the method further comprising:

displaying on the display the edit mode interface including an edit mode window; and allowing a user to control whether a program object in the edit mode window is movable in the run mode interface.

Aspect 62. The non-transitory computer readable storage medium according to Aspect 58, wherein the main window includes a first coordinate system, and displaying the program object at the detected position in the main window is according to the first coordinate system;

the program object is a container object, the container object including a window border, and a second coordinate system;

the second coordinate system being independent from the first coordinate system; and the container object being configured to contain another program object positioned according the second coordinate system.

Aspect 63. The non-transitory computer readable storage medium according to Aspect 62, wherein the method further comprises displaying in the container object an inside program object positioned according to the second coordinate system.

Aspect 64. The non-transitory computer readable storage medium according to Aspect 62, wherein the method further comprises displaying a window port configured to allow a connection between an inside program object displayed in the container object and an outside program object displayed outside the container object.

Aspect 65. The non-transitory computer readable storage medium according to Aspect 29, wherein the method further comprising:

displaying in the container object the inside program object positioned according to the second coordinate system;

displaying in the container object, an inside message center associated with the inside program object, the inside message center including an inside ribbon associated with a property of the inside program object;

detecting selections of the inside ribbon and the port for displaying a visual wire connecting the inside ribbon and the port; and displaying the visual wire connecting the inside ribbon to the port, the visual wire representing information exchange between the inside ribbon and the port.

Aspect 66. The non-transitory computer readable storage medium according to Aspect 65, wherein the method further comprises displaying a ribbon in the inside message center associated with the inside program object, the ribbon being editable and associated with the connection between the inside ribbon and the port.

Aspect 67. The non-transitory computer readable storage medium according to Aspect 65, wherein the method further comprises displaying an outside program object positioned according to the first coordinate system in the main window outside the container object;

displaying in the main window, an outside message center associated with the outside program object, the outside message center including an outside ribbon associated with a property of the outside program object;

detecting selections of the outside ribbon and the port for displaying a second visual wire connecting the outside ribbon and the port; and displaying the second visual wire connecting the outside ribbon to the port, the first and second visual wires representing information exchange between the inside ribbon and the outside ribbon, the property of the inside program object being linked to the property of the outside program object.

Aspect 68. The non-transitory computer readable storage medium according to Aspect 66, wherein the method further comprises displaying an outside program object positioned according to the first coordinate system in the main window outside the container object;

displaying in the main window, an outside message center associated with the outside program object, the outside message center including an outside ribbon associated with a property of the outside program object;

detecting selections of the outside ribbon and the ribbon of the inside message center for displaying a third visual wire connecting the outside ribbon and the ribbon of the inside message center; and displaying the third visual wire connecting the outside ribbon to the ribbon of the inside message center, the first and third visual wires representing information exchange between the inside ribbon and the outside ribbon, the property of the inside program object being linked to the property of the outside program object.

Aspect 69. A method for providing a graphical user interface (GUI) to a computer for visual programming in a cloud computing environment, the method comprising:

displaying a main window;

displaying a cloud folder including an icon representing a program object;

detecting a selection of the icon;

downloading the program object to a memory of the computer; and displaying the program object in a main window.

Aspect 70. The method according to Aspect 69, further comprising detecting a drag of the icon from the cloud folder to the main window prior to downloading the program object.

Aspect 71. The method according to Aspect 69, further comprising displaying an information window including downloading criteria associated with the program object.

Aspect 72. The method according to Aspect 69, further comprising displaying a payment window prior to downloading the program object;

displaying an purchase interface for making a payment for the program object; and detecting a user's interaction with the purchase interface.

Aspect 73. A graphical user interface (GUI) on a computer with a display, a memory, and one or more processors to execute one or more programs stored in the memory to implement a method for visual programming displayed on the display in a cloud computing environment, the method comprising:

displaying a main window;

displaying a cloud folder including an icon representing a program object;

detecting a selection of the icon;

downloading the program object to a memory of the computer; and displaying the program object in a main window.

Aspect 74. The GUI according to Aspect 73, wherein the method further comprises detecting a drag of the icon from the cloud folder to the main window prior to downloading the program object.

Aspect 75. The GUI according to Aspect 73, wherein the method further comprises displaying an information window including downloading criteria associated with the program object.

Aspect 76. The GUI according to Aspect 73, wherein the method further comprises displaying a payment window prior to downloading the program object;

displaying an purchase interface for making a payment for the program object; and detecting a user's interaction with the purchase interface.

Aspect 77. A non-transitory computer readable storage medium storing one or more programs, the one or more programs comprising instructions, which when executed by a computer with a display, cause the computer to implement a method for providing a graphical user (GUI) to the computer for visual programming displayed on the display in a cloud computing environment, the method comprising:

displaying a main window;

displaying a cloud folder including an icon representing a program object;

detecting a selection of the icon;

downloading the program object to a memory of the computer; and displaying the program object in a main window.

Aspect 78. The non-transitory computer readable storage medium according to Aspect 77, wherein the method further comprises detecting a drag of the icon from the cloud folder to the main window prior to downloading the program object.

Aspect 79. The non-transitory computer readable storage medium according to Aspect 77, wherein the method further comprises displaying an information window including downloading criteria associated with the program object.

Aspect 80. The non-transitory computer readable storage medium according to Aspect 77, wherein the method further comprises displaying a payment window prior to downloading the program object;

displaying an purchase interface for making a payment for the program object; and detecting a user's interaction with the purchase interface.

Aspect 81. A method for providing a graphical user interface (GUI) to a computer for visual programming in a cloud computing environment, the method comprising:

displaying a cloud folder;

displaying a criteria a program object;

allowing a user to edit the criteria;

detecting a selection for uploading the program object; and uploading the program object to a cloud server of the cloud computing environment.

Aspect 82. The method according to Aspect 81, wherein the criteria includes a price for downloading the program object.

Aspect 83. A graphical user interface (GUI) on a computer with a display, a memory, and one or more processors to execute one or more programs stored in the memory, to implement a method for visual programming displayed on the display in a cloud computing environment, the method comprising:

displaying a cloud folder;

displaying a criteria a program object;

allowing a user to edit the criteria;

detecting a selection for uploading the program object; and uploading the program object to a cloud server of the cloud computing environment.

Aspect 84. The GUI according to Aspect 83, wherein the criteria includes a price for downloading the program object.

Aspect 85. A non-transitory computer readable storage medium storing one or more programs, the one or more programs comprising instructions, which when executed by a computer with a display, cause the computer to implement a method for providing a graphical user interface (GUI) on the display for visual programming in a cloud computing environment, the method comprising:

displaying a cloud folder;

displaying a criteria a program object;

allowing a user to edit the criteria;

detecting a selection for uploading the program object; and uploading the program object to a cloud server of the cloud computing environment.

Aspect 86. The non-transitory computer readable storage according to Aspect 85, wherein the criteria includes a price for downloading the program object.

What is claimed is:

1. A graphical user interface (GUI) on a computer with a display, a memory, and one or more processors to execute one or more programs stored in the memory to implement a method for visual programming displayed on the display, the GUI including an authoring mode interface for at least one of creating, modifying, and interacting with a multimedia computer application stored in a back end server, the method comprising:

displaying, on the display of the computer, the authoring mode interface including a tool box for creating program objects, and a main window for visual programming, the tool box being configured to allow creation of one or more program objects in the main window, the one or more program objects being an object that is displayable in the authoring mode interface as what-you-see-is-what-you-get, and the one or more program objects are displayable in a run mode;

monitoring for a selection of a program object from the tool box;

detecting the selection of the program object;

after detecting the selection of the program object, detecting a position in the main window for creating the program object;

displaying, in the main window, the program object at the detected position in the main window for creating the program object, the displaying including displaying the program object as what-you-see-is-what-you-get;

displaying, in the main window, a message center separately from the program object and linked to the program object for providing a ribbon having an inlet port and an outlet port, the ribbon including a graphical entity representing an input, a property, or an output corresponding to the program object and being wirable to a second ribbon, the message center being displayable in the authoring mode interface and not displayable in the run mode;

monitoring for a selection of a second program object from the tool box;

detecting the selection of the second program object;

after detecting the selection of the second program object, detecting a position in the main window for creating the second program object;

displaying, in the main window, the second program object at the detected position in the main window for creating the second program object, the displaying including displaying the second program object as what-you-see-is-what-you-get;

displaying, in the main window, a second message center separately from the second program object and linked to the second program object for providing a second ribbon having an inlet port and an outlet port, the second ribbon including a graphical entity representing an input, a property, or an output corresponding to the second program object and being wirable to the ribbon, the second message center being displayable in the authoring mode interface and not displayable in the run mode;

detecting selections of the ribbon and the second ribbon for forming an information exchange between the ribbon and the second ribbon; and based on the detected selections:
  displaying, in the main window, a visual wire connecting the ribbon to the second ribbon, the visual wire representing information exchange between the ribbon and the second ribbon, the input, property, or output of the program object being linked to the input, property, or output of the second program object, such that a change to the input, property, or output of the program object being linked affects a change to the input, property, or output of the second program object being linked;
  connecting the input, property, or output of the program object being linked to the input, property, or output of the second program object, wherein in response to the connecting, a change to the program object in the authoring mode interface affects a change to the second program object in the authoring mode interface or a change to the second program object in the authoring mode interface affects a change to the program object in the authoring mode interface, and concurrently updating the multimedia computer application in the back end server according to the detected selections, wherein the program object, the second program object, the message center, the second message center, and the visual wire are concurrently displayed in the main window such that the program object, the second program object, the message center, the second message center, and the visual wire are concurrently visible on the GUI.

2. The GUI according to claim 1, further including a run mode interface for the run mode, the method further comprising:
  displaying, on the display, the run mode interface including a run mode window;
  displaying in the run mode window the program object and the second program object; and
  allowing a user to interact with the program object to affect a change to the input, property, or output of the second program object,
  wherein the run mode interface does not display the message center and the second message center.

3. The GUI according to claim 2, wherein the method further comprises:
  allowing a user to control whether the program object in the authoring mode interface is movable in the run mode interface.

4. The GUI according to claim 1, wherein the main window includes a first coordinate system, and displaying the program object at the detected position in the main window is according to the first coordinate system;
  the program object is a container object, the container object including a window border, and a second coordinate system;
  the second coordinate system being independent from the first coordinate system; and
  the container object being configured to contain another program object positioned according to the second coordinate system.

5. The GUI according to claim 4, wherein the method further comprises displaying in the container object an inside program object positioned according to the second coordinate system.

6. The GUI according to claim 4, wherein the method further comprises displaying a window port configured to allow a connection between an inside program object displayed in the container object and an outside program object displayed outside the container object.

7. The GUI according to claim 6, wherein the method further comprises:
  displaying, in the container object, the inside program object positioned according to the second coordinate system;
  displaying, in the container object, an inside message center associated with the inside program object, the inside message center including an inside ribbon associated with an input, property, or output of the inside program object;
  detecting selections of the inside ribbon and the window port for displaying a visual wire connecting the inside ribbon and the window port; and
  displaying the visual wire connecting the inside ribbon to the window port, the visual wire representing information exchange between the inside ribbon and the window port.

8. The GUI according to claim 7, wherein the method further comprises:
displaying the inside ribbon in the inside message center associated with the inside program object, the inside ribbon being editable and associated with the connection between the inside ribbon and the window port.

9. The GUI according to claim 7, wherein the method further comprises:
displaying the outside program object positioned according to the first coordinate system in the main window outside the container object;
displaying, in the main window, an outside message center associated with the outside program object, the outside message center including an outside ribbon associated with an input, property, or output of the outside program object;
detecting selections of the outside ribbon and the window port for displaying a second visual wire connecting the outside ribbon and the window port; and
displaying the second visual wire connecting the outside ribbon to the window port,
the first and second visual wires representing information exchange between the inside ribbon and the outside ribbon, the input, property, or output of the inside program object being linked to the input, property, or output of the outside program object.

10. The GUI according to claim 1, wherein an input includes any call that triggers a change in a state of the program object, a property includes any aspect of the program object that may be changed, and an output includes any event that delivers a trigger upon a particular change in the state of the program object.

11. The GUI according to claim 1, further comprising:
receiving a user selection to configure the ribbon.

12. A non-transitory computer readable storage medium storing one or more programs, the one or more programs comprising instructions, which when executed by a computer with a display, cause the computer to implement a method for providing a graphical user interface (GUI) for visual programming displayed on the display, the GUI including an authoring mode interface for at least one of creating, modifying, and interacting with a multimedia computer application stored in a back end server, the method comprising:
displaying on the display of the computer the authoring mode interface including a tool box for creating program objects, and a main window for visual programming, the tool box being configured to allow creation of one or more program objects in the main window, the one or more program objects being an object that is displayable in the authoring mode interface in a what-you-see-is-what-you-get display, and the one or more program objects are displayable in a run mode;
monitoring for a selection of a program object from the tool box;
detecting the selection of the program object;
after detecting the selection of the program object, detecting a position in the main window for creating the program object;
displaying, in the main window, the program object at the detected position in the main window for creating the program object, the displaying including displaying the program object as what-you-see-is-what-you-get;
displaying, in the main window, a message center separately from the program object and linked to the program object for providing a ribbon having an inlet port and an outlet port, the ribbon including a graphical entity representing an input, a property, or an output corresponding to the program object and being wirable to a second ribbon, the message center being displayable in the authoring mode interface and not displayable in the run mode;
monitoring for a selection of a second program object from the tool box;
detecting the selection of the second program object;
after detecting the selection of the second program object, detecting a position in the main window for creating the second program object;
displaying, in the main window, the second program object at the detected position in the main window for creating the second program object, the displaying including displaying the second program object as what-you-see-is-what-you-get;
displaying, in the main window, a second message center separately from the second program object and linked to the second program object for providing a second ribbon having an inlet port and an outlet port, the second ribbon including a graphical entity representing an input, a property, or an output corresponding to the second program object and being wirable to the ribbon, the second message center being displayable in the authoring mode interface and not displayable in the run mode;
detecting selections of the ribbon and the second ribbon for forming an information exchange between the ribbon and the second ribbon; and
based on the detected selections:
displaying on the display, a visual wire connecting the ribbon to the second ribbon in the main window, the visual wire representing information exchange between the ribbon and the second ribbon, the input, property, or output of the program object being linked to the input, property, or output of the second program object, such that a change to the input, property, or output of the program object being linked affects a change to the input, property, or output of the second program object being linked; and
connecting the input, property, or output of the program object being linked to the input, property, or output of the second program object, wherein in response to the connecting, a change to the program object in the authoring mode interface affects a change to the second program object in the authoring mode interface or a change to the second program object in the authoring mode interface affects a change to the program object in the authoring mode interface, and
concurrently updating the multimedia computer application in the back end server according to the detected selections,
wherein the program object, the second program object, the message center, the second message center, and the visual wire are concurrently displayed in the main window such that the program object, the second program object, the message center, the second message center, and the visual wire are concurrently visible on the GUI.

13. The non-transitory computer readable storage medium according to claim 12, wherein the GUI further includes a run mode interface for the run mode, the method further comprising:
displaying, on the display, the run mode interface including a run mode window;

displaying in the run mode window the program object and the second program object; and allowing a user to interact with the program object to affect a change to the input, property, or output of the second program object, wherein the run mode interface does not display the message center and the second message center.

14. The non-transitory computer readable storage medium according to claim 13, wherein the method further comprises:

allowing a user to control whether the program object in the authoring mode interface is movable in the run mode interface.

15. The non-transitory computer readable storage medium according to claim 12, wherein the main window includes a first coordinate system, and displaying the program object at the detected position in the main window is according to the first coordinate system;

the program object is a container object, the container object including a window border, and a second coordinate system;

the second coordinate system being independent from the first coordinate system; and the container object being configured to contain another program object positioned according to the second coordinate system.

16. The non-transitory computer readable storage medium according to claim 15, wherein the method further comprises:

displaying a window port configured to allow a connection between an inside program object displayed in the container object and an outside program object displayed outside the container object.

17. A graphical user interface (GUI) on a computer with a display, a memory, and one or more processors to execute one or more programs stored in the memory to implement a method for visual programming displayed on the display in a cloud computing environment, the GUI for at least one of creating, modifying, and interacting with a multimedia computer application stored in a back end server, the method comprising:

displaying a main window;

displaying a cloud folder including an icon representing a program object, the program object being an object that is displayable in an authoring mode interface as what-you-see-is-what-you-get and displayable in a run mode;

detecting a selection of the icon;

downloading the program object to the memory of the computer;

displaying the program object in the main window as what-you-see-is-what-you-get;

displaying, in the main window, a message center separately from the program object and linked to the program object for providing a ribbon having an inlet port and an outlet port, the ribbon including a graphical entity representing an input, a property, or an output corresponding to the program object and being wirable to a second ribbon, the message center being displayable in the authoring mode interface and not displayable in the run mode;

displaying a second icon representing a second program object in the cloud folder;

detecting a selection of the second icon;

downloading the second program object to the memory of the computer;

displaying the second program object in the main window as what-you-see-is-what-you-get;

displaying, in the main window, a second message center separately from the second program object and linked to the second program object for providing a second ribbon having an inlet port and an outlet port, the second ribbon including a graphical entity representing an input, a property, or an output corresponding to the second program object and being wirable to the ribbon, the message center being displayable in the authoring mode interface and not displayable in the run mode;

detecting selections of the ribbon and the second ribbon for forming an information exchange between the ribbon and the second ribbon; and based on the detected selections:

displaying on the display, a visual wire connecting the ribbon to the second ribbon in the main window, the visual wire representing information exchange between the ribbon and the second ribbon, the input, property, or output of the program object being linked to the input, property, or output of the second program object, such that a change to the input, property, or output of the program object being linked affects a change to the input, property, or output of the second program object being linked; and connecting the input, property, or output of the program object being linked to the input, property, or output of the second program object, wherein in response to the connecting, a change to the program object in the authoring mode interface affects a change to the second program object in the authoring mode interface or a change to the second program object in the authoring mode interface affects a change to the program object in the authoring mode interface, and concurrently updating the multimedia computer application in the back end server according to the detected selections, wherein the program object, the second program object, the message center, the second message center, and the visual wire are concurrently displayed in the main window such that the program object, the second program object, the message center, the second message center, and the visual wire are concurrently visible on the GUI.

18. The GUI according to claim 17, wherein the method further comprises detecting a drag of the icon from the cloud folder to the main window prior to downloading the program object.

19. The GUI according to claim 17, wherein the method further comprises displaying an information window including downloading criteria associated with the program object.

20. The GUI according to claim 17, wherein the method further comprises displaying a payment window prior to downloading the program object;

displaying a purchase interface for making a payment for the program object; and detecting a user's interaction with the purchase interface.

* * * * *